United States Patent
Teo et al.

(10) Patent No.: US 10,764,574 B2
(45) Date of Patent: Sep. 1, 2020

(54) ENCODING METHOD, DECODING METHOD, ENCODING APPARATUS, DECODING APPARATUS, AND ENCODING AND DECODING APPARATUS

(71) Applicant: Panasonic Intellectual Property Management Co., Ltd., Osaka (JP)

(72) Inventors: Han Boon Teo, Singapore (SG); Chong Soon Lim, Singapore (SG); Takahiro Nishi, Nara (JP); Kengo Terada, Osaka (JP); Tadamasa Toma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/739,927

(22) PCT Filed: Mar. 18, 2016

(86) PCT No.: PCT/JP2016/001583
§ 371 (c)(1),
(2) Date: Dec. 26, 2017

(87) PCT Pub. No.: WO2017/002283
PCT Pub. Date: Jan. 5, 2017

(65) Prior Publication Data
US 2018/0192046 A1    Jul. 5, 2018

Related U.S. Application Data

(60) Provisional application No. 62/187,502, filed on Jul. 1, 2015, provisional application No. 62/187,494, filed on Jul. 1, 2015.

(30) Foreign Application Priority Data

Feb. 2, 2016   (JP) .................................. 2016-018397

(51) Int. Cl.
*H04N 19/103*   (2014.01)
*H04N 19/11*   (2014.01)
(Continued)

(52) U.S. Cl.
CPC ........... *H04N 19/103* (2014.11); *G06N 20/00* (2019.01); *H04N 19/11* (2014.11); *H04N 19/117* (2014.11);
(Continued)

(58) Field of Classification Search
CPC ............ G06T 5/20; G06T 2207/20012; H04N 19/117; H04N 19/176; H04N 19/70;
(Continued)

(56) References Cited

U.S. PATENT DOCUMENTS

| 7,656,950 B2 * | 2/2010 | Garrido | H04N 7/0125 375/240.11 |
| 7,715,477 B2 * | 5/2010 | Garrido | H04N 7/0125 375/240.11 |

(Continued)

FOREIGN PATENT DOCUMENTS

| WO | 2009/126921 | 10/2009 | |
| WO | WO-2009126921 A1 * | 10/2009 | ........... H04N 19/192 |

(Continued)

OTHER PUBLICATIONS

"Advanced Video Coding for Generic Audiovisual Services" ITU-T; H-264 (Year: 2010).*
(Continued)

*Primary Examiner* — Dramos Kalapodas
(74) *Attorney, Agent, or Firm* — Wenderoth, Lind & Ponack, L.L.P.

(57) ABSTRACT

To provide an encoding method for reducing deterioration in encoding efficiency when encoding a video/an image by selecting one operation mode out of a number of operation
(Continued)

modes. The encoding method includes: extracting one or more features from one or more reconstructed pixel groups; categorizing the one or more reconstructed pixel groups using the extracted one or more features and a first machine learning model; and performing an encoding process on a current block of image samples included in a current picture using a parameter set corresponding to a result of the categorizing, the parameter set being one of a plurality of predefined parameter sets.

19 Claims, 72 Drawing Sheets

(51) Int. Cl.
| | |
|---|---|
| G06N 20/00 | (2019.01) |
| H04N 19/176 | (2014.01) |
| H04N 19/136 | (2014.01) |
| H04N 19/82 | (2014.01) |
| H04N 19/117 | (2014.01) |
| H04N 19/14 | (2014.01) |
| H04N 19/46 | (2014.01) |

(52) U.S. Cl.
CPC .......... *H04N 19/136* (2014.11); *H04N 19/14* (2014.11); *H04N 19/176* (2014.11); *H04N 19/46* (2014.11); *H04N 19/82* (2014.11)

(58) Field of Classification Search
CPC ...... H04N 19/86; H04N 19/103; H04N 19/11; H04N 19/14; H04N 19/82; H04N 19/46; H04N 19/142; H04N 19/172; H04N 19/66; H04N 19/115; H04N 19/136; H04N 19/186; G06N 20/00; G06N 99/005

See application file for complete search history.

(56) References Cited

U.S. PATENT DOCUMENTS

| | | | | |
|---|---|---|---|---|
| 8,023,561 | B1 * | 9/2011 | Garrido | H04N 7/0125 375/240.15 |
| 2009/0034622 | A1 * | 2/2009 | Huchet | H04N 19/154 375/240.16 |
| 2009/0257494 | A1 | 10/2009 | Ye et al. | |
| 2012/0147967 | A1 | 6/2012 | Panchal et al. | |
| 2013/0329782 | A1 * | 12/2013 | Seregin | H04N 19/187 375/240.02 |
| 2013/0343448 | A1 * | 12/2013 | He | H04N 19/136 375/240.03 |
| 2015/0229948 | A1 * | 8/2015 | Puri | H04N 19/91 375/240.03 |
| 2016/0105688 | A1 * | 4/2016 | Hendry | H04N 19/44 375/240.25 |
| 2016/0277739 | A1 * | 9/2016 | Puri | H04N 19/196 |
| 2018/0309995 | A1 * | 10/2018 | He | H04N 19/126 |

FOREIGN PATENT DOCUMENTS

| | | | |
|---|---|---|---|
| WO | 2012/078748 | 6/2012 | |
| WO | 2012/137890 | 10/2012 | |
| WO | WO-2012137890 A1 * | 10/2012 | ........... H04N 19/176 |

OTHER PUBLICATIONS

International Search Report (ISR) dated Jun. 7, 2016 in International (PCT) Application No. PCT/JP2016/001583.
"Advanced video coding for generic audiovisual services", ITU-T Recommendation H. 264, Mar. 2010.

* cited by examiner

SPATIALLY NEIGHBORING PIXEL GROUP

SPATIALLY NEIGHBORING PIXEL GROUP

SPATIALLY NEIGHBORING PIXEL GROUP

FIG. 63

| VIDEO STREAM (PID = 0x1011, PRIMARY VIDEO) | AUDIO STREAM (PID = 0x1100) | AUDIO STREAM (PID = 0x1101) | PRESENTATION GRAPHICS STREAM (PID = 0x1200) | PRESENTATION GRAPHICS STREAM (PID = 0x1201) | INTERACTIVE GRAPHICS STREAM (PID = 0x1400) | VIDEO STREAM (PID = 0x1B00, SECONDARY VIDEO) | VIDEO STREAM (PID = 0x1B01, SECONDARY VIDEO) |

FIG. 66
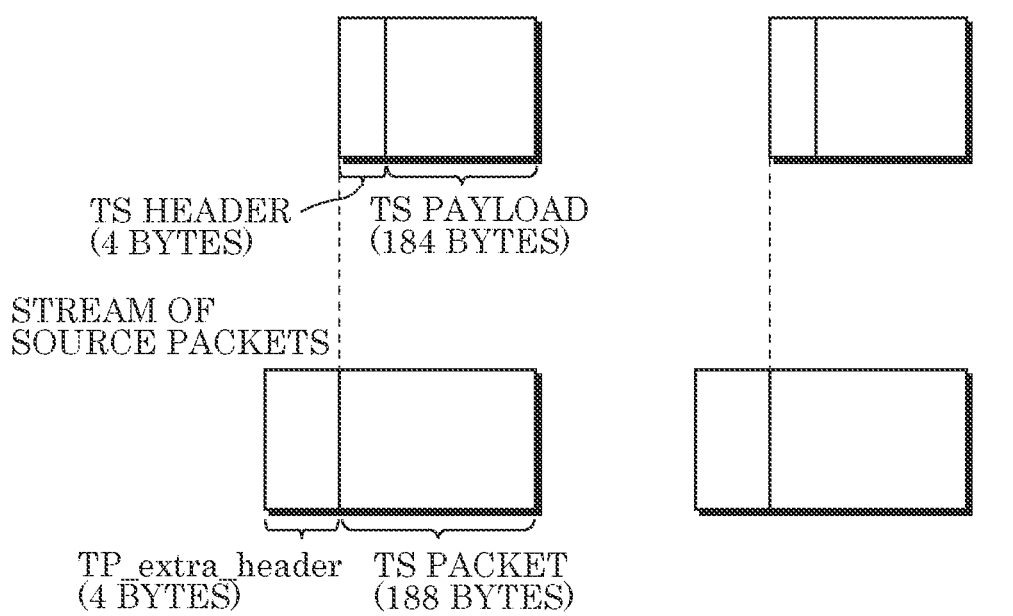
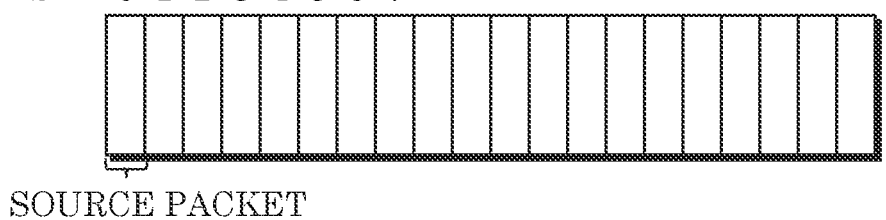

FIG. 74

| CORRESPONDING STANDARD | DRIVING FREQUENCY |
|---|---|
| MPEG-4 AVC | 500 MHz |
| MPEG-2 | 350 MHz |
| ⋮ | ⋮ |

ENCODING METHOD, DECODING METHOD, ENCODING APPARATUS, DECODING APPARATUS, AND ENCODING AND DECODING APPARATUS

TECHNICAL FIELD

The present disclosure relates to encoding/decoding of multimedia data, and particularly to image encoding/decoding and video encoding/decoding involving intra or inter picture prediction.

BACKGROUND ART

The wireless and wired transmissions of next-generation video (e.g., 4K/8K resolutions) demand encoding efficiency that may be even beyond the capabilities of the current coding capability Although higher encoding efficiency is essential, the dramatic increase in encoder complexity will be undesirable and can have major concern for deployment. In current video coding standards, the complexity for a decoder is much lower than that of an encoder. Therefore, some studies have been continued to improve the encoding efficiency by weighting the complexity cost to a decoder side.

Some researches and experiments related to adaptive filtering techniques and intra prediction techniques have been studied in the past and the results have proven encoding efficiency improvements. The adaptive interpolation filtering techniques are typically used for inter picture prediction while adaptive picture filtering techniques and adaptive intra picture techniques are for image reconstruction. In the prior arts for the previously mentioned techniques, the video encoder normally performs a decision making process to pick a best mode out of the possible modes and signal this decision to the video decoder for the adaptive tools.

CITATION LIST

Non-Patent Literature

NPL: ITU-T Recommendation H.264, "Advanced video coding for generic audiovisual services", March, 2010

SUMMARY OF THE INVENTION

Typically, when a video encoder instructs a decision to a decoder to pick one mode out of many possible modes of operations, signal bits are required to be encoded in a bitstream for the decision. These signal bits are quite significant when these decisions are in a small unit level (e.g. 4×4 block) and when the number of possible modes is large. Because of the concern in the size of these signal bits, it is often preferred not to perform signalling at the smallest unit level or to have too many possible modes of operation. Thus this reduces the encoding efficiency of many adaptive tools.

In view of this, the present disclosure provides encoding/decoding method(s) etc. for reducing deterioration in encoding efficiency when encoding/decoding a video/an image by selecting one operation mode out of a plurality of operation nodes.

An encoding method according to an aspect of the present disclosure includes: extracting one or more features from one or more reconstructed pixel groups; categorizing the one or more reconstructed pixel groups using the extracted one or more features and a first machine learning model; and performing an encoding process on a current block of image samples included in a current picture using a parameter set corresponding to a result of the categorizing, the parameter set being one of a plurality of predefined parameter sets.

A decoding method according to an aspect of the present disclosure includes: extracting one or more features from one or more reconstructed pixel groups; categorizing the one or more reconstructed pixel groups using the extracted one or more features and a first machine learning model; and performing a decoding process on a current block of image samples included in a current picture using a parameter set corresponding to a result of the categorizing, the parameter set being one of a plurality of predefined parameter sets.

These general and specific aspects may be implemented using a system, an apparatus, an integrated circuit, a computer program, or a computer-readable recording medium such as a CD-ROM, or any combination of systems, apparatuses, integrated circuits, computer programs, or computer-readable recording media.

The encoding/decoding method(s) according to one or more aspects of the present disclosure make(s) it possible to reduce deterioration in encoding efficiency when encoding/decoding a video/an image by selecting one mode out of a plurality of operation modes.

BRIEF DESCRIPTION OF DRAWINGS

FIG. 63 illustrates a structure of multiplexed data.

FIG. 66 shows a structure of TS packets and source packets in the multiplexed data.

FIG. 74 shows an example of a look-up table in which video data standards are associated with driving frequencies.

DESCRIPTION OF EXEMPLARY EMBODIMENTS

Figure 1:
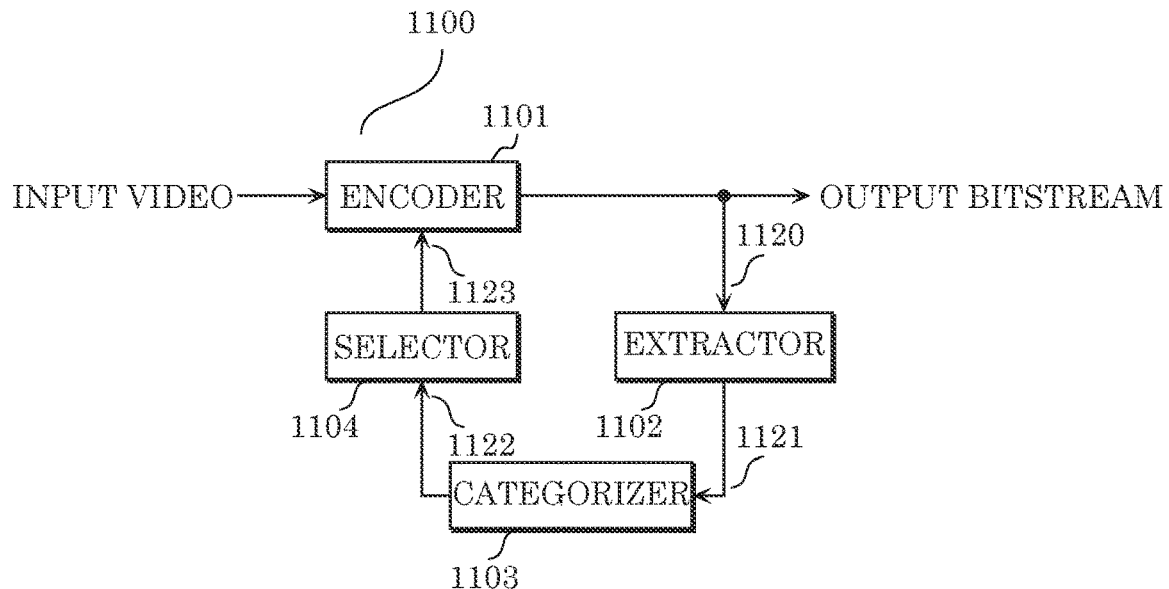
FIG. 1 is a block diagram illustrating a configuration of a video encoding apparatus according to Embodiment 1.

An encoding method according to an aspect of the present disclosure includes: extracting one or more features from one or more reconstructed pixel groups; categorizing the one or more reconstructed pixel groups using the extracted one or more features and a first machine learning model; and performing an encoding process on a current block of image samples included in a current picture using a parameter set corresponding to a result of the categorizing, the parameter set being one of a plurality of predefined parameter sets.

In this way it is possible to perform the encoding process on the current block using the parameter set corresponding to the result of categorizing the one or more reconstructed pixel groups using the one or more features and the first machine learning model. Accordingly, even when information indicating the parameter set itself is not included in a bitstream, it is possible to obtain the parameter set using the one or more features and the first machine learning model, and to reduce the code amount of the parameter sets etc. Furthermore, when a plurality of features are used, it is possible to perform the encoding process on the current block using the parameter set more suitable for the current block than in the case where a single feature (for example, a luminance value, or the like) is used. Thus, it is possible to improve the encoding efficiency.

For example, the encoding method may further include: writing a control parameter to a header of a bitstream; when the written control parameter has a predefined value: performing the categorizing of the one or more reconstructed pixel groups using the extracted one or more features and the first machine learning model; and performing the encoding process on the current block using the parameter set corresponding to the result of the categorizing, and when the written control parameter does not have the predefined value, performing the encoding process on the current block using a predetermined parameter set.

In this way; the parameter set corresponding to the result of the categorizing using the first machine learning model is used in the encoding process when the control parameter has the predefined value, and the predetermined parameter set is used in the encoding process when the control parameter does not have the predefined value. Accordingly, it is possible to switch between use and unuse of the first machine learning model according to the control parameter, which makes it possible to perform the encoding process using the more appropriate parameter set.

For example, the encoding method may further include: writing a control parameter to a header of a bitstream; when the written control parameter has a predefined value, performing the categorizing of the one or more reconstructed pixel groups using the extracted one or more features and the first machine learning model; and when the written control parameter does not have the predefined value, performing the categorizing of the one or more reconstructed pixel groups using the extracted one or more features and a second machine learning model different from the first machine learning model.

In this way it is possible to perform the categorizing using one of the first machine learning model and the second machine learning model according to whether the control parameter has the predefined value or not. Accordingly, it is possible to increase flexibility in machine learning models which are used in the categorizing, thereby obtaining the more appropriate result of the categorizing (that is, the parameter set).

For example, the encoding method away further include: writing a first control parameter to a header of a bitstream; when the written first control parameter does not have a predefined value, performing the categorizing of the one or more reconstructed pixel groups using the extracted one or more features and the first machine learning model; and when the written first control parameter has the predefined value: writing a second control parameter for modifying the first machine learning model to the header of the bitstream; modifying the first machine learning model using the second control parameter; and performing the categorizing of the one or more reconstructed pixel groups using the extracted one or more features and the first machine learning model.

In this way, it is possible to modify the first machine learning model using the second control parameter. Accordingly, it is possible to categorize the one or more reconstructed pixel groups using the more appropriate machine learning model, thereby obtaining the more appropriate result of the categorizing (that is, the parameter set).

For example, the encoding method may further include: writing a first control parameter to a header of a bitstream; when the written first control parameter has a predefined value: further writing a second control parameter to the header of the bitstream; and performing the encoding process on the current block using a parameter set indicated by the written second control parameter; and when the written first control parameter does not have the predefined value, performing the encoding process on the current block using the parameter set corresponding to the result of the categorizing.

In this way it is possible to perform the encoding process on the current block using the parameter set indicated by the second control parameter when the first control parameter has the predefined value. Accordingly it is possible to select either reduction in code amount by the categorizing by the machine learning model or reduction in processing load by the second control parameter, thereby balancing the processing load and the encoding efficiency.

For example, the encoding method may further include: writing a control parameter to a header of a bitstream; when the written control parameter has a predefined value, extracting the one or more features from the one or more reconstructed pixel groups using a predefined first method; and when the written control parameter does not have the predefined value, extracting one or more features from the one or more reconstructed pixel groups using a predefined second method different from the predefined first method.

In this way, it is possible to switch between feature extraction methods between the first method and the second method according to whether the control parameter has the predefined value or not. Accordingly, it is possible to extract, for the current block, the one or more features using the method which is more suitable for the current block.

For example, the encoding method may further include: writing a control parameter to a header of a bitstream; and extracting the one or more features from the one or more reconstructed pixel groups using an extraction method indicated by the control parameter.

In this way, it is possible to extract the one or more features using the extraction method indicated by the control parameter. Accordingly, it is possible to select the extraction method more flexibly thereby being able to extract the one or more features using the method more suitable for the current block.

For example, the encoding method may further include: writing a control parameter to a header of a bitstream; when the written control parameter has a predefined value: extracting the one or more features from the one or more reconstructed pixel groups; performing the categorizing of the one or more reconstructed pixel groups using the extracted one or more features and the first machine learning model; and performing the encoding process on the current block using the parameter set corresponding to the result of the categorizing; and when the written control parameter does not have the predefined value; deriving a parameter set from a spatially or temporally neighboring block; and performing the encoding process on the current block using the derived parameter set.

In this way it is possible to selectively use the parameter set derived from the neighboring block and the parameter set obtained through the categorizing using the machine learning model. Accordingly, when the parameter set derived from the neighboring block is suitable for the encoding process to be performed on the current block, it is possible to reduce the processing load using the parameter set derived from the neighboring block.

For example, at least part of the one or more reconstructed pixel groups may be included in a reference block in a reference picture different from the current picture, the parameter set may include a filter coefficient set which is used in an interpolation process to be performed on image pixels in inter prediction, and the encoding process may include the interpolation process.

In this way it is possible to obtain the filter coefficient set which is used in the interpolation process to be performed on the image pixels in the inter prediction using the machine learning model.

For example, the one or more reconstructed pixel groups may be included in the current block, the parameter set may include a filter coefficient set which is used in a filtering process to be performed on the current block, and the encoding process may include the filtering process.

In this way it is possible to obtain the filter coefficient which is used in the filtering process to be performed on the current block using the machine learning model.

For example, the one or more reconstructed pixel groups may include reconstructed pixels spatially neighboring the current block, the parameter set may indicate an intra prediction method for use in an intra prediction process, and the encoding process may include the intra prediction process.

In this way, it is possible to obtain the intra prediction method which is used in the intra prediction process using the machine learning model.

For example, at least part of the one or more reconstructed pixel groups may be included in a plurality of reference blocks in a plurality of reference pictures different from the current picture, the parameter set may include a weighting coefficient set which is used in an averaging process to be performed on a plurality of inter prediction blocks, and the encoding process may include the averaging process.

In this way, it is possible to obtain the weighting coefficient set which is used in the process for averaging the plurality of inter predictive blocks using the machine learning model.

For example, the first machine learning model may map a reconstructed pixel group which is a two-dimensional input space into a multi-dimensional feature space, and associate segment spaces with the one or more features, the segment spaces being obtained by dividing the feature space, and in the categorizing, the segment spaces corresponding to the one or more reconstructed pixel groups may be identified.

In this way it is possible to appropriately perform the categorizing of the one or more reconstructed pixel groups using the one or more features and the first machine learning model.

A decoding method according to an aspect of the present disclosure includes: extracting one or more features from one or more reconstructed pixel groups; categorizing the one or more reconstructed pixel groups using the extracted one or more features and a first machine learning model; and performing a decoding process on a current block of image samples included in a current picture using a parameter set corresponding to a result of the categorizing, the parameter set being one of a plurality of predefined parameter sets.

In this way, it is possible to perform the decoding process on the current block using the parameter set corresponding to the result of categorizing the one or more reconstructed pixel groups using the one or more features and the first machine learning model. Accordingly, even when information indicating the parameter set itself is not included in a bitstream, it is possible to obtain the parameter set using the one or more features and the first machine learning model, and to reduce the code amount of the parameter sets etc. Furthermore, when a plurality of features are used, it is possible to obtain the parameter set more suitable for the decoding of the current block than in the case where a single feature (for example, a luminance value, or the like) is used. Thus, it is possible to improve the encoding efficiency.

For example, the decoding method may further include: parsing a control parameter from a header of a bitstream; when the parsed control parameter has a predefined value: performing the categorizing of the one or more reconstructed pixel groups using the extracted one or more features and the first machine learning model; and performing the decoding process on the current block using the parameter set corresponding to the result of the categorizing; and when the written control parameter does not have the predefined value, performing the decoding process on the current block using a predetermined parameter set.

In this way, the parameter set corresponding to the result of the categorizing using the first machine learning model is used in the decoding process when the control parameter has the predefined value and the predetermined parameter set is used in the decoding process when the control parameter does not have the predefined value. Accordingly, it is possible to switch between use and unuse of the first machine learning model according to the control parameter, which makes it possible to perform the decoding process using the more appropriate parameter set.

For example, the decoding method may further include: parsing a control parameter from a header of a bitstream; when the parsed control parameter has a predefined value, performing the categorizing of the one or more reconstructed pixel groups using the extracted one or more features and the first machine learning model; and when the parsed control parameter does not have the predefined value, performing the categorizing of the one or more reconstructed pixel groups using the extracted one or more features and a second machine learning model different from the first machine learning model.

In this way, it is possible to perform the categorizing using one of the first machine learning model and the second machine learning model according to whether the control parameter has the predefined value or not. Accordingly, it is possible to increase flexibility in machine learning models which are used in the categorizing, thereby obtaining the more appropriate result of the categorizing (that is, the parameter set).

For example, the decoding method may further include: parsing a first control parameter from a header of a bitstream; when the first parsed control parameter does not have a predefined value, performing the categorizing of the one or more reconstructed pixel groups using the extracted one or more features and the first machine learning model; and when the parsed first control parameter has the predefined value: parsing a second control parameter for modifying the first machine learning model from the header of the bitstream; modifying the first machine learning model using the second control parameter; and performing the categorizing of the one or more reconstructed pixel groups using the extracted one or more features and the first machine learning model.

In this way, it is possible to modify the first machine learning model using the second control parameter. Accordingly it is possible to categorize the one or more reconstructed pixel groups using the more appropriate machine learning model, thereby obtaining the more appropriate result of the categorizing (that is, the parameter set).

For example, the decoding method may further include; parsing a control parameter from a header of a bitstream; when the parsed control parameter has a predefined value, further parsing a second control parameter from the header of the bitstream; and performing the encoding process on the current block using a parameter set indicated by the parsed second control parameter; and when the parsed first control parameter does not have the predefined value, performing the encoding process on the current block using the parameter set corresponding to the result of the categorizing.

In this way it is possible to perform the encoding process on the current block using the parameter set indicated by the second control parameter when the first control parameter has the predefined value. Accordingly it is possible to select either reduction in code amount by the categorizing by the machine learning model or reduction in processing load by the second control parameter, thereby balancing the processing load and the encoding efficiency.

For example, the decoding method may further include: parsing a control parameter from a header of a bitstream; when the parsed control parameter has a predefined value, extracting the one or more features from the one or more reconstructed pixel groups using a predefined first method; and when the parsed control parameter does not have the predefined value, extracting one or more features from the one or more reconstructed pixel groups using a predefined second method different from the predefined first method.

In this way it is possible to switch between feature extraction methods between the first method and the second method according to whether the control parameter has the predefined value or not. Accordingly, it is possible to extract, for the current block, the one or more features using the method which is more suitable for the current block.

For example, the decoding method may further include: parsing a control parameter from a header of a bitstream; and extracting the one or more features from the one or more reconstructed pixel groups using an extraction method indicated by the control parameter.

In this way, it is possible to extract the one or more features using the extraction method indicated by the control parameter. Accordingly it is possible to select the extraction method more flexibly; thereby being able to extract the one or more features using the method more suitable for the current block.

For example, the decoding method may further include: parsing a control parameter from a header of a bitstream; when the parsed control parameter has a predefined value: extracting the one or more features from the one or more reconstructed pixel groups; performing the categorizing of the one or more reconstructed pixel groups using the extracted one or more features and the first machine learning model; and performing the encoding process on the current block using the parameter set corresponding to the result of the categorizing; and when the parsed control parameter does not have the predefined value: deriving a parameter set from a spatially or temporally neighboring block; and performing the encoding process on the current block using the derived parameter set.

In this way it is possible to selectively use the parameter set derived from the neighboring block and the parameter set obtained through the categorizing using the machine learning model. Accordingly when the parameter set derived from the neighboring block is suitable for the decoding process to be performed on the current block, it is possible to reduce the processing load using the parameter set derived from the neighboring block.

For example, at least part of the one or more reconstructed pixel groups may be included in a reference block in a reference picture different from the current picture, the parameter set may include a filter coefficient set which is used in an interpolation process to be performed on image pixels in inter prediction, and the decoding process may include the interpolation process.

In this way, it is possible to obtain the filter coefficient set which is used in the interpolation process to be performed on the image pixel in the inter prediction using the machine learning model.

For example, the one or more reconstructed pixel groups may be included in the current block, the parameter set may include a filter coefficient set which is used in a filtering process to be performed on the current block, and the decoding process may include the filtering process.

In this way, it is possible to obtain the filter coefficient which is used in the filtering process to be performed on the current block using the machine learning model.

For example, the one or more reconstructed pixel groups may include reconstructed pixels spatially neighboring the current block, the parameter set may indicate an intra prediction method for use in an intra prediction process, and the decoding process may include the ultra prediction process.

In this way, it is possible to obtain the intra prediction method which is used in the intra prediction process using the machine learning model.

For example, at least part of the one or more reconstructed pixel groups may be included in a plurality of reference blocks in a plurality of reference pictures different from the current picture, the parameter set may include a weighting coefficient set which is used in an averaging process to be performed on a plurality of inter prediction blocks, and the decoding process may include the averaging process.

In this way it is possible to obtain the weighting coefficient set which is used in the process for averaging the plurality of inter predictive blocks using the machine learning model.

For example, the first machine learning model may map a reconstructed pixel group which is a two-dimensional input space into a multi-dimensional feature space, and associate segment spaces with the one or more features, the segment spaces being obtained by dividing the feature space, and in the categorizing, the segment spaces corresponding to the one or more reconstructed pixel groups may be identified.

In this way it is possible to appropriately perform the categorizing of the one or more reconstructed pixel groups using the one or more features and the first machine learning model.

These general and specific aspects may be implemented using a system, an apparatus, an integrated circuit, a computer program, or a computer-readable recording medium such as a CD-ROM, or any combination of systems, apparatuses, integrated circuits, computer programs, or computer-readable recording media.

Hereinafter, embodiments are specifically described with reference to the drawings.

It should be noted that each of the exemplary embodiments described below shows a general or specific example. The numerical values, shapes, materials, constituent elements, the arrangement and connection of the constituent elements, steps, the processing order of the steps etc. shown in the following exemplary embodiments are mere examples, and therefore do not limit the scope of the Claims. In addition, among the constituent elements in the following exemplary embodiments, constituent elements not recited in any one of the independent claims that define the most generic concept are described as arbitrary constituent elements.

Furthermore, in order to increase the benefit of the present disclosure, it is apparent to the person ordinarily skilled in the art that the embodiments to be described may be arbitrarily combined.

Embodiment 1

[Configuration of Video Encoding Apparatus]

FIG. 1 is a block diagram illustrating a configuration of a video encoding apparatus according to Embodiment 1.

Video encoding apparatus 1100 encodes an input video/image on a per block basis to generate an encoded bitstream to be output. As illustrated in FIG. 1, video encoding apparatus 1100 includes encoder 1101, extractor 1102, categorizer 1103, and selector 1104. Here, the respective constituent elements of video encoding apparatus 1100 are described.

The input video and parameter set 1123 are input to encoder 1101, and encoded value 1120 is output to extractor 1102. Encoded value 1120 is, for example, a reconstructed pixel group.

Extractor 1102 extracts one or more features 1121 from encoded value 1120, and transmits features 1121 to categorizer 1103. In other words, for example, extractor 1102 extracts features 1121 from one or more reconstructed pixel groups.

Features 1121 are values quantitatively indicating different features between images represented by the reconstructed pixel groups. Features 1121 include, for example, luminance information, gradient information, and variance information. In addition, for example, features 1121 may include a Gabor filter, local binary patterns (LBP), scale-invariant feature transform (SIFT), a histogram of oriented gradients (HOG), and a fisher vector (FV). In addition, features 1121 may be luminance or chrominance values in the reconstructed pixel groups.

Categorizer 1103 categorizes encoded values 1120 using extracted features 1121 and a machine learning model. In this way, the index indicated as a result of categorizing encoded values 1120 is selected out of a plurality of predefined indexes, and selected index 1122 is transmitted to selector 1104. One of the features of the feature categorization based on a machine learning model is to map a two dimensional input space (reconstructed pixel groups) to a multi-dimensional feature space, and categorize the features in the space after the mapping. For example, when the features are categorized into N kinds, the feature space is divided into N segment spaces, and the features of respective kinds and the segment spaces are associated one-to-one with each other. At this time, the segment space corresponding to the extracted features is identified. As a result, the segment space corresponding to one or more of the reconstructed pixel groups is identified.

Machine learning models are algorithms for predicting a parameter set suitable for encoding/decoding of a current block from one or more features. Specific examples of such machine learning models include a support vector machine (SVM), an artificial neural network (ANN), and k-means clustering. Here, each machine learning model has already been trained using a video/an image different from an input video/image. In other words, parameters of the machine learning model (for example, weighting parameters between nodes in a neural network, etc.) have been predefined.

Selector 1104 selects one parameter set 1123 out of a plurality of predefined parameter sets using selected index 1122, and returns selected parameter set 1123 to encoder 1101. In other words, selector 1104 selects the parameter set corresponding to index 1122 out of the plurality of parameter sets associated in advance with the plurality of indexes.

The parameter sets are parameter sets for use in an encoding process performed on a current block. Specifically, the parameter sets may be, for example, filtering coefficient sets for use in an interpolation process for generating pixel values at sub-pixel positions in inter prediction. In addition, for example, the parameter sets may be filtering coefficients for use in an in-loop filtering process performed on a current block. In addition, for example, the parameter sets may be intra prediction indexes. In addition, for example, the parameter sets may be weighting coefficient sets for use in an averaging process performed on a plurality of predictive blocks in inter predictive motion compensation.

Encoder 1101 performs an encoding process on image samples of a current block included in a current picture using the parameter set selected by selector 1104, and outputs an encoded bitstream. Here, the encoding process involves, for example, an interpolation process and an averaging process in inter prediction, an in-loop filtering process, and an intra prediction process.

It is to be noted that there is no need to include any information as signal bits into a bitstream to be output in order for the above processes in extractor 1102, categorizer 1103, and selector 1104. The decoder itself is to perform the same processes.

[Operations Performed by Video Encoding Apparatus]

Figure 2:
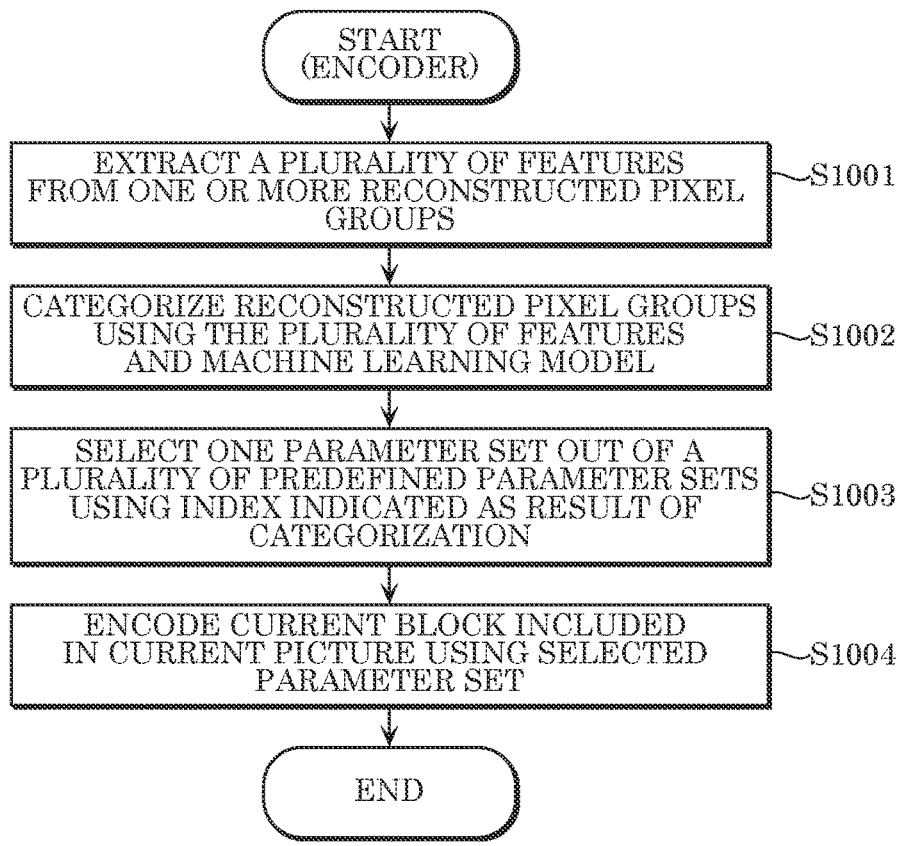
FIG. 2 is a flowchart indicating processes performed by a video encoding apparatus according to Embodiment 1.

Next, descriptions are given of operations performed by video encoding apparatus 1100 configured as described above. FIG. 2 is a flowchart indicating a video encoding process according to Embodiment 1.

First, in Step S1001, extractor 1102 extracts one or more features from one or more reconstructed pixel groups.

Next, in Step S1002, categorizer 1103 categorizes reconstructed pixel groups using the extracted one or more features and a machine learning model, thereby selecting one index out of a plurality of predefined indexes.

Next, in Step S1003, selector 1104 selects one parameter set out of a plurality of predefined parameter sets using the index selected by categorizer 1103. In other words, selector 1104 selects the parameter set corresponding to the index selected out of the plurality of predefined parameter sets.

Lastly in Step S1004, encoder 1101 performs an encoding process on image samples of a current, block included in a current picture using the parameter set selected by selector 1104. The encoding process in which the selected parameter set is used involves, for example, an interpolation process, an in-loop process, an intra prediction process, and an inter prediction process.

It is to be noted that a plurality of parameter sets for use in different encoding processes may be selected using a plurality of machine learning models. For example, a first parameter set for use in an intra prediction process may be selected using one or more first features and a first machine learning model; a second parameter set for use in an interpolation process may be selected using one or more second features and a second machine learning model; and a third parameter set for use in an in-loop filtering process may be selected using one or more third features and a third machine learning model.

[Configuration of Video Decoding Apparatus]

Figure 3:
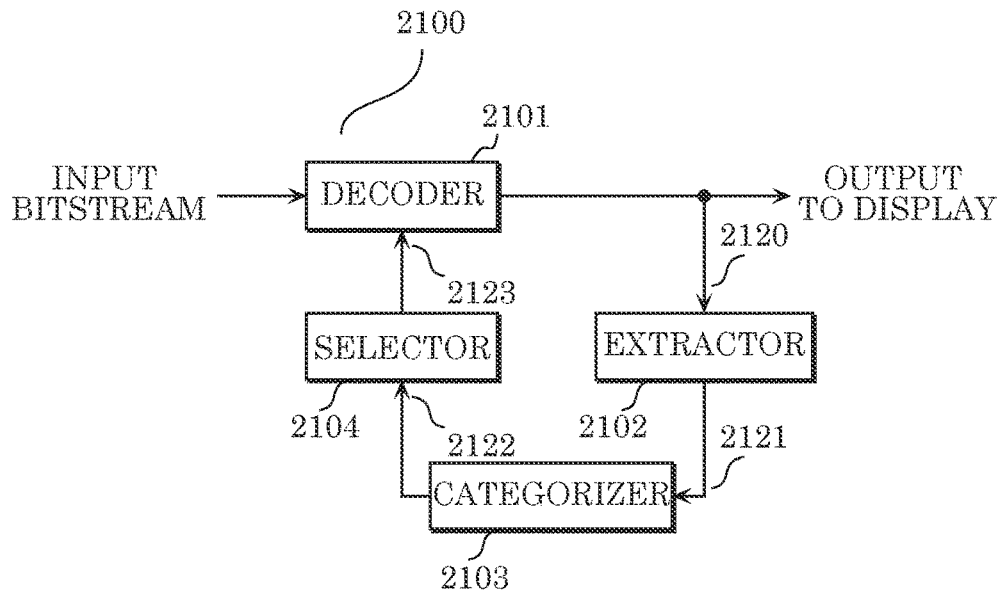
FIG. 3 is a flowchart indicating processes performed by a video decoding apparatus according to Embodiment 1.
Figure 4:
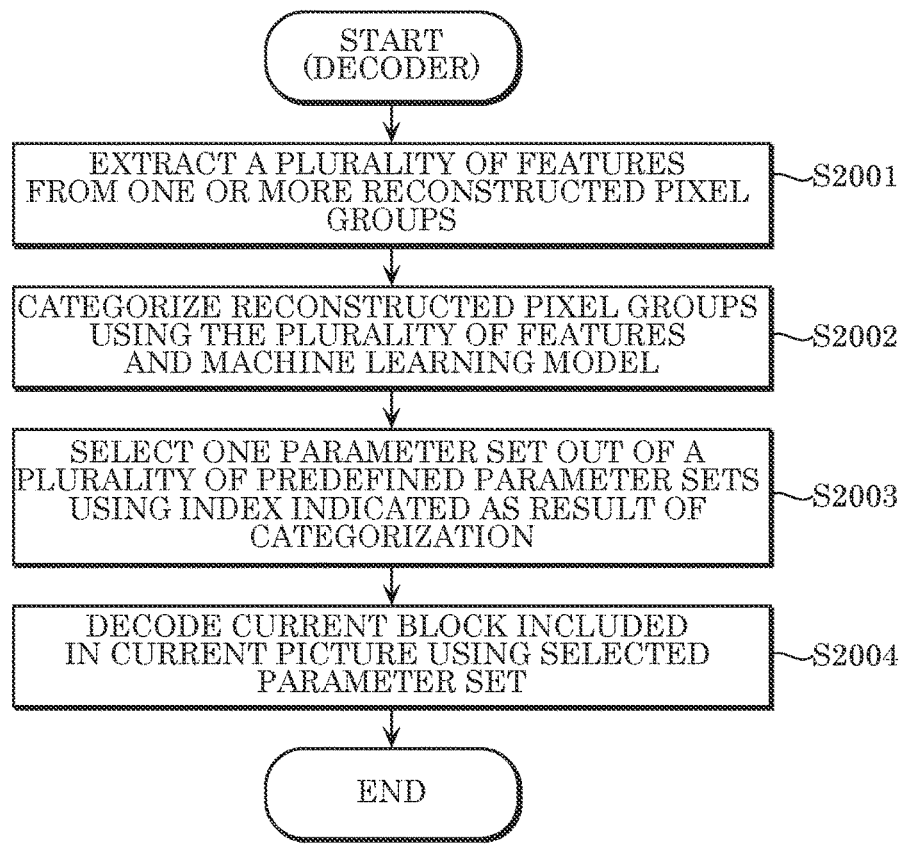
FIG. 4 is a flowchart indicating processes performed by a video decoding apparatus according to Embodiment 1.

Next, descriptions are given of a configuration of a video decoding apparatus for decoding an encoded bitstream output from video encoding apparatus 1100 as described above. FIG. 3 is a block diagram illustrating the configuration of the video decoding apparatus according to Embodiment 1.

Video decoding apparatus 2100 decodes an input encoded bitstream on a per block basis, and outputs a video/an image. As illustrated in FIG. 3, video decoding apparatus 2100 includes decoder 2101, extractor 2102, categorizer 2103, and selector 2104. Here, the respective constituent elements of video decoding apparatus 2100 are described.

The input bitstream and parameter set 2123 are input to decoder 2101, and decoded value 2120 is output to extractor 2102. Decoded value 2120 is, for example, a reconstructed pixel group.

Extractor 2102 extracts one or more features 2121 from decoded value 2120, and transmits features 2121 to categorizer 2103. In other words, for example, extractor 2102 extracts features 2121 from one or more reconstructed pixel groups. Features 2121 extracted by extractor 2102 are the same as features 1121 extracted by extractor 1102 of video encoding apparatus 1100 illustrated in FIG. 1.

Categorizer 2103 categorizes decoded values 2120 using extracted features 2121 and a machine learning model. In this way, the index indicated as a result of categorizing decoded values 2120 is selected out of a plurality of predefined indexes, and selected index 2122 is transmitted to selector 2104. The machine learning model used here is the same as the machine learning model used in video encoding apparatus 1100. It is to be noted that when k-means clustering is used as the machine learning model, a cluster having a center closest to feature 2121 in a feature space is selected. When a neural network such as a support vector machine and an ANN is used as the machine learning model, feature 2121 is input to an input node, and the result of categorization is output.

Selector 2104 selects one parameter set 2123 out of a plurality of predefined parameter sets using selected index 2122, and returns selected parameter set 2123 to decoder 2101. In other words, selector 2104 selects the parameter set corresponding to index 2122 out of the plurality of parameter sets associated in advance to the plurality of indexes.

Decoder 2101 performs a decoding process on image samples of a current block included in a current picture using the parameter set selected by selector 1104, and outputs the video to a display.

[Operations Performed by Video Decoding Apparatus]

Next, descriptions are given of operations performed by video decoding apparatus 2100 configured as described above. FIG. 2 is a flowchart indicating a video decoding process according to Embodiment 1.

First, in Step S2001, extractor 2102 extracts one or more features from one or more reconstructed pixel groups. These features are the same as the features used in video encoding apparatus 1100 in the encoding process.

Next, in Step S2002, categorizer 2103 categorizes reconstructed pixel groups using the extracted features and a machine learning model, thereby selecting one index out of a plurality of predefined indexes. The machine learning model used here is the same as the machine learning model used in video encoding apparatus 1100 in the encoding process.

Next, in Step S2003, selector 2104 selects one parameter set out of a plurality of predefined parameter sets using the index selected by categorizer 2103. Here, the same parameter set as the parameter set selected by video encoding apparatus 1100 in the encoding process is selected.

Lastly in Step S2004, decoder 2101 performs a decoding process on image samples of a current block included in a current picture using the parameter set selected by selector 2104. The decoding process in which the selected parameter set is used involves, for example, an interpolation process, an in-loop filtering process, an intra prediction process, and an inter prediction process.

In addition, as in the case of the encoding process, it is also possible to select a plurality of parameter sets for use in different decoding processes using a plurality of machine learning models. For example, a first parameter set for use in an intra prediction process may be selected using a plurality of first features and a first machine learning model; a second parameter set for use in an interpolation process may be selected using one or more second features and a second machine learning model; and a third parameter set for use in an in-loop filtering process may be selected using one or more third features and a third machine learning model.

[Effects]

As described above, each of video encoding apparatus 1100 and video decoding apparatus 2100 according to this embodiment makes it possible to perform the encoding/decoding process(es) each using the parameter set corresponding to the result of categorizing the one or more reconstructed pixel groups using the one or more features and the machine learning model.

Accordingly it is possible to perform mapping from a first dimension representing either luminance or chrominance values in current reconstructed pixel groups or the features extracted from the current reconstructed pixel groups to a second dimension having an axis different from that of the first dimension and thus more appropriate for the prediction or encoding of the current reconstructed pixel groups, thereby performing the prediction or encoding. This makes it possible to re-set an axis more appropriate for the pixels in the prediction of an image in which a non-linear change that is sharper than the surroundings appears. This increases the prediction accuracy, which enables improvement in encoding efficiency.

In addition, even when information indicating the parameter set itself is not included in the bitstream, it is possible to obtain the parameter set using the one or more features and the machine learning model, and to reduce the code amount of the parameter sets etc.

Furthermore, when a plurality of features are used, it is possible to perform the encoding/decoding process(es) on the current block using the parameter set more suitable for the current block than in the case where a single feature (for example, a luminance value, or the like) is used. Thus, it is possible to improve the encoding efficiency.

Embodiment 2

Next, Embodiment 2 is described. In Embodiment 2, descriptions are given of a case where a parameter set which is selected using a machine learning model is a filter coefficient set to be used in an interpolation process for generating pixel values at sub-pixel positions in inter prediction. This embodiment is described hereinafter mainly focusing on the differences from Embodiment 1.

[Configuration of Video Encoding Apparatus]

Figure 5:
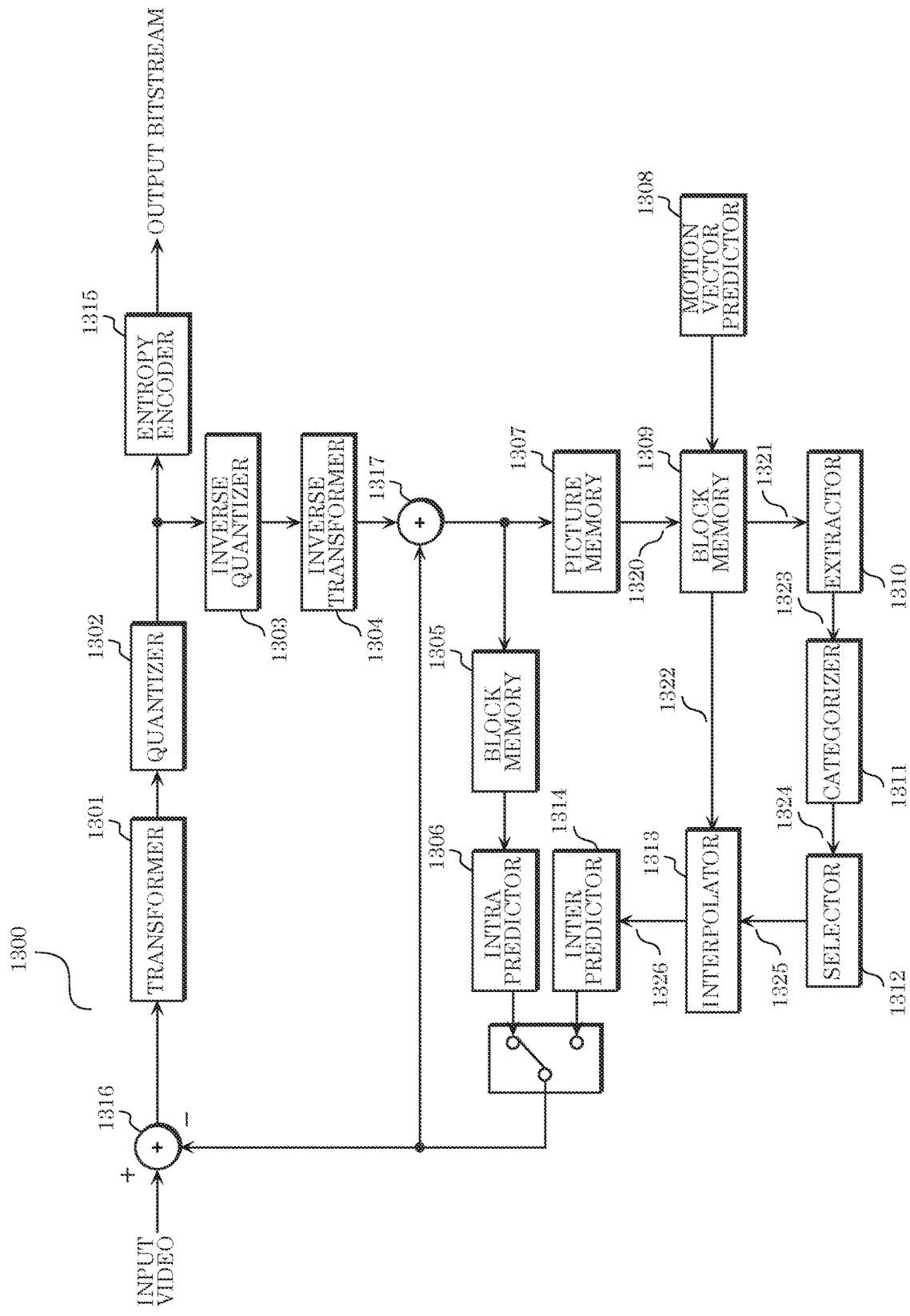
FIG. 5 is a block diagram illustrating a configuration of a video encoding apparatus according to Embodiment 2.

FIG. 5 is a block diagram illustrating a configuration of a video encoding apparatus according to Embodiment 2.

Video encoding apparatus 1300 encodes an input video/image on a per block basis to generate an encoded bitstream to be output. As illustrated in FIG. 5, video encoding apparatus 1300 includes: transformer 1301; quantizer 1302; inverse quantizer 1303; inverse transformer 1304; block memory 1305; intra predictor 1306; picture memory 1307; motion vector predictor 1308; block memory 1309; extractor 1310; categorizer 1311; selector 1312; interpolator 1313; inter predictor 1314; entropy encoder 1315; and adders 1316 and 1317. Here, the respective constituent elements of video encoding apparatus 1300 are described.

The input video is input to adder 1316, and a residual video/image is output to transformer 1301.

Transformer 1301 transforms the residual video/image into frequency coefficients, and outputs the resulting frequency coefficients to quantizer 1302.

Quantizer 1302 quantizes the input frequency coefficients, and outputs the resulting quantized coefficients to inverse quantizer 1303 and entropy encoder 1315.

Entropy encoder 1315 encodes the quantized coefficients output from quantizer 1302, and outputs an encoded bitstream.

Inverse quantizer 1303 performs inverse quantization on the quantized coefficients output from quantizer 1302, and outputs the frequency coefficients to inverse transformer 1304.

Inverse transformer 1304 performs inverse frequency transform on the frequency coefficients to transform the frequency coefficients into a residual video/image, and outputs the resulting residual video/image to adder 1317.

Adder 1317 adds the residual video/image output from inverse transformer 1304 and a predictive video/image output from either inter predictor 1314 or intra predictor 1306, and outputs the resulting reconstructed video/image to either block memory 1305 or picture memory 1307 for further prediction.

Each of inter predictor 1314 and intra predictor 1306 generates, for example, the predictive video/image which is closest to the input video/image, by referring to a reconstructed video/image stored in either block memory 1305 or picture memory 1307.

Block memory 1309 extracts reconstructed image samples 1320 which are an N×M (for example, 8×8) pixel block from picture memory 1307 using a motion vector output from motion vector predictor 1308. Block memory 1309 transmits reconstructed image samples 1321 and 1322 each of which is an N×M pixel block to extractor 1310 and interpolator 1313, respectively. Each of reconstructed image samples of the N×M pixel block corresponds to a reconstructed pixel group.

Extractor 1310 extracts one or more features 1323 (for example, variance, SIFT) from reconstructed image samples 1321 of the N×M pixel block, and outputs extracted features 1323 to categorizes 1311.

Categorizer 1311 categorizes reconstructed image samples 1321 of the N×M pixel block using features 1323 and a machine learning model (for example, a support vector machine). In this way, the index indicated as a result of categorizing reconstructed image samples 1321 of the N×M pixel block out of a plurality of indexes, and selected index 1324 is transmitted to selector 1312.

Selector 1312 selects one filter coefficient set 1325 out of a plurality of predefined filter coefficients using index 1324. In other words, selector 1312 selects filter coefficient set 1325 corresponding to index 1324. Selector 1312 then outputs selected filter coefficient set 1325 to interpolator 1313.

Interpolator 1313 performs an interpolation process on reconstructed image samples of a reference block using filter coefficient set 1325, and outputs interpolated image samples 1326 to inter predictor 1314.

[Operations Performed by Video Encoding Apparatus]

Figure 6:
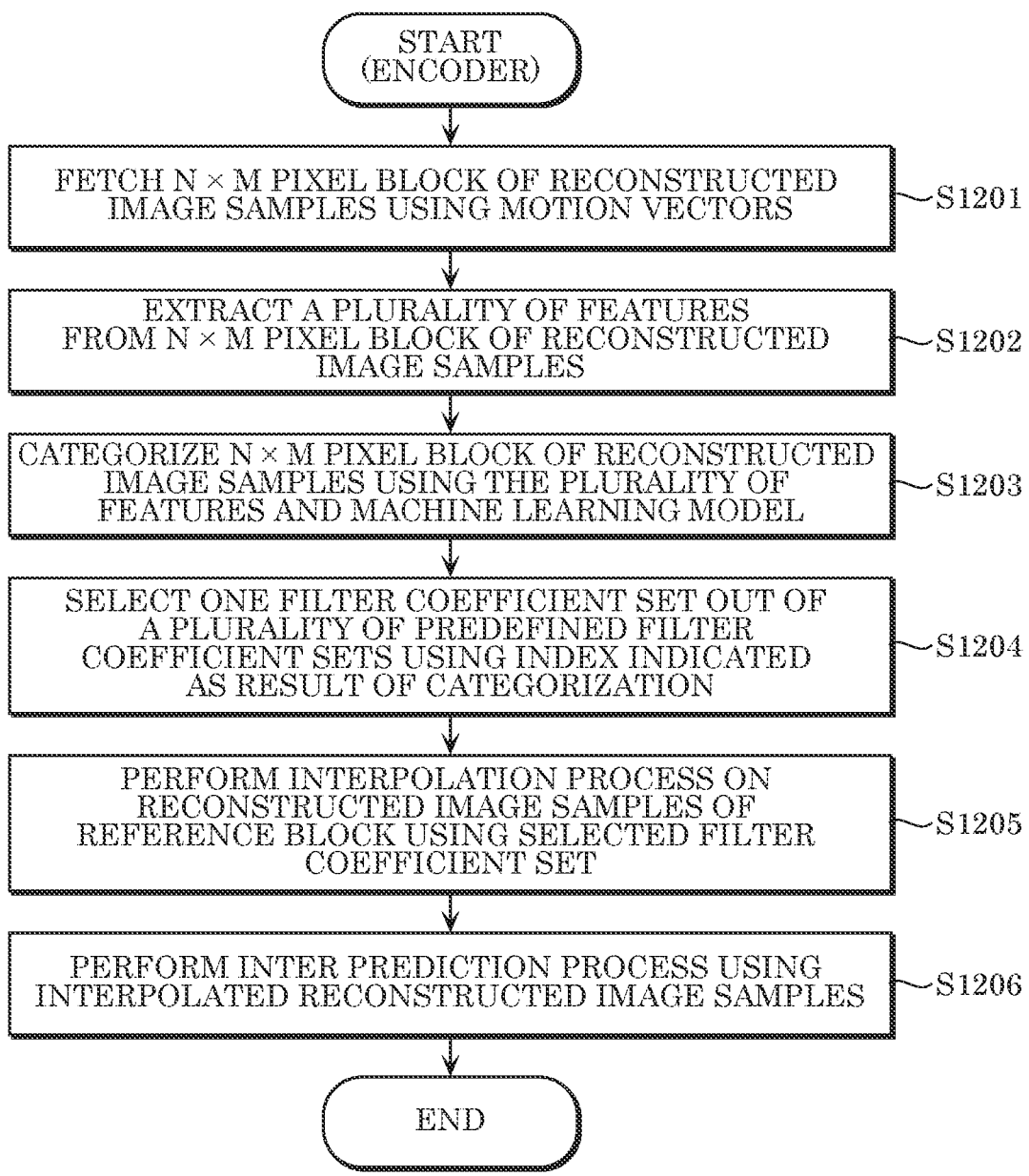
FIG. 6 is a flowchart indicating processes performed by a video encoding apparatus according to Embodiment 2.

Next, descriptions are given of operations performed by video encoding apparatus 1300 configured as described above. FIG. 6 is a flowchart indicating processes performed by a video encoding apparatus according to Embodiment 2.

First, in Step S1201, block memory 1309 fetches an N×M pixel block of reconstructed image samples from picture memory 1307 using motion vectors. The N×M pixel block is, for example, a 9×9 pixel block including a reference block which is an 8×8 pixel block.

Figure 7:
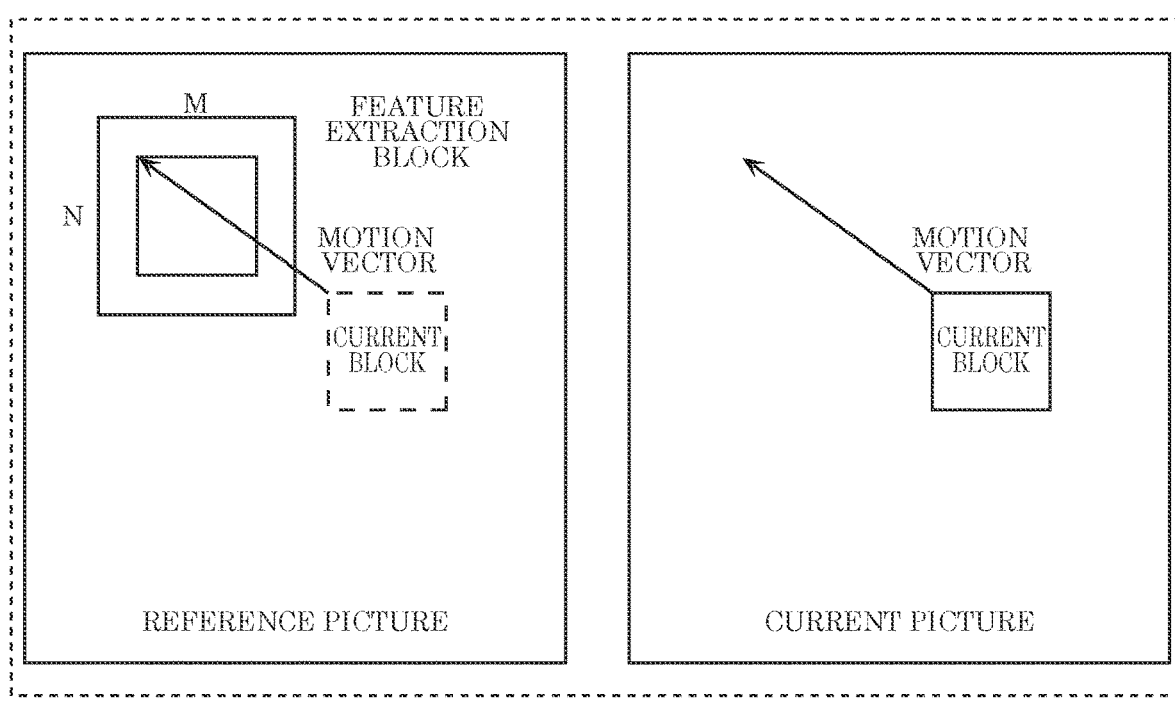
FIG. 7 is a diagram indicating an example of an interpolation filter coefficients according to Embodiment 2.

Next, in Step S1202, extractor 1310 extracts one or more features from an N×M pixel block of reconstructed image samples. FIG. 7 illustrates an example of N×M pixel block to be used for extracting features. At least part of an N×M pixel block of reconstructed image samples (reconstructed pixel groups) is included in a reference block to be derived from a reference picture using a motion vector. In the example of FIG. 7, the N×M pixel block includes the reference block.

Next, in Step S1203, categorizer 1311 categorizes an N×M pixel block of reconstructed image samples using the extracted one or more features and a machine learning model. Categorizer 1311 then selects the index indicated as a result of categorizing the N×M pixel block of reconstructed image samples out of a plurality of predefined indexes.

Next, in Step S1204, selector 1312 selects one filter coefficient set out of a plurality of predefined filter coefficient sets using the selected index.

Figure 8:
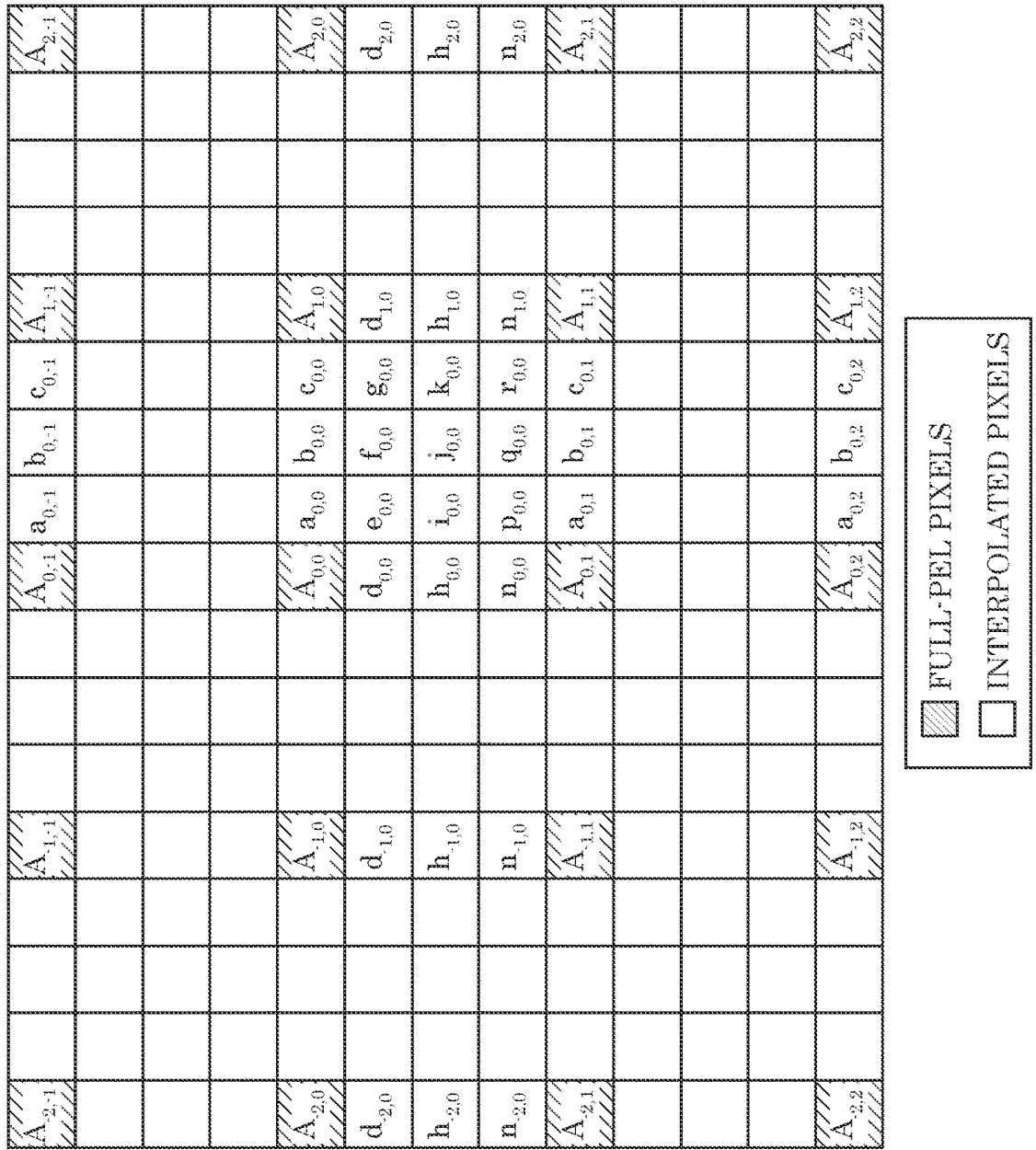
FIG. 8 is a diagram for illustrating filter coefficient sets for use in an interpolation process.

FIG. 8 is a diagram for illustrating filter coefficient sets for use in an interpolation process. In FIG. 8, each of the rectangles represents a pixel, and the numerals in the rectangle represent pixel values (for example, a luminance value, a chrominance value). At this time, the pixel values of interpolated pixels are represented according to Expressions below.

$$a_{0,0} = \left[ \begin{array}{c} (A_{3,0} \times W_{a0}) + (A_{2,0} \times W_{a1}) + (A_{1,0} \times W_{a2}) + \\ (A_{0,0} \times W_{a3}) + (A_{1,0} \times W_{a4}) + (A_{2,0} \times W_{a5}) + \\ (A_{3,0} \times W_{a6}) + (A_{4,0} \times W_{a7}) \end{array} \right] \bigg/ \qquad \text{[Math. 1]}$$

divisor_a $$b_{0,0} = \left[ \begin{array}{c} (A_{-3,0} \times W_{b0}) + (A_{-2,0} \times W_{b1}) + (A_{-1,0} \times W_{b2}) + \\ (A_{0,0} \times W_{b3}) + (A_{1,0} \times W_{b4}) + (A_{2,0} \times W_{b5}) + \\ (A_{3,0} \times W_{b6}) + (A_{4,0} \times W_{b7}) \end{array} \right] \bigg/$$

divisor_b $$d_{0,0} = \left[ \begin{array}{c} (A_{0,-3} \times W_{d0}) + (A_{0,-2} \times W_{d1}) + (A_{0,-1} \times W_{d2}) + \\ (A_{0,0} \times W_{d3}) + (A_{0,1} \times W_{d4}) + (A_{0,2} \times W_{d5}) + \\ (A_{0,3} \times W_{d6}) + (A_{0,4} \times W_{d7}) \end{array} \right] \bigg/$$

divisor_d

Here, $W_{ai=0.7}$, divisor_a, $W_{bi=0.7}$, divisor_b, $W_{di=0.7}$, and divisor_d are a predefined filter coefficient set. It should be noted that filter coefficient sets are not limited to the above one. For example, the filter coefficient set may be coefficients obtained from a non-linear function such as a Sigmoid function. In addition, in an interpolation process, a weighted sum of product of luminance values/chrominance values of neighboring pixels may be used instead of a simple weighted sum of the luminance values/chrominance values.

Next, in Step S1205, interpolator 1313 performs an interpolation process on image samples of a reference block using the selected filter coefficient set.

Lastly, in Step S1206, inter predictor 1314 performs an inter prediction process in the encoding process using the interpolated pixel samples.

[Configuration of Video Decoding Apparatus]

Figure 9:
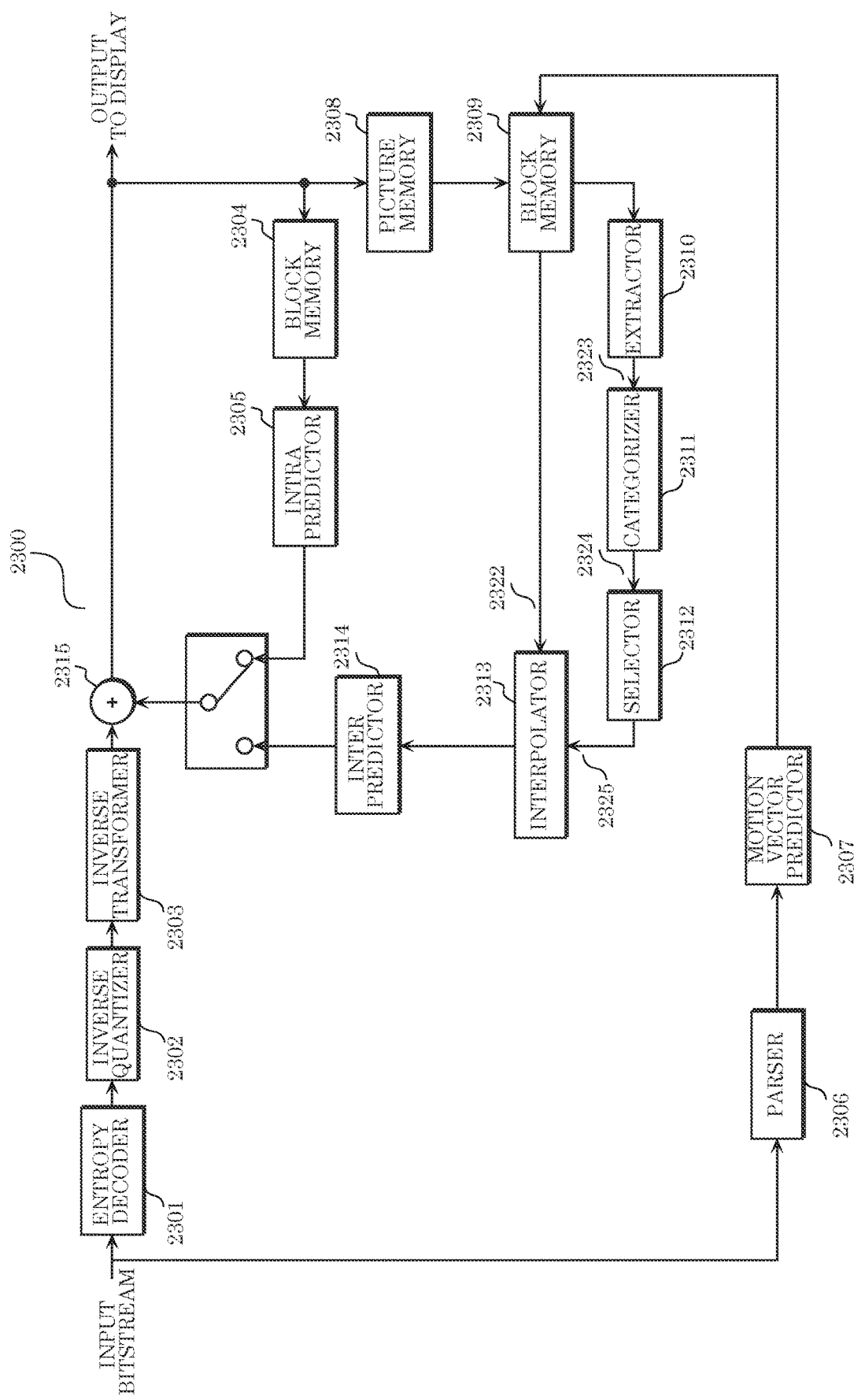
FIG. 9 is a block diagram illustrating a configuration of the video decoding apparatus according to Embodiment 2.

Next, descriptions are given of a configuration of a video decoding apparatus for decoding an encoded bitstream output from video encoding apparatus 1300 as described above. FIG. 9 is a block diagram illustrating the configuration of the video decoding apparatus according to Embodiment 2.

Video decoding apparatus 2300 decodes an input encoded bitstream on a per block basis, and outputs a video/an image. As illustrated in FIG. 9, video decoding apparatus 2300 includes; entropy decoder 2301; inverse quantizer 2302; inverse transformer 2303; block memory 2304; intra predictor 2305; parser 2306; motion vector predictor 2307; picture memory 2308; block memory 2309; extractor 2310; categorizer 2311; selector 2312; interpolator 2313; and inter predictor 2314. Here, the respective constituent elements of video decoding apparatus 2300 are described.

The encoded bitstream is input to entropy decoder 2301. After the encoded bitstream is input to entropy decoder 2301, entropy decoder 2301 decodes the input encoded bitstream, and outputs quantized coefficients to inverse quantizer 2302.

Inverse quantizer 2302 performs inverse quantization on the quantized coefficients, and outputs frequency coefficients to inverse transformer 2303.

Inverse transformer 2303 performs inverse frequency transform on the frequency coefficients to transform the frequency coefficients into a residual video/image, and outputs the resulting residual video/image to adder 2315.

Adder 2315 adds the resulting residual video/image and a predictive video/image output from either intra predictor 2305 or inter predictor 2314 (that is, a predictive block or predictive samples for a current block), and outputs the resulting reconstructed video/image to a display and also outputs it to either block memory 2304 or picture memory 2308.

Each of intra predictor 2305 and inter predictor 2314 generates, for example, the predictive video/image which is closest to the decoded video/image, by referring to a reconstructed video/image stored in either block memory 2304 or picture memory 2308.

Parser 2306 parses the input bitstream, and outputs, to motion vector predictor 2307, residual sample blocks, reference indexes indicating reference pictures to be used in inter prediction, and motion information such as motion vector differences.

Motion vector predictor 2307 derives a motion vector predictor. Motion vector predictor 2307 derives the motion vector predictor for a current block, based on the motion information parsed by parser 2306 and the motion vector predictor. Motion vector predictor 2307 then outputs a signal indicating the derived motion vector to block memory 2309.

Block memory 2309 extracts reconstructed image samples 2320 of an N×M (for example, 9×9) pixel block from picture memory 2308 using the motion vector output from motion vector predictor 2307. Block memory 2309 transmits reconstructed image samples 2321 and 2322 of an N×M pixel block to extractor 1310 and interpolator 1313, respectively.

Extractor 2310 extracts one or more features 2323 (for example, variance, SIFT) from reconstructed image samples 2321 of the N×M pixel block. Extractor 2310 then outputs extracted features 2323 to categorizer 2311. Features 2303 extracted by extractor 2310 are the same as features 1323 extracted by extractor 1310 of video encoding apparatus 1300 illustrated in FIG. 5.

Categorizer 2311 categorizes reconstructed image samples 2321 of the N×M pixel block using features 2323 and a machine learning model (for example, a support vector machine). Categorizer 2311 then selects index 2324 indicated as a result of categorizing the N×M pixel block of reconstructed image samples 2321 out of a plurality of predefined indexes. Furthermore, categorizer 2311 transmits index 2324 to selector 2312.

Selector 2312 selects one filter coefficient set 2325 out of a plurality of predefined filter coefficient sets using index 2324. Selector 2312 then outputs selected filter coefficient set 2325 to interpolator 2313.

Interpolator 2313 performs an interpolation process on reconstructed image samples of a reference block using filter coefficient set 2325, and outputs interpolated image samples 2326 to inter predictor 2314.

[Operations Performed by Video Decoding Apparatus]

Figure 10:
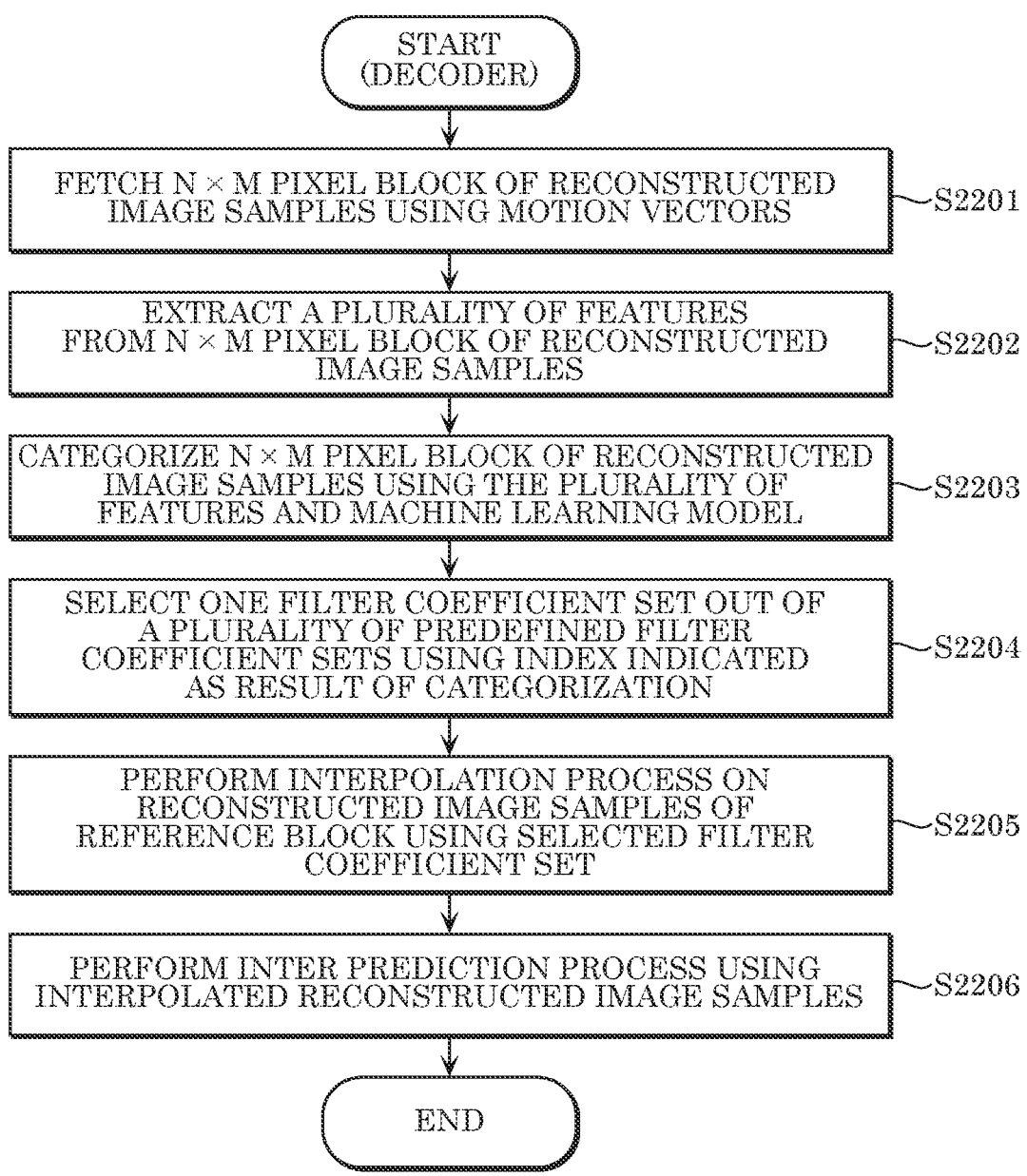
FIG. 10 is a flowchart indicating processes performed by a video decoding apparatus according to Embodiment 2.

Next, descriptions are given of operations performed by video decoding apparatus 2300 configured as described above. FIG. 10 is a flowchart indicating processes performed by a video decoding apparatus according to Embodiment 2.

First, in Step S2201, block memory 2309 fetches an N×M pixel block of reconstructed image samples included in a reference picture using a motion vector. The N×M pixel block is, for example, a 9×9 pixel block.

Next, in Step S2202, extractor 2310 extracts one or more features from the N×M pixel block of reconstructed image samples. FIG. 7 illustrates an example of a reconstructed image sample block to be used for extracting features.

Next, in Step S2203, categorizer 2311 categorizes the N×M pixel block of reconstructed image samples using extracted one or more features and a machine learning model. Categorizer 2311 then selects the index indicated as a result of categorizing the N×M pixel block of reconstructed image samples out of a plurality of predefined indexes. The machine learning model used here is the same as the machine learning model used in video encoding apparatus 1300.

Next, in Step S2204, selector 2312 selects one filter coefficient set out of a plurality of predefined filter coefficient sets using the selected index. The filter coefficient set used here is the same as the filter coefficient set selected in video encoding apparatus 1300 in the encoding process.

Next, in Step S2205, interpolator 2313 performs an interpolation process on image samples of a reference block using the selected filter coefficient set.

Lastly in Step S2206, inter predictor 2314 uses the interpolated image samples in an inter prediction process in the decoding process.

[Effects]

As described above, each of video encoding apparatus 1300 and video decoding apparatus 2300 according to this embodiment makes it possible to obtain the filter coefficient set to be used in the interpolation process of the image pixels in the inter prediction, using the machine learning model.

Accordingly, it is possible to perform mapping from a first dimension representing either luminance or chrominance values in the current reconstructed pixel groups or the features extracted from the current reconstructed pixel groups to a second dimension having an axis different from that of the first dimension and thus more appropriate for the prediction or encoding of the current reconstructed pixel groups, thereby determining the filter coefficients to be used in the interpolation process. This makes it possible to re-set a more appropriate axis according to the pixels in an image in which a non-linear change that is sharper than the surroundings appears, which makes it possible to perform the interpolation process to obtain an image closer to the original image.

In addition, even when any information indicating the filter coefficient set itself is not included in the bitstream, it is possible to obtain the filter coefficient using the one or more features and the machine learning model, and to reduce the code amount of the filter coefficients etc.

Furthermore, when a plurality of features are used, it is possible to perform the encoding/decoding process(es) on the current block using the filter coefficients more suitable for the current block than in the case where a single feature (for example, a luminance value, or the like) is used. Thus, it is possible to improve the encoding efficiency.

Embodiment 3

Next, Embodiment 3 is described. In Embodiment 3, descriptions are given of a case where a parameter set which is selected using a machine learning model is a filter coefficient set to be used in an in-loop filtering process. This embodiment is described hereinafter mainly focusing on the differences from Embodiments 1 and 2.

[Configuration of Video Encoding Apparatus]

Figure 11:
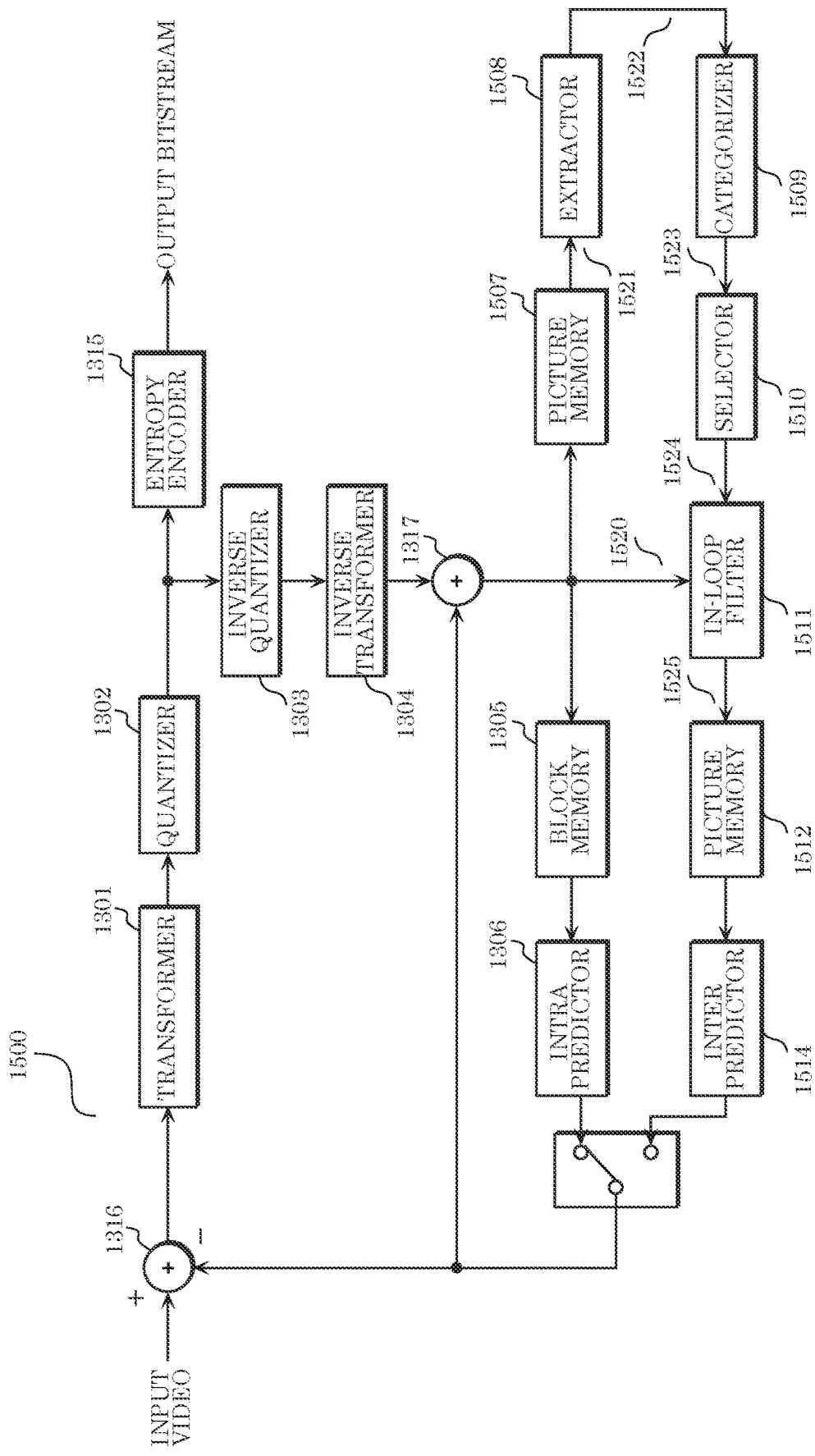
FIG. 11 is a block diagram illustrating a configuration of a video encoding apparatus according to Embodiment 3.

FIG. 11 is a block diagram illustrating a configuration of a video encoding apparatus according to Embodiment 3. It is to be noted that substantially the same constituent elements in FIG. 11 as those in FIG. 5 are assigned the same reference numerals, and descriptions thereof are omitted where appropriate.

Video encoding apparatus 1500 encodes an input video/image on a per block basis to generate an encoded bitstream to be output. As illustrated in FIG. 11, video encoding apparatus 1500 includes: transformer 1301; quantizer 1302; inverse quantizer 1303; inverse transformer 1304; block memory 1305; intra predictor 1306; picture memory 1507; extractor 1508; categorizer 1509; selector 1510; in-loop filter 1511; picture memory 1512; inter predictor 1514; entropy encoder 1315; and adders 1316 and 1317. Here, the respective constituent elements of video encoding apparatus 1500 are described.

Picture memory 1507 transmits reconstructed pixel group 1521 including reconstructed image samples of a current block to extractor 1508.

Extractor 1508 extracts one or more features 1522 from reconstructed pixel groups 1521 (for example, variance, SIFT). Extractor 1508 then outputs extracted features 1522 to categorizer 1509.

Categorizer 1509 categorizes reconstructed pixel groups 1521 using features 1522 and a machine learning model (such as a support vector machine). Categorizer 1509 then selects index 1523 indicated as a result of categorizing reconstructed pixel groups 1521 out of a plurality of predefined indexes. Furthermore, categorizer 1509 transmits index 1523 to selector 1510.

Selector 1510 selects one filter coefficient set 1524 out of a plurality of predefined filter coefficient sets using index 1523. Selector 1510 then outputs selected filter coefficient set 1524 to in-loop filter 1511.

In-loop filter 1511 performs a filtering process on reconstructed image samples 1520 in a current block using filter coefficient set 1524, and stores filtered reconstructed image samples 1525 to picture memory 1512 for an inter prediction process.

[Operations Performed by Video Encoding Apparatus]

Figure 12:
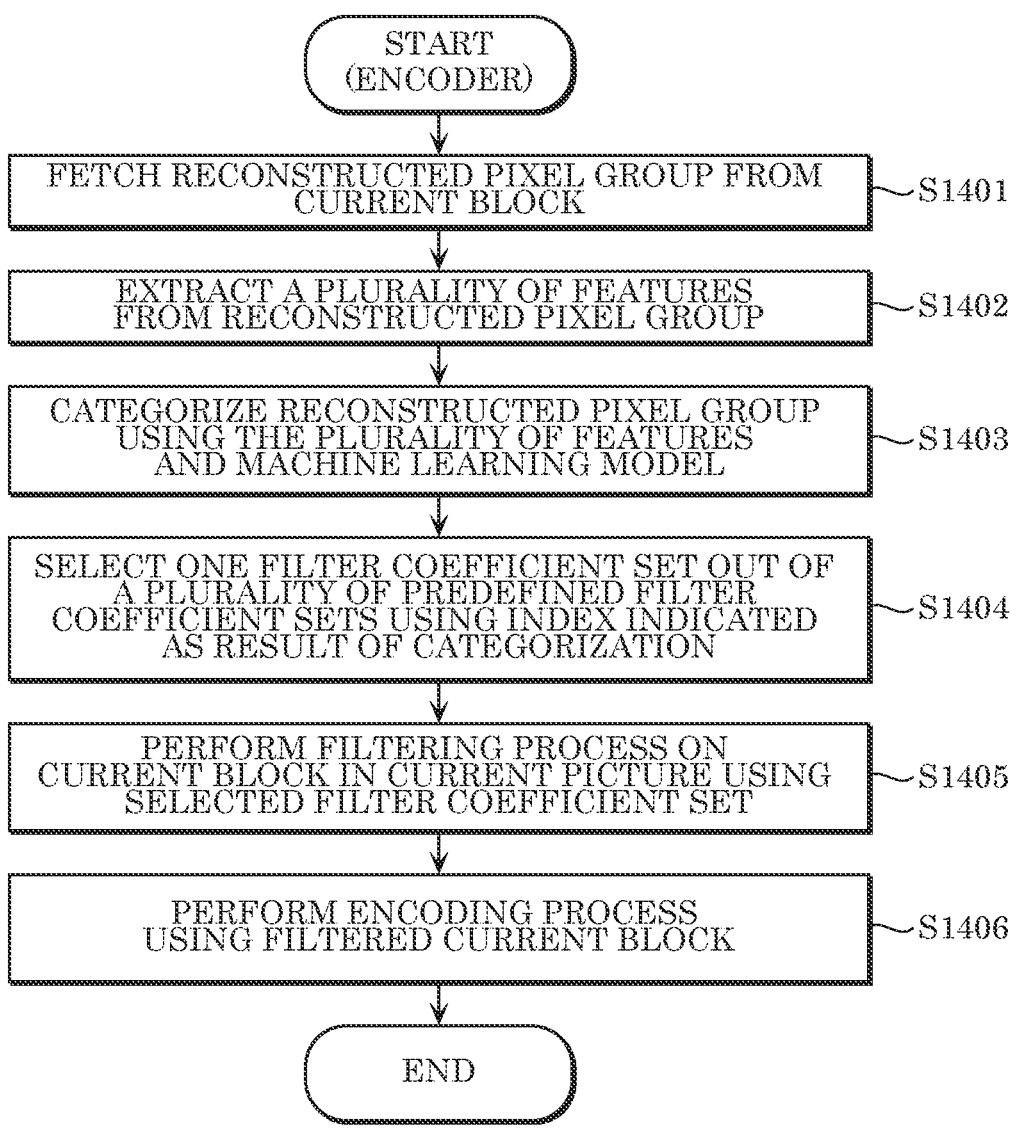
FIG. 12 is a flowchart indicating processes performed by a video encoding apparatus according to Embodiment 3.

Next, descriptions are given of operations performed by video encoding apparatus 1500 configured as described above. FIG. 12 is a flowchart indicating processes performed by a video encoding apparatus according to Embodiment 3.

First, in Step 1401, extractor 1508 fetches a reconstructed pixel group including image samples of a current block from picture memory 1507.

Next, in Step S1402, extractor 1508 extracts one or more features from the reconstructed pixel group.

Next, in Step S1403, categorizer 1509 categorizes the reconstructed pixel group using the extracted one or more features and a machine learning model. Categorizer 1509 then selects the index indicated as a result of categorizing the reconstructed pixel group out of a plurality of predefined indexes.

Next, in Step S1404, selector 1510 selects one filter coefficient set out of a plurality of predefined filter coefficient sets using the selected index.

In Step S1405, in-loop filter 1511 performs an in-loop filtering process on the image samples of the current block included in the current picture using the selected filter coefficient set. Examples of such in-loop filtering processes include, a deblocking filtering process and a sample adaptive offset (SAO) process.

Lastly in Step S1406, in-loop filter 1511 outputs the filtered image samples of the current block to picture memory 1512. The filtered image samples of the current block output to picture memory 1512 are used for inter prediction of a picture following the current picture in encoding order.

[Configuration of Video Decoding Apparatus]

Figure 13:
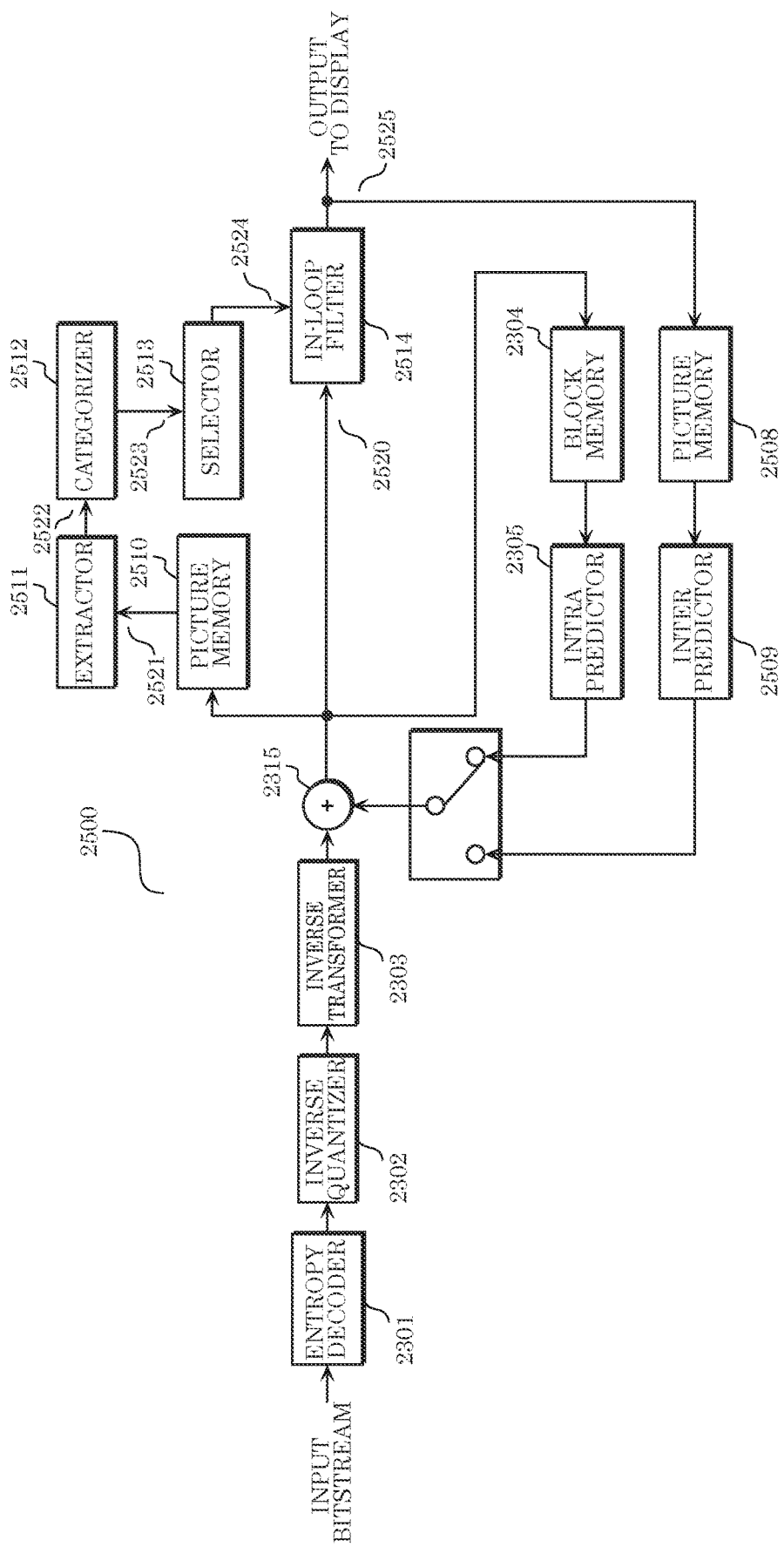
FIG. 13 is a block diagram illustrating a configuration of the video decoding apparatus according to Embodiment 3.

Next, descriptions are given of a configuration of a video decoding apparatus for decoding an encoded bitstream output from video encoding apparatus 1500 as described above. FIG. 13 is a block diagram illustrating the configuration of the video decoding apparatus according to Embodiment 3. It is to be noted that substantially the same constituent elements in FIG. 13 as those in FIG. 9 are assigned the same reference numerals, and descriptions thereof are omitted where appropriate.

Video decoding apparatus 2500 decodes an input encoded bitstream on a per block basis, and outputs a video/an image. As illustrated in FIG. 13, video decoding apparatus 2500 includes: entropy decoder 2301; inverse quantizer 2302; inverse transformer 2303; block memory 2304; intra predictor 2305; picture memory 2508; inter predictor 2509; picture memory 2510; extractor 2511; categorizer 2512; selector 2513; in-loop filter 2514; and adder 2315.

Picture memory 2510 transmits reconstructed pixel group 2521 including the reconstructed image samples of the current block to extractor 2511.

Extractor 2511 extracts one or more features 2522 (variance, SIFT) from reconstructed pixel group 2521, and outputs features 2522 to categorizer 2512.

Categorizer 2512 categorizes reconstructed pixel group 2521 using features 2522 and a machine learning model (for example, a support vector machine). Categorizer 2512 then selects index 2523 indicated as a result of categorizing reconstructed pixel group 2521 out of a plurality of predefined indexes, and transmits selected index 2523 to selector 2513.

Selector 2513 selects one filter coefficient set 2524 out of a plurality of predefined filter coefficient sets using index 2523. Selector 2513 then outputs, to in-loop filter 2514, selected filter coefficient set 2524 and reconstructed image samples 2520 of the current block.

In-loop filter 2514 performs a filtering process on reconstructed image samples 2520 of the current block using filter coefficient set 2524. In-loop filter 2514 then stores filtered image samples 2525 to picture memory 2508 for an inter prediction process, and further outputs it to a display.

[Operations Performed by Video Decoding Apparatus]

Figure 14:
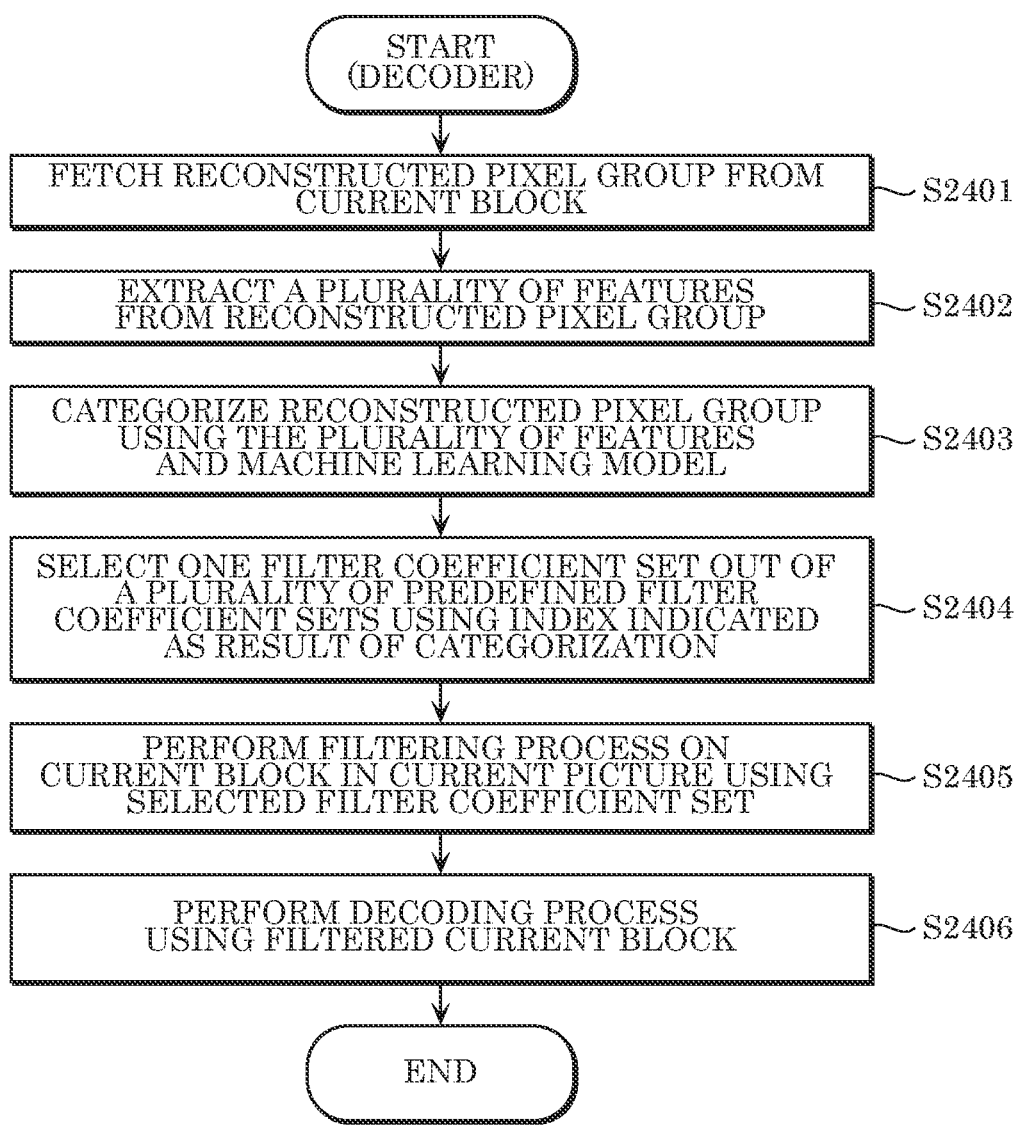
FIG. 14 is a flowchart indicating processes performed by a video decoding apparatus according to Embodiment 3.

Next, descriptions are given of operations performed by video decoding apparatus 2500 configured as described above. FIG. 14 is a flowchart indicating processes performed by a video decoding apparatus according to Embodiment 3.

First, in Step 2401, extractor 2511 fetches a reconstructed pixel group including image samples of a current block from picture memory 2510.

Next, in Step S2402, extractor 2511 extracts one or more features from the extracted reconstructed pixel group. The one or more features extracted here are the same as the one or more features extracted in video encoding apparatus 1500 in the encoding process.

Next, in Step S2403, categorizer 2512 categorizes the reconstructed pixel group using the extracted one or more features and a machine learning model. Categorizer 2512 then selects the index indicated as a result of categorizing the reconstructed pixel group out of a plurality of predefined indexes. The machine learning model used here is the same as the machine learning model used in video encoding apparatus 1500 in the encoding process.

Next, in Step S2404, selector 2513 selects one filter coefficient set out of a plurality of predefined filter coefficient sets using the index. The filter coefficient set used here is the same as the filter coefficient set selected in video encoding apparatus 1500 in the encoding process.

In Step S2405, in-loop filter 2514 performs an in-loop filtering process on the image samples of the current block included in the current picture using the selected filter coefficient set. Examples of such in-loop filtering processes include a deblocking filtering process and a sample adaptive offset (SAO) process.

Lastly, in Step S2406, in-loop filter 2514 outputs the filtered image samples of the current block to the display and picture memory 2508. The filtered image samples of the current block output to picture memory 2508 are used for inter prediction of a picture following the current picture in decoding order.

[Effects]

As described above, each of video encoding apparatus 1500 and video decoding apparatus 2500 according to this embodiment makes it possible to obtain the filter coefficient sets to be used in the filtering process performed on the current block, using the machine learning model. Accordingly Embodiment 3 provides the same effects as those in Embodiment 2.

Embodiment 4

Next, Embodiment 4 is described. In Embodiment 4, descriptions are given of a case where a parameter set which is selected using a machine learning model indicates an intra prediction method. This embodiment is described hereinafter mainly focusing on the differences from Embodiments 1 to 3.

[Configuration of Video Encoding Apparatus]

Figure 15:
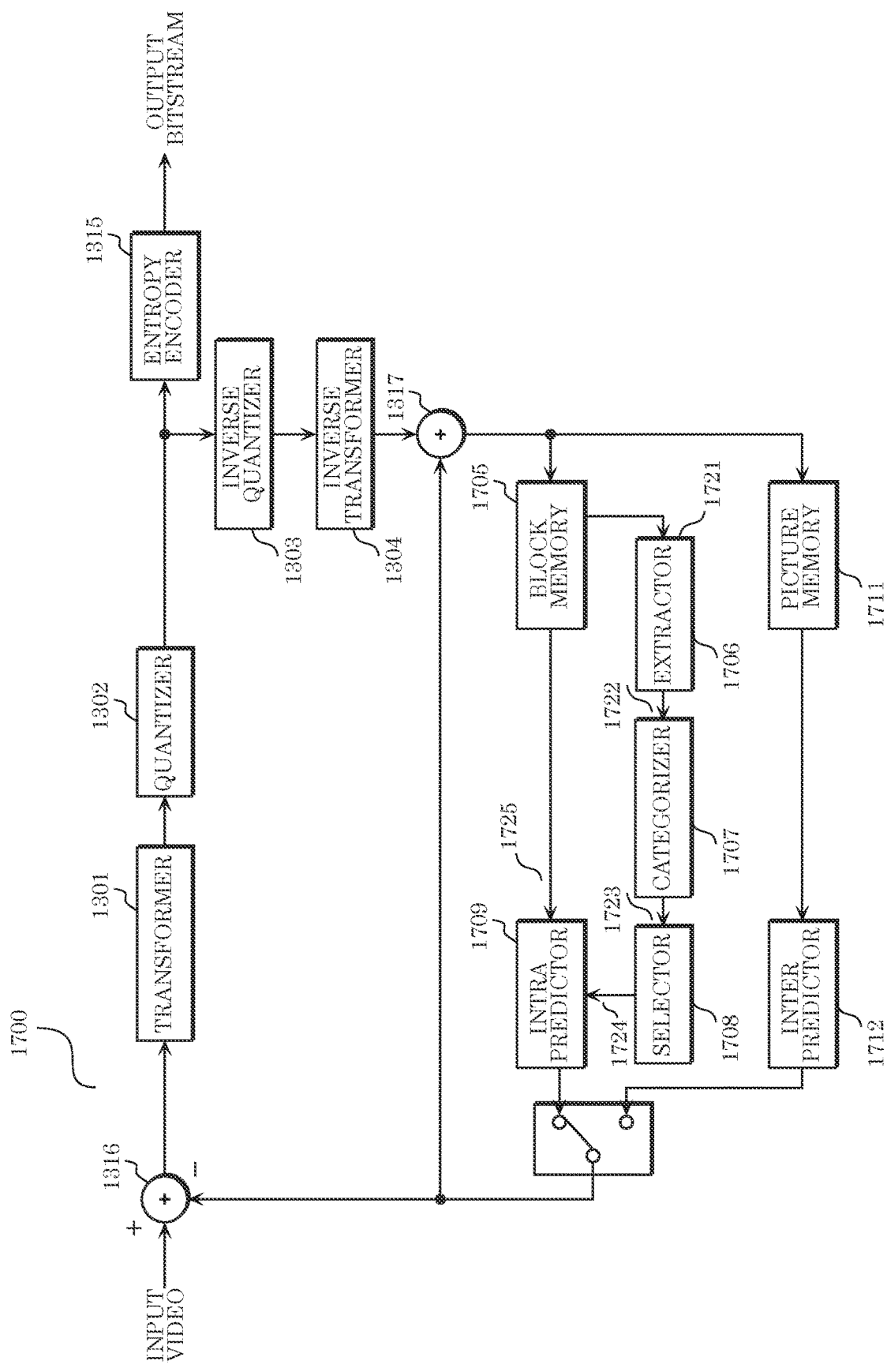
FIG. 15 is a block diagram illustrating a configuration of a video encoding apparatus according to Embodiment 4.

FIG. 15 is a block diagram illustrating a configuration of a video encoding apparatus according to Embodiment 4. It is to be noted that substantially the same constituent elements in FIG. 15 as those in FIG. 5 are assigned the same reference numerals, and descriptions thereof are omitted where appropriate.

Video encoding apparatus 1700 encodes an input video/image on a per block basis to generate an encoded bitstream to be output. As illustrated in FIG. 15, video encoding apparatus 1700 includes: transformer 1301; quantizer 1302; inverse quantizer 1303; inverse transformer 1304; block memory 1705; extractor 1706; categorizer 1707; selector 1708; intra predictor 1709; picture memory 1307; inter predictor 1712; entropy encoder 1713; and adders 1316 and 1317.

Block memory 1705 transmits reconstructed pixel group 1721 which is spatially neighboring the current block to extractor 1706.

Extractor 1706 extracts one or more features 1722 (variance, SIFT) from reconstructed pixel group 1721, and outputs features 1772 to categorizer 1707.

Categorizer 1707 categorizes reconstructed pixel group 1721 using features 1722 and a machine learning model (for example, a support vector machine). Categorizer 1707 then selects index 1723 indicated as a result of categorizing reconstructed pixel group 1721 out of a plurality of predefined indexes, and transmits selected index 1723 to selector 1708.

Selector 1708 selects one ultra prediction method 1724 from a plurality of predefined intra prediction methods using index 1723. Selector 1708 outputs selected intra prediction method 1724 and image samples 1725 of the current block to intra predictor 1709.

Intra predictor 1709 performs intra prediction for the current block according to selected intra prediction method 1724, and outputs the intra predictive image samples of the current block to adders 1316 and 1317.

Inter predictor 1712 generates the inter predictive image samples of the current block by referring to a picture stored in picture memory 1307, and outputs the inter predictive image samples to adders 1316 and 1317.

[Operations Performed by Video Encoding Apparatus]

Figure 16:
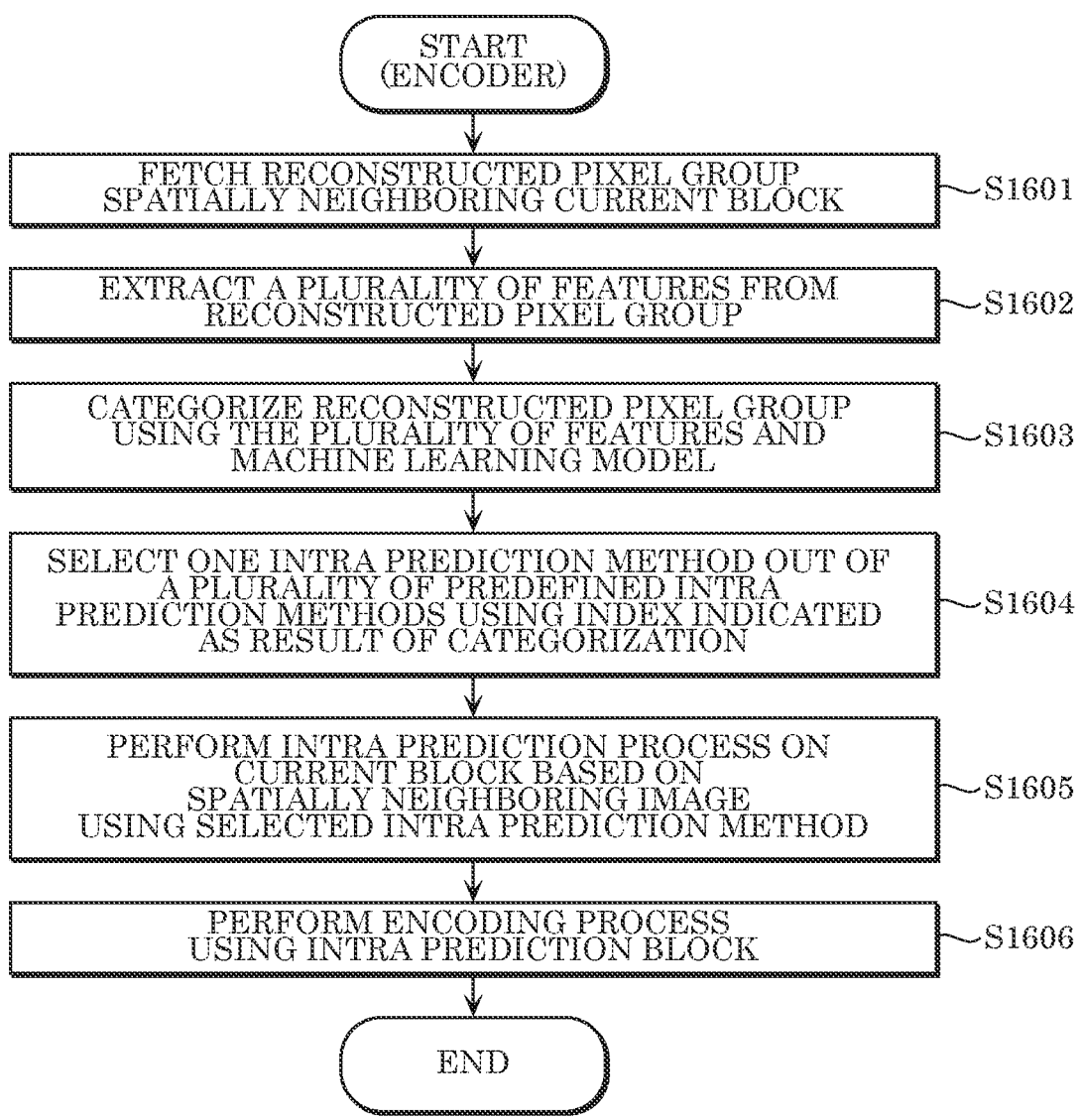
FIG. 16 is a flowchart indicating processes performed by a video encoding apparatus according to Embodiment 4.

Next, descriptions are given of operations performed by video encoding apparatus 1700 configured as described above. FIG. 16 is a flowchart indicating processes performed by a video encoding apparatus according to Embodiment 4.

Figure 17A:
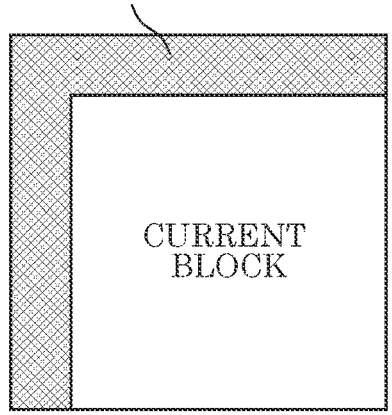
FIG. 17A is a diagram illustrating an example of positions of pixels spatially neighboring a current block.
Figure 17B:
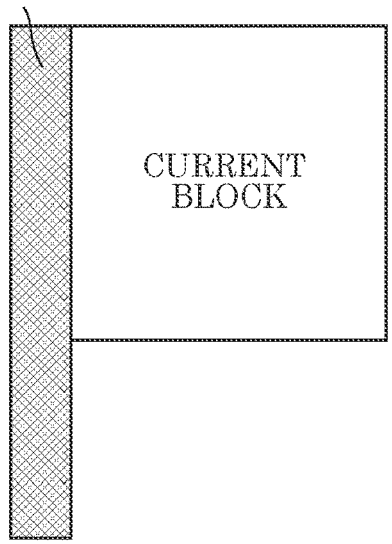
FIG. 17B is a diagram illustrating another example of positions of pixels spatially neighboring a current block.
Figure 17C:
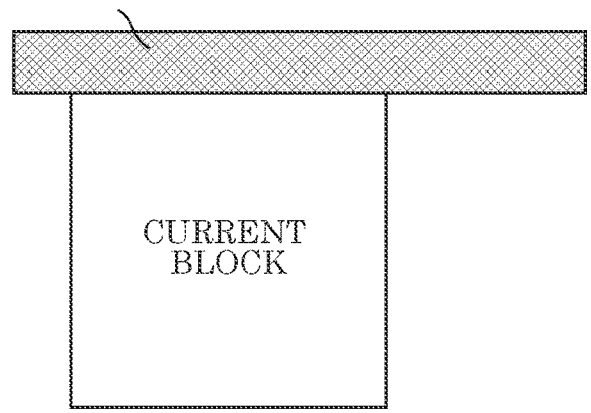
FIG. 17C is a diagram illustrating another example of positions of pixels spatially neighboring a current block.

First, in Step S1601, extractor 1706 extracts a reconstructed pixel group of pixels spatially neighboring the current block. Each of FIGS. 17A to 17C indicates an example of the positions of the pixels spatially neighboring the current block.

Next, in Step S1602, extractor 1706 extracts one or more features from the reconstructed pixel group.

Next, in Step S1603, categorizer 1707 categorizes the reconstructed pixel group using the extracted one or more features and a machine learning model. Categorizer 1707 then selects the index indicated as a result of categorizing the reconstructed pixel group out of a plurality of predefined indexes.

Figure 18:
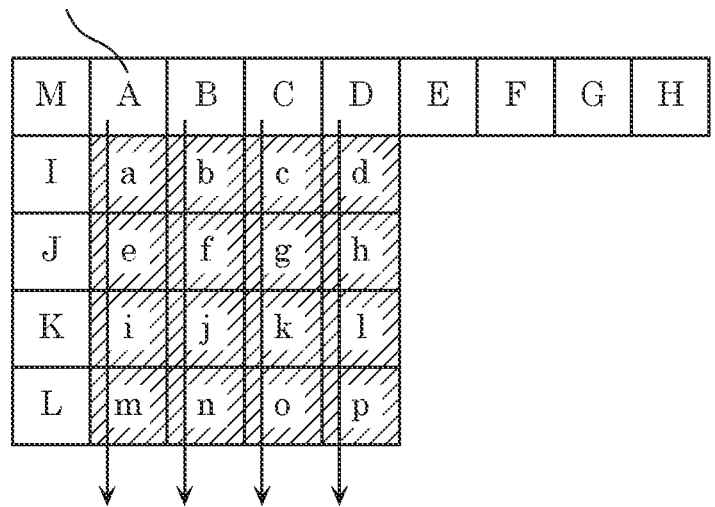
FIG. 18 is a diagram illustrating an example of an intra prediction method.
Figure 19:
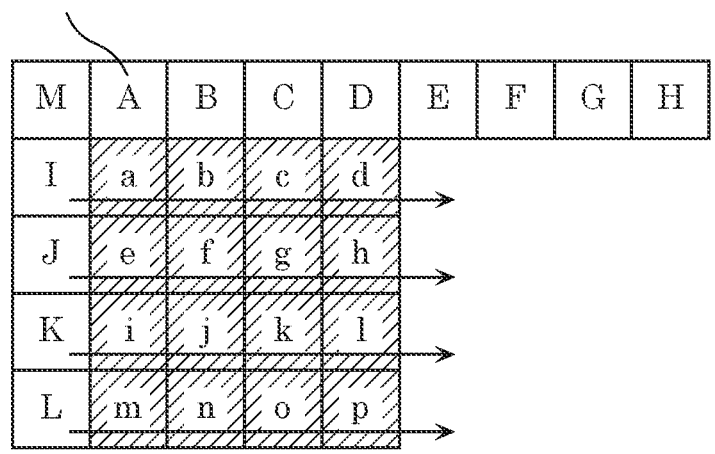
FIG. 19 is a diagram illustrating another example of an intra prediction method.

In Step S1604, selector 1708 selects one intra prediction method out of predefined intra prediction methods using the selected index. FIGS. 18 and 19 indicate examples of intra prediction methods.

In Step S1605, intra predictor 1709 performs an intra prediction process on the current block using the selected intra prediction method.

Lastly, in Step S1606, adders 1316 and 1317 generate residual image samples and reconstructed image samples of the current block, using intra predictive image samples for the current block.

[Configuration of Video Decoding Apparatus]

Figure 20:
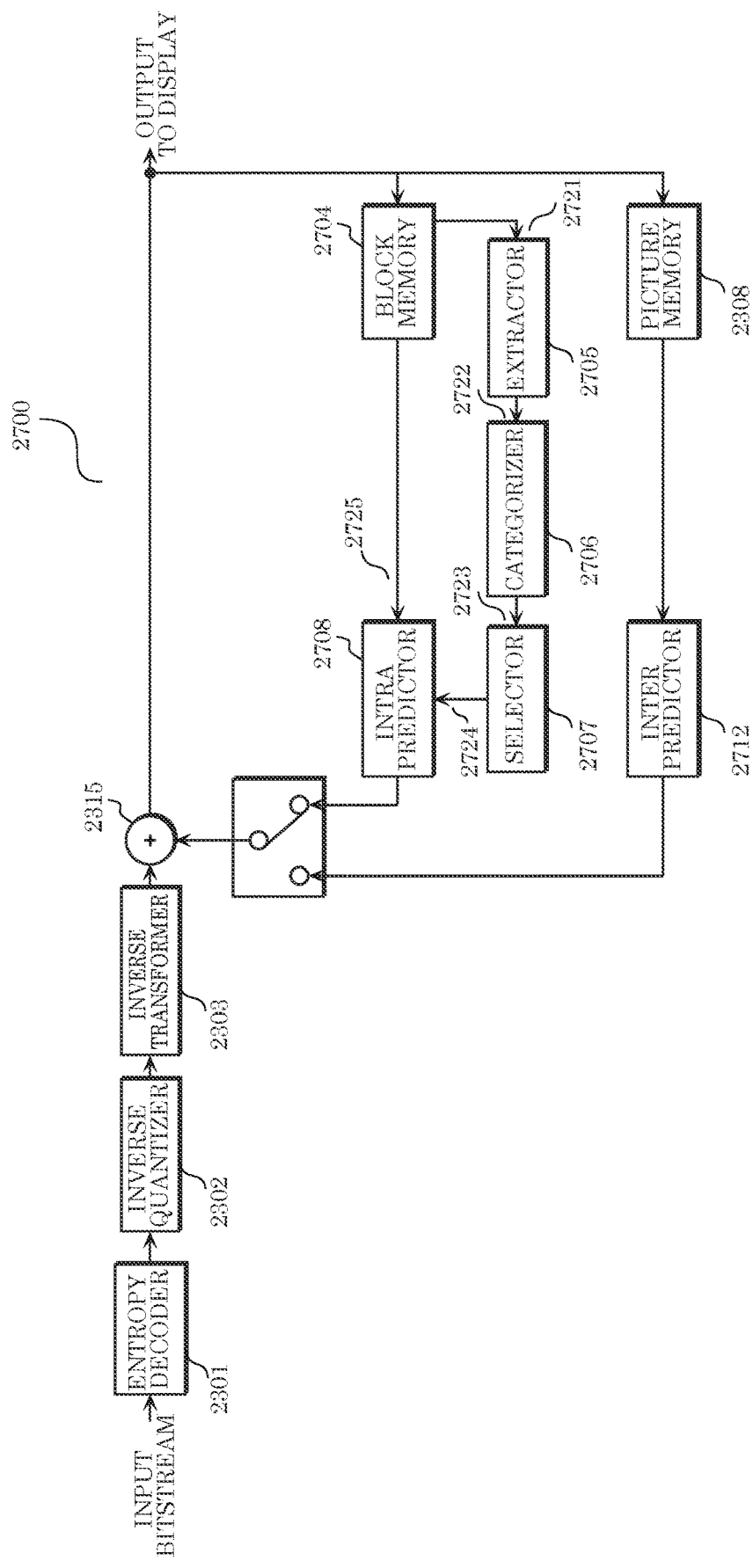
FIG. 20 is a block diagram illustrating a configuration of the video decoding apparatus according to Embodiment 4.

Next, descriptions are given of a configuration of a video decoding apparatus for decoding an encoded bitstream output from video encoding apparatus 1700 as described above. FIG. 20 is a block diagram illustrating the configuration of the video decoding apparatus according to Embodiment 4. It is to be noted that substantially the same constituent elements in FIG. 20 as those in FIG. 9 are assigned the same reference numerals, and descriptions thereof are omitted where appropriate.

Video decoding apparatus 2700 decodes an input encoded bitstream on a per block basis, and outputs a video/an image. As illustrated in FIG. 20, video decoding apparatus 2700 includes: entropy decoder 2301; inverse quantizer 2302; inverse transformer 2303; block memory 2704; extractor 2705; categorizer 2706 selector 2707; intra predictor 2708; picture memory 2308; inter predictor 2712; and adder 2315.

Block memory 2704 transmits reconstructed pixel group 2721 which is spatially neighboring the current block to extractor 2705.

Extractor 2705 extracts one or more features 2722 (variance, SIFT) from reconstructed pixel group 2721, and outputs extracted features 2722 to categorizer 2706.

Categorizer 2706 categorizes the reconstructed pixel group using one or more features 2722 and a machine learning model (for example, a support vector machine). Categorizer 2706 then selects index 2723 indicated as a result of categorizing the reconstructed pixel group out of a plurality of predefined indexes, and transmits index 2723 to selector 2707.

Selector 2707 selects one intra prediction method 2724 out of a plurality of predefined intra prediction methods using index 2723. Selector 2707 outputs selected intra prediction method 2724 and image samples 2725 of the current block to intra predictor 2708.

Intra predictor 2708 performs an intra prediction process for the current block according to intra prediction method 2724, and outputs the intra predictive image samples of the current block to adder 2315.

Inter predictor 2712 generates the inter predictive image samples of the current block by referring to a picture stored in picture memory 2308, and outputs the generated inter predictive samples of the current block to adder 2315.

[Operations Performed by Video Decoding Apparatus]

Figure 21:
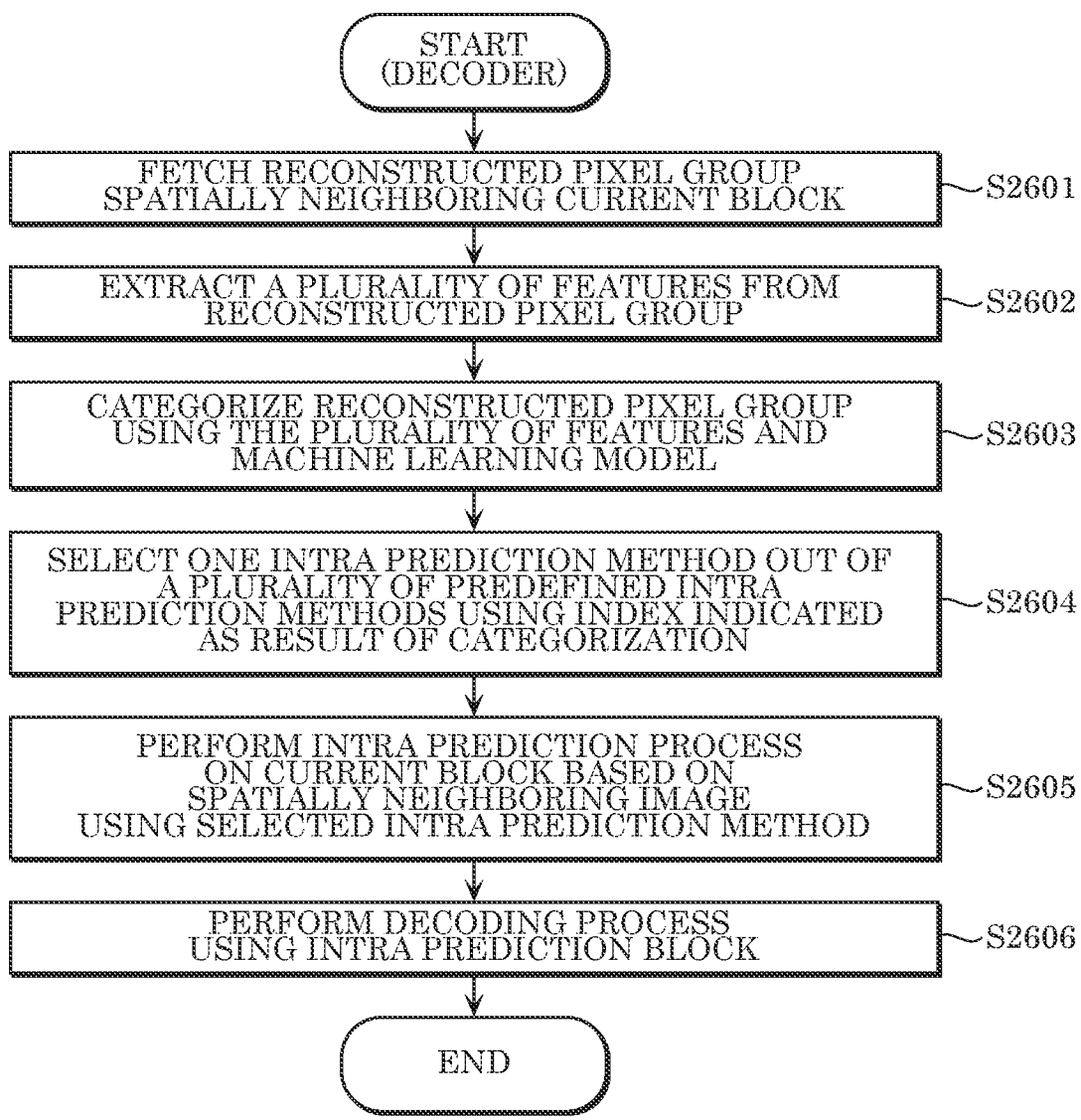
FIG. 21 is a flowchart indicating processes performed by a video decoding apparatus according to Embodiment 4.

Next, descriptions are given of operations performed by video decoding apparatus 2700 configured as described above. FIG. 21 is a flowchart indicating processes performed by a video decoding apparatus according to Embodiment 4.

First, in Step S2601, extractor 2705 extracts a reconstructed pixel group of pixels spatially neighboring a current block from block memory 2704. Each of FIGS. 17A to 17C indicates an example of the positions of the pixels spatially neighboring the current block.

Next, in Step S2602, extractor 2705 extracts one or more features from the reconstructed pixel group. The one or more features extracted here are the same as the one or more features extracted in video encoding apparatus 1700 in the encoding process.

Next, in Step S2603, categorizer 2706 categorizes the reconstructed pixel group using the extracted one or more features and a machine learning model. The machine learning model used here is the same as the machine learning model used in video encoding apparatus 1700 in the encoding process. Categorizer 2706 then selects the index indicated as a result of categorizing the reconstructed pixel group out of a plurality of predefined indexes, and outputs the selected index to selector 2707.

In Step S2604, selector 2707 selects one intra prediction method out of predefined intra prediction methods using the selected index. FIGS. 18 and 19 indicate examples of intra prediction methods. The plurality of predefined intra prediction methods here are the same as those used in video encoding apparatus 1700 in the encoding process.

In Step S2605, intra predictor 1709 performs an intra prediction process on the current block using the selected intra prediction method.

Lastly, in Step S2606, the intra predictive image samples of the target block is used in a decoding process.

[Effects]

As described above, each of video encoding apparatus 1700 and video decoding apparatus 2700 according to this embodiment makes it possible to obtain the intra prediction method to be used in the intra prediction process using the machine learning model.

Accordingly, it is possible to perform mapping from a first dimension representing either luminance or chrominance values in the current reconstructed pixel groups or the features extracted from the current reconstructed pixel groups to a second dimension having an axis different from that of the first dimension and thus more appropriate for the prediction or encoding of the current reconstructed pixel groups, thereby performing the prediction or encoding. This makes it possible to re-set an axis more appropriate for the pixels in the prediction of an image in which a non-linear change that is sharper than the surroundings appears. This increases the prediction accuracy, which enables improvement in encoding efficiency.

Furthermore, when a plurality of features are used, it is possible to perform the encoding/decoding process(es) on the current block using the intra prediction method more suitable for the current block than in the case where a single feature (for example, a luminance value, or the like) is used. Thus, it is possible to improve the encoding efficiency.

Embodiment 5

Next, Embodiment 5 is described. In Embodiment 5, descriptions are given of a case where a parameter set to be selected using a machine learning model is a weighting coefficient set to be used in an averaging process performed on a plurality of inter predictive blocks in inter predictive motion compensation. This embodiment is described hereinafter mainly focusing on the differences from Embodiments 1 to 4.

[Configuration of Video Encoding Apparatus]

Figure 22:
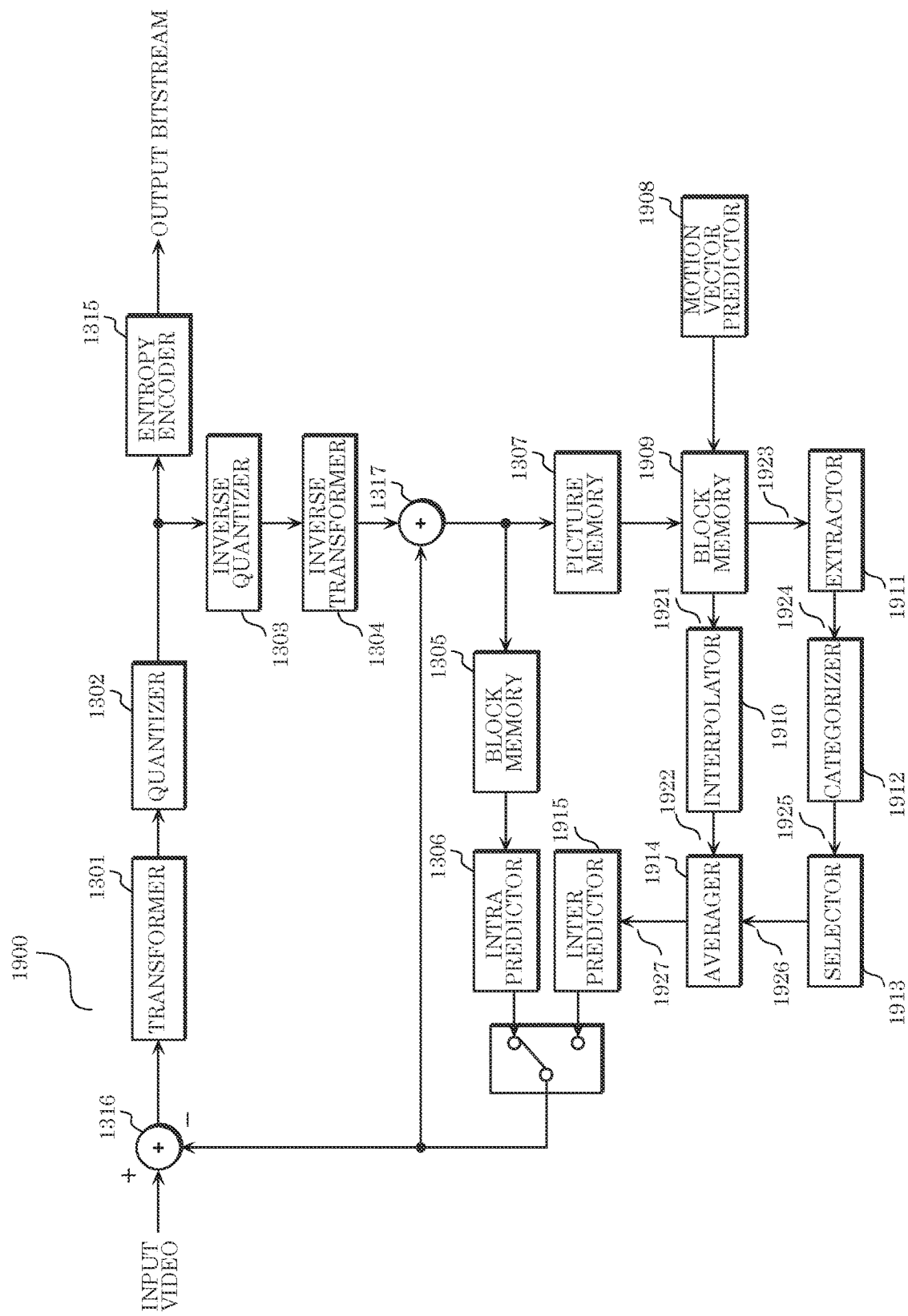
FIG. 22 is a block diagram illustrating a configuration of a video encoding apparatus according to Embodiment 5.

FIG. 22 is a block diagram illustrating a configuration of a video encoding apparatus according to Embodiment 5.

Video encoding apparatus 1900 encodes an input video/image on a per block basis to generate an encoded bitstream to be output. As illustrated in FIG. 22, video encoding apparatus 1900 includes; transformer 1301; quantizer 1302; inverse quantizer 1303; inverse transformer 1304; block memory 1305; intra predictor 1306; picture memory 1307; motion vector predictor 1908; block memory 1909; interpolator 1910; extractor 1911; categorizer 1912 selector 1913; averager 1914; inter predictor 1915; entropy encoder 1315; and adders 1316 and 1317.

Block memory 1909 extracts image samples of a plurality of reference blocks included in a plurality of reference pictures from picture memory 1307 using motion vectors output from motion vector predictor 1908, and outputs image samples 1921 and 1923 of each reference block to interpolator 1910 and extractor 1911, respectively.

Interpolator 1910 performs an interpolation process on image samples 1921, and outputs interpolated image samples 1922 to averager 1914.

Extractor 1911 extracts one or more features 1924 (variance, SIFT) from image samples 1923, and outputs extracted features 1924 to categorizes 1912.

Categorizer 1912 categorizes image samples 1923 using features 1924 and a machine learning model (for example, a support vector machine). Categorizer 1912 then selects index 1925 indicated as a result of categorizing image samples 1923 out of a plurality of predefined indexes, and transmits selected index 1925 to selector 1913.

Selector 1913 selects one filter coefficient set 1926 out of a plurality of predefined filter coefficient sets using index 1925. Selector 1913 outputs selected weighting coefficient set 1926 to averager 1914.

Averager 1914 performs an averaging process using selected weighting coefficient set 1926 and interpolated image samples 1922. Averager 1914 transmits averaged image samples 1927 to inter predictor 1915 for an inter prediction process.

[Operations Performed by Video Encoding Apparatus]

Figure 23:
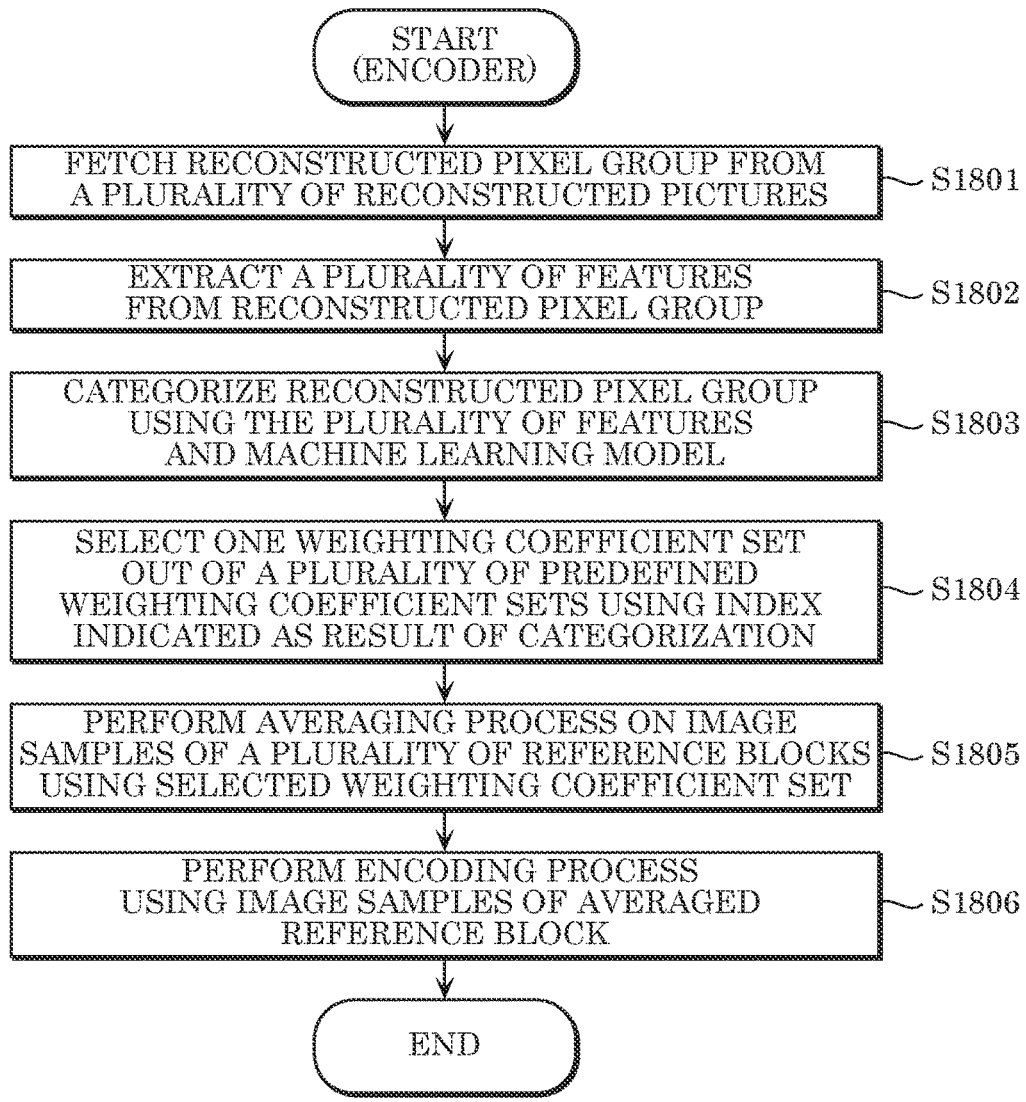
FIG. 23 is a flowchart indicating processes performed by a video encoding apparatus according to Embodiment 5.

FIG. 23 is a flowchart indicating processes performed by a video encoding apparatus according to Embodiment 5.

First, in Step S1801, block memory 1909 extracts image samples of reference blocks from a plurality of reference pictures using motion vectors.

Next, in Step S1802, extractor 1911 extracts one or more features from the extracted image samples.

Next, in Step S1803, categorizer 1912 categorizes the image samples using the extracted one or more features and a machine learning model. Categorizer 1912 then selects the index indicated as a result of categorizing the image samples out of a plurality of predefined indexes.

Figure 24:
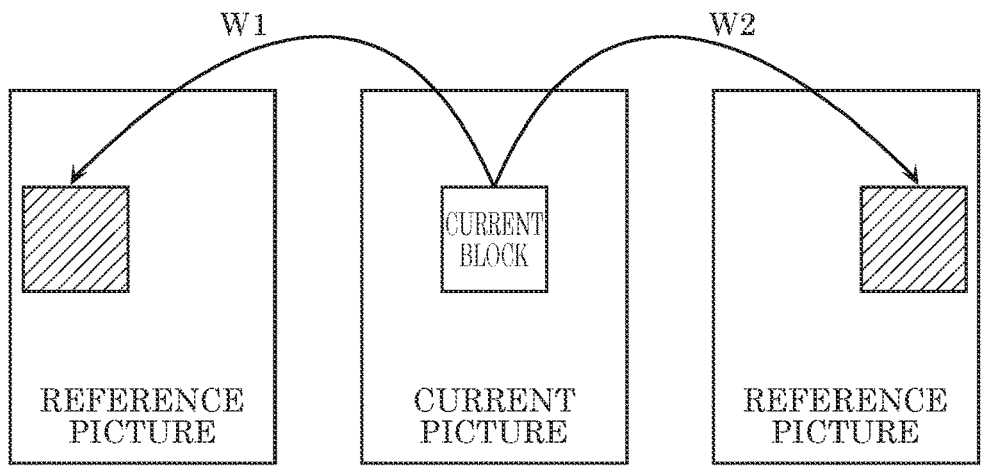
FIG. 24 illustrates examples of weighting coefficients for use in an averaging process in an inter prediction process.
Figure 25:
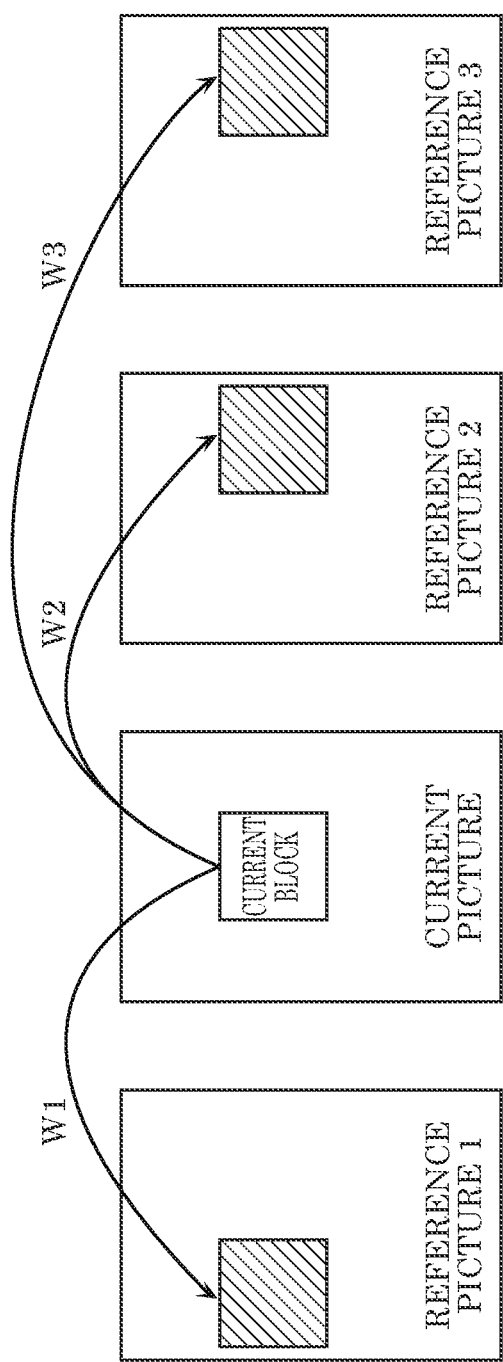
FIG. 25 illustrates examples of weighting coefficients four use in an averaging process in an inter prediction process.

Next, in Step S1804, selector 1913 selects one filter coefficient set out of a plurality of predefined filter coefficient sets using the selected index. FM's, 24 and 25 illustrate examples of weighting coefficients to be used in an averaging process in inter prediction process. FIG. 24 shows weighting coefficients W1 and W2 for averaging the image samples of two reference blocks included in two reference pictures. FIG. 25 shows weighting coefficients W1, W2, and W3 for averaging the image samples of three reference blocks included in three reference pictures.

In Step S1805, averager 1914 performs an averaging process on the image samples using the selected weighting coefficient set.

Lastly, in Step S1806, inter predictor 1915 uses the averaged image samples in an inter prediction process in the encoding process.

[Configuration of Video Decoding Apparatus]

Figure 26:
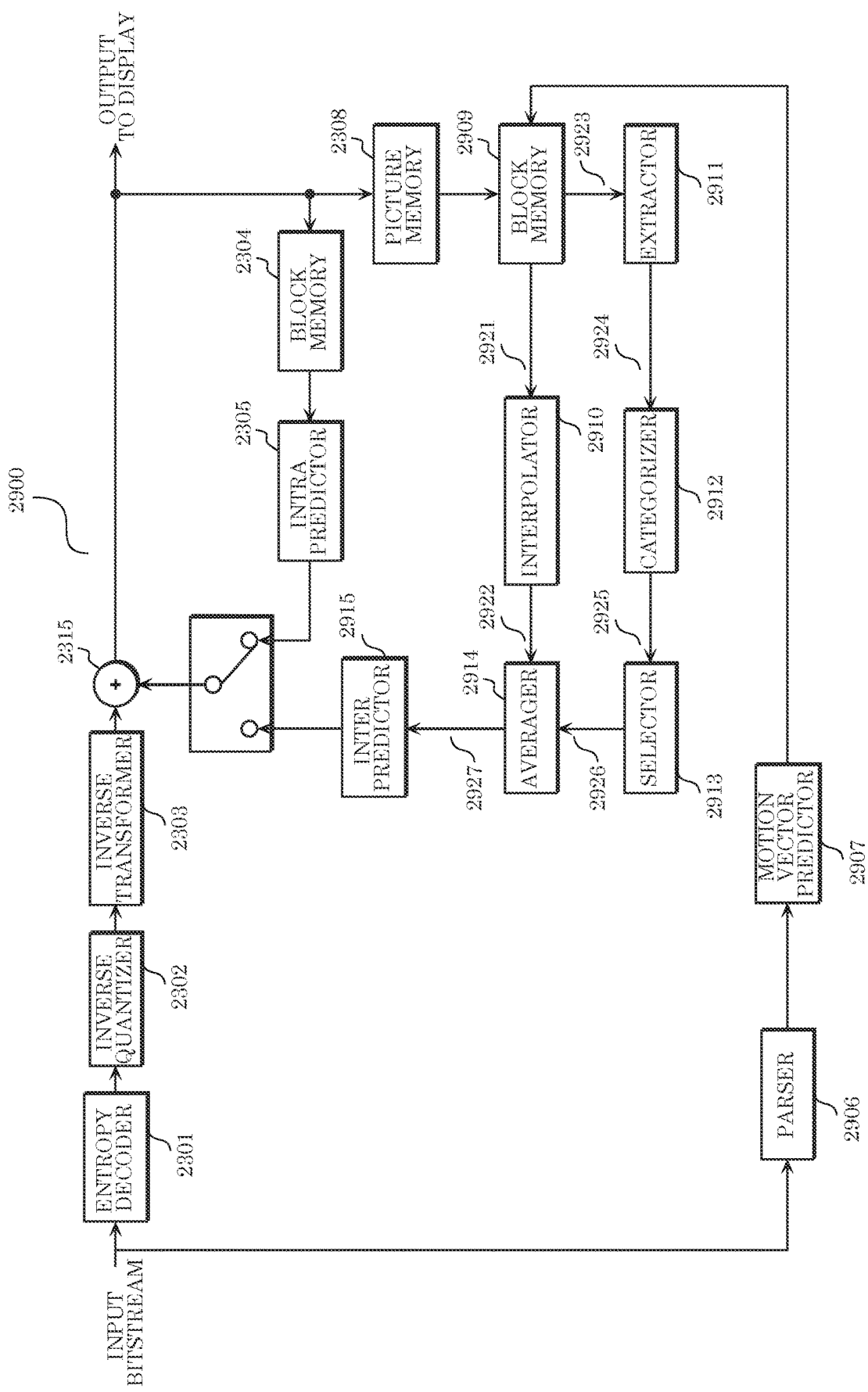
FIG. 26 is a block diagram illustrating a configuration of the video decoding apparatus according to Embodiment 5.

Next, descriptions are given of a configuration of a video decoding apparatus for decoding an encoded bitstream output from video encoding apparatus 1900 as described above. FIG. 26 is a block diagram illustrating the configuration of the video decoding apparatus according to Embodiment 5. It is to be noted that substantially the same constituent elements in FIG. 26 as those in FIG. 9 are assigned the same reference numerals, and descriptions thereof are omitted where appropriate.

Video decoding apparatus 2900 decodes an input encoded bitstream on a per block basis, and outputs a video/an image. As illustrated in FIG. 26, video decoding apparatus 2900 includes: entropy decoder 2301; inverse quantizer 2302; inverse transformer 2303; block memory 2304; intra predictor 2305; parser 2906; motion vector predictor 2907; picture memory 2308; block memory 2909; interpolator 2910; extractor 2911; categorizer 2912; selector 2913; averager 2914; inter predictor 2915; and adder 2315.

Parser 2906 parses the input bitstream, and outputs, to motion vector predictor 2907, residual samples blocks, reference indexes indicating reference pictures to be used in inter prediction, and motion information such as motion vector differences.

Motion vector predictor 2907 derives a motion vector predictor for a current block, based on the motion information parsed by parser 2906 and the motion vector predictor. Motion vector predictor 2907 then outputs a signal indicating the derived motion vector to block memory 2909.

Block memory 2909 extracts image samples of a plurality of reference blocks from a plurality of reference pictures stored in picture memory 2308 using the motion vectors output from motion vector predictor 2907, and outputs image samples 2921 and 2923 to interpolator 2910 and extractor 2911, respectively.

Interpolator 2910 interpolates image samples 2921, and outputs interpolated image samples 2922 to averager 2914.

Extractor 2911 extracts one or more features 2924 (variance, SIFT) from image samples 2923, and outputs extracted features 2924 to categorizer 2912.

Categorizer 2912 categorizes image samples 2923 using features 2924 and a machine learning model (for example, a support vector machine). Categorizer 2912 then selects index 2925 indicated as a result of categorizing image samples 2923 out of a plurality of predefined indexes, and transmits selected index 2925 to selector 2913.

Selector 2913 selects one filter coefficient set 2926 out of a plurality of predefined filter coefficient sets using index 2925, Selector 2913 then outputs selected weighting coefficient set 2926 to averager 2914.

Averager 2914 averages interpolated image samples 2922 of a plurality of reference blocks, and outputs averaged image samples 2927 to inter predictor 2915.

Inter predictor 2915 uses averaged image samples 2927 for an inter prediction process.

[Operations Performed by Video Decoding Apparatus]

Figure 27:
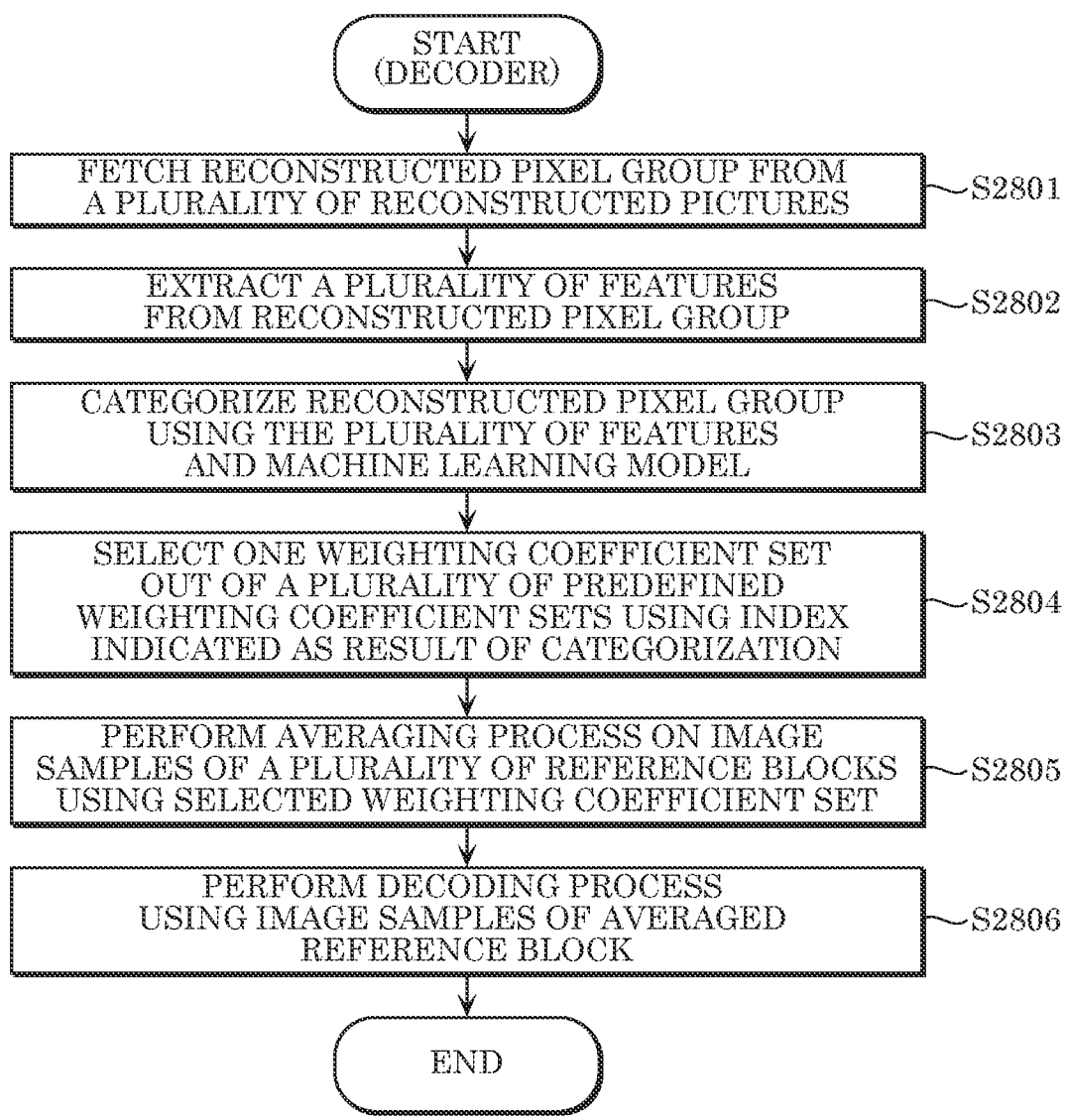
FIG. 27 is a flowchart indicating processes performed by a video decoding apparatus according to Embodiment 5.

Next, descriptions are given of operations performed by video decoding apparatus 2900 configured as described above. FIG. 27 is a flowchart indicating processes performed by a video decoding apparatus according to Embodiment 5.

In Step S2801, block memory 2909 extracts image samples of a plurality of reference blocks from a plurality of reference pictures using motion vectors.

Next, in Step S2802, extractor 2911 extracts one or more features from the extracted image samples of the plurality of reference blocks. The one or more features extracted here are the same as the one or more features extracted in video encoding apparatus 1900 in the encoding process.

Next, in Step S2803, categorizer 2912 categorizes the image samples using the extracted one or more features and a machine learning model. The machine learning model used here is the same as the machine learning model used in video encoding apparatus 1900 in the encoding process. Categorizer 2912 then selects the index indicated as a result of categorizing the image samples out of a plurality of predefined indexes.

In Step S2804, selector 2913 selects one filter coefficient set out of a plurality of predefined weighting coefficient sets using the selected index. The filter coefficient set used here is the same as the filter coefficient set selected in video encoding apparatus 1900 in the encoding process.

In Step S2805, averager 2914 performs an averaging process on the image samples using the selected weighting coefficient set.

Lastly, in Step S2806, inter predictor 2915 uses the averaged pixel samples in an inter prediction process in the encoding process.

[Effects]

As described above, each of video encoding apparatus 1900 and video decoding apparatus 2900 according to this embodiment makes it possible to obtain the weighting coefficients to be used in the averaging process performed on the plurality of inter predictive blocks using the machine learning model.

Accordingly, it is possible to perform mapping from a first dimension representing either luminance or chrominance values in the current reconstructed pixel groups or features extracted from the current reconstructed pixel groups to a second dimension having an axis different from that of the first dimension and thus more appropriate for the prediction or encoding of the current reconstructed pixel groups, thereby performing the prediction or encoding. This makes it possible to reset an axis more appropriate for the pixels in encoding and decoding of an image in which a non-linear change that is sharper than the surroundings appears. This enables improvement in encoding efficiency.

In addition, even when information indicating the weighting coefficient set itself is not included in the bitstream, it is possible to obtain the parameter set using the one or more features and the machine learning model, and to reduce the code amount of the parameter sets etc.

Furthermore, when a plurality of features are used, it is possible to perform the encoding/decoding process(es) on the current block using the weighting coefficients more suitable for the current block than in the case where a single feature (for example, a luminance value, or the like) is used. Thus, it is possible to improve the encoding efficiency.

Embodiment 6

Next, Embodiment 6 is described. In each of Embodiments 6 to 13 described below, one or more control parameters for selecting parameter sets using a machine learning model are included in the header of a bitstream. This embodiment differs from the other embodiments particularly in that whether or not to use a machine learning model is switched by one or more control parameters. This embodiment is described hereinafter mainly focusing on the differences from Embodiments 1 to 5 described above.

[Configuration of Video Encoding Apparatus]

Figure 28:
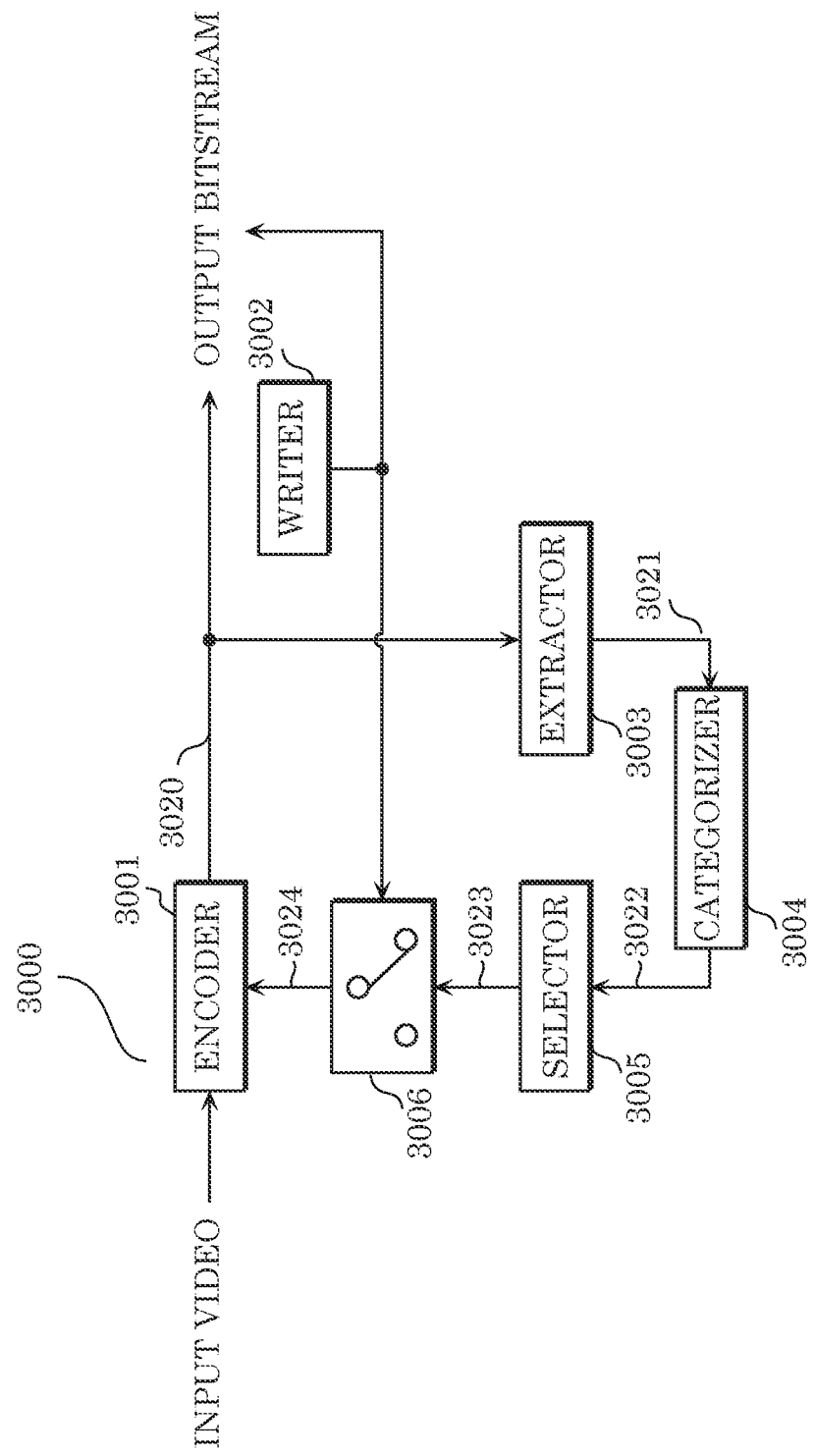
FIG. 28 is a block diagram illustrating a configuration of a video encoding apparatus according to Embodiment 6.

FIG. 28 is a block diagram illustrating a configuration of a video encoding apparatus according to Embodiment 6.

Video encoding apparatus 3000 encodes an input video/image on a per block basis to generate an encoded bitstream to be output. As illustrated in FIG. 28, video encoding apparatus 3000 includes: encoder 3001; extractor 3003; categorizer 3004; selector 3005; switch 3006; and writer 3002. Here, the respective constituent elements of video encoding apparatus 3000 are described.

The input video is input to encoder 3001, and encoded data 3020 is output to extractor 3003. Encoded data 3020 is, for example, one or more reconstructed pixel groups.

Extractor 3003 extracts one or more features 3021 from encoded data 3020, and transmits features 3021 to categorizer 3004.

Categorizer 3004 categorizes encoded data 3020 using extracted features 3021 and a machine learning model. Categorizer 3004 then selects index 3022 indicated as a result of categorizing encoded data 3020 to be output out of a plurality of predefined indexes, and outputs selected index 3022 to selector 3005.

Selector 3005 selects one parameter set 3023 out of a plurality of predefined parameter sets using selected index 3022, and outputs selected parameter set 3023 to switch 3006.

Writer 3002 writes control parameter 3025 to a bitstream to be output. In addition, writer 3002 transmits control parameter 3025 for controlling switch 3006 to switch 3006.

Switch 3006 switches between use and unuse of parameter set 3023 that is selected using a machine learning model in a process for encoding an input video, according to the value of control parameter 3025.

Encoder 3001 encodes image samples of a current block using or without using parameter set 3023 that is selected using a machine learning model, according to the switching by switch 3006.

[Syntax]

Figure 29:
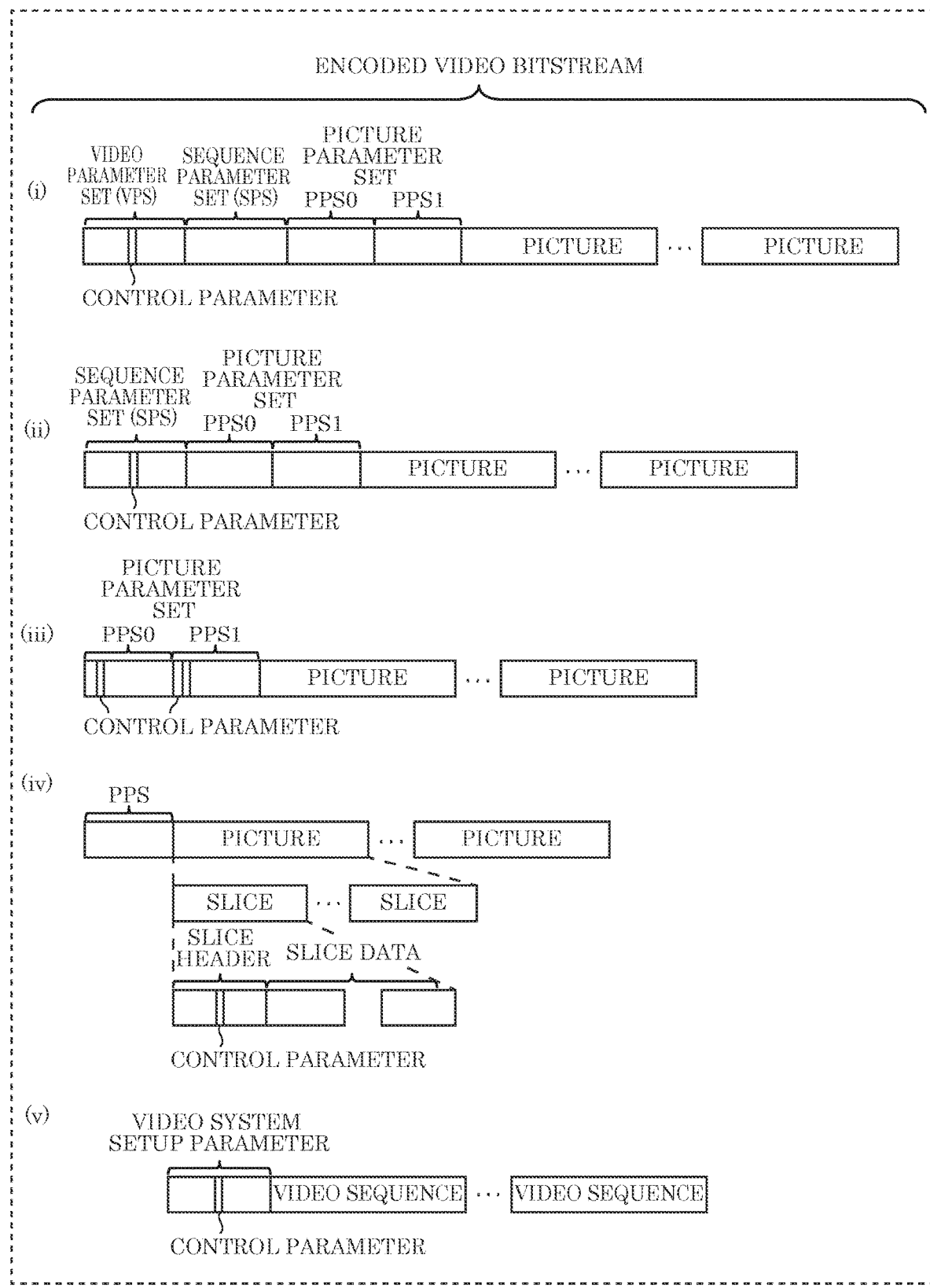
FIG. 29 illustrates candidate positions of control parameters in an encoded video bitstream.

Next, descriptions are given of the positions of the control parameters in a bitstream. FIG. 29 illustrates candidate positions of control parameters in the encoded video bitstream. In FIG. 29, (i) illustrates a case where a control parameter is present in a video parameter set. In FIG. 29, (ii) illustrates a case where a control parameter is present in a sequence parameter set in a video stream. In FIG. 29, (iii) illustrates a case where control parameters are present in a picture parameter set. In FIG. 29, (iv) illustrates a case where a control parameter is present in the header of a slice. In FIG. 29, (v) illustrates a case where a control parameter is present in a parameter set for setting up or initializing a video system or a video decoder.

When a total of two control parameters are present in an upper layer (for example, in a picture parameter set) and in a lower layer (for example, in a slice header), the value of the control parameter present in the upper layer is overwritten with the value of the control parameter present in the lower layer. A control parameter which is a profile indicator or a level indicator in the sequence parameter set in the encoded video stream is also possible.

[Operations Performed by Video Encoding Apparatus]

Next, descriptions are given of operations performed by a video encoding apparatus configured as described above.

Figure 30:
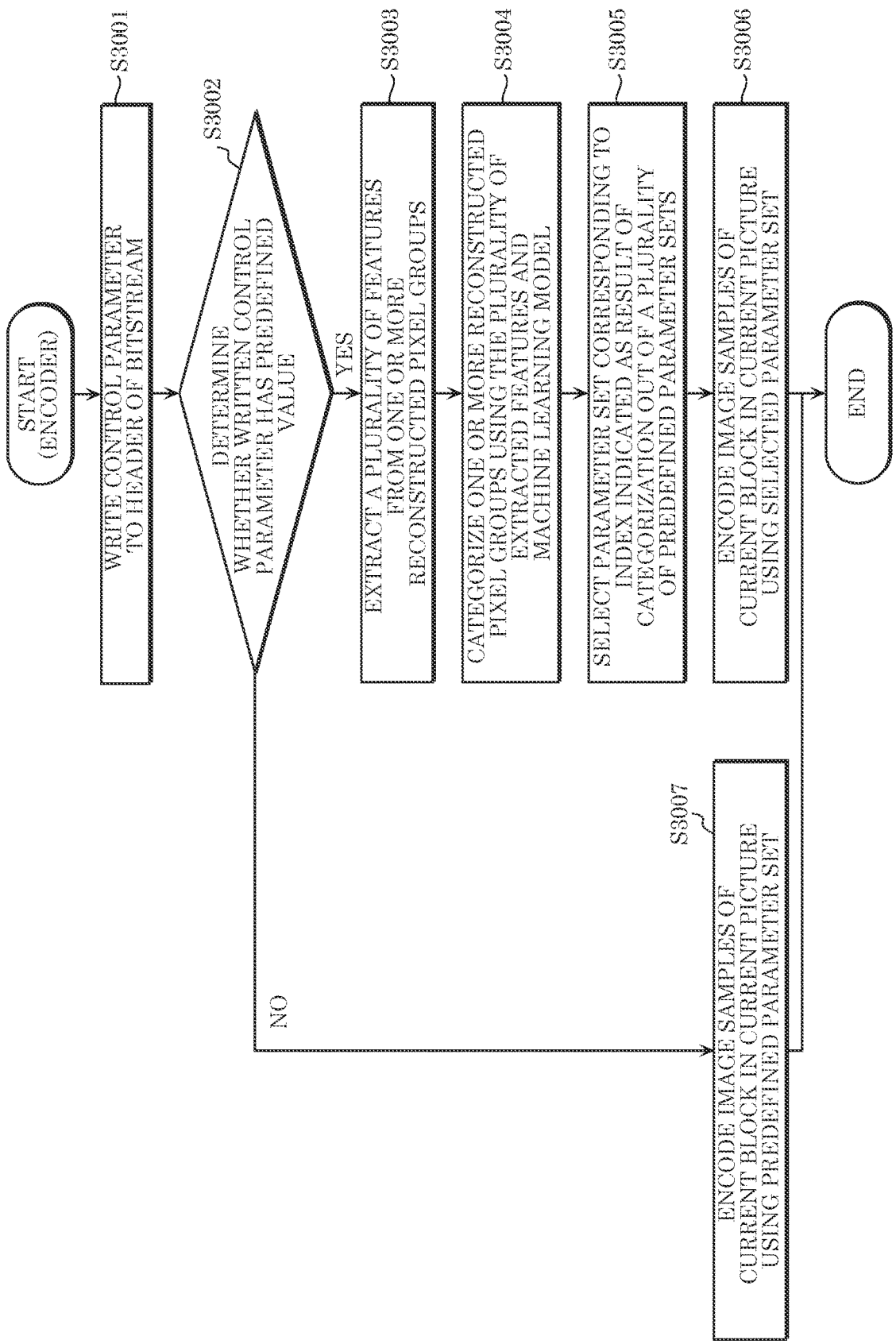
FIG. 30 is a flowchart indicating processes performed by a video encoding apparatus according to Embodiment 6.

FIG. 30 is a flowchart indicating processes performed by a video encoding apparatus according to Embodiment 6.

First, in Step S3001, writer 3002 writes a control parameter to the header of an encoded video stream. Specifically, as illustrated in FIG. 29 for example, writer 3002 writes one or more control parameters in the video parameter set, the sequence parameter set, the picture parameter set, and the slice header.

Next, in Step S3002, whether each control parameter to be written has a predefined value or not is determined. The value of the control parameter may be set based on a cost function for representing a rate distortion using SAD, SSE, MSE, or the like. When a method in which a machine learning model is used yields a cost lower than in conventional methods in which no machine learning model is used, the control parameter is set to have the predefined value.

When the control parameter to be written has the predefined value (Yes in S3002), the following steps are performed.

First, in Step S3003, extractor 3003 extracts one or more features from one or more reconstructed pixel groups.

Next, in Step S3004, categorizer 3004 categorizes the one or more reconstructed pixel groups using the extracted features and a machine learning model. Categorizer 3004 then selects the index indicated as a result of categorizing the one or more reconstructed pixel groups out of a plurality of predefined indexes.

Next, in Step S3005, one parameter set is selected out of the plurality of predefined parameter sets using the selected index. The parameter sets are parameter sets which are used in an encoding process performed on a current block. Specifically, the parameter sets may be, for example, filtering coefficient sets which are used in an interpolation process for generating image pixels in inter prediction. In addition, for example, the parameter sets may be filtering coefficient sets which are used in an in-loop filtering process performed on the current block. In addition, for example, the parameter sets may be intra prediction indexes. In addition, for example, the parameter sets may be weighting coefficient sets which are used in an averaging process performed on a plurality of predictive blocks in inter prediction.

Lastly, in Step S3006, encoder 3001 encodes the image samples of the current block included in the current picture using the selected parameter set. Here, the encoding process in which the parameter set is used involves, for example, an interpolation process and an averaging process in inter prediction, an in-loop filtering process, and an intra prediction process.

When the control parameter to be written does not have the predefined value (No in S3002), in Step S3007, encoder 3001 encodes the image samples of the current block included in the current picture using a predetermined parameter set.

[Configuration of Video Decoding Apparatus]

Figure 31:
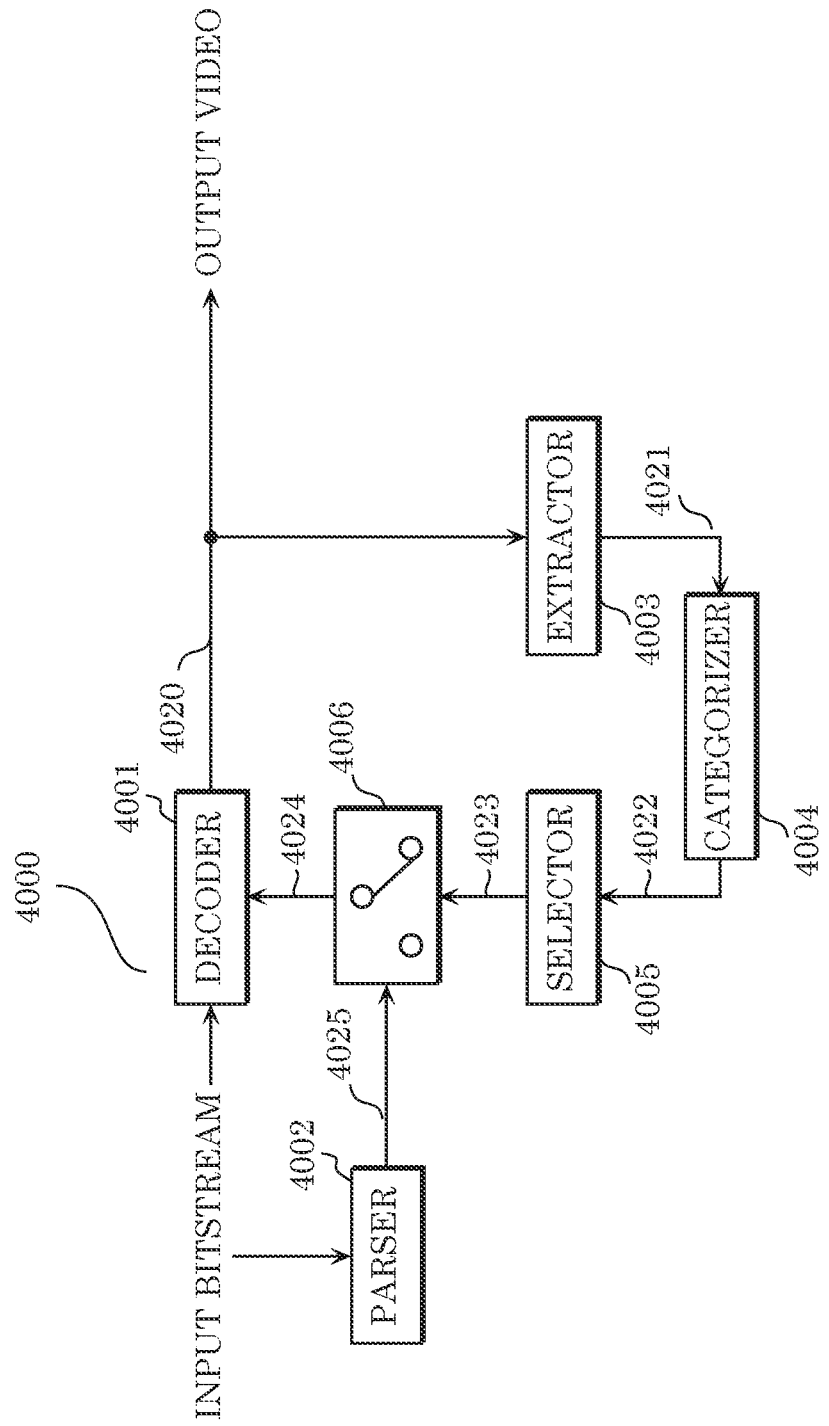
FIG. 31 is a block diagram illustrating a configuration of a video decoding apparatus according to Embodiment 6.

Next, descriptions are given of a configuration of a video decoding apparatus for decoding an encoded bitstream output from video encoding apparatus 3000 as described above. FIG. 31 is a block diagram illustrating the configuration of the video decoding apparatus according to Embodiment 6.

Video decoding apparatus 4000 decodes an input video/image bitstream on a per block basis, and outputs a video/an image. As illustrated in FIG. 31, video decoding apparatus 4000 includes: decoder 4001; extractor 4003; categorizer 4004; selector 4005; switch 4006; and parser 4002. Here, the respective constituent elements of video decoding apparatus 4000 are described.

The encoded input bitstream is input to decoder 4001, and decoded data 4020 is output to extractor 3003. Decoded data 4020 is, for example, one or more reconstructed pixel groups.

Extractor 4003 extracts the one or more features 4021 from decoded data 4020, and transmits features 4021 to categorizer 4004.

Categorizer 4004 categorizes decoded data 4020 using extracted features 4021 and a machine learning model, Categorizer 4004 then selects index 4022 indicated as a result of categorizing decoded data 4020 out of a plurality of predefined indexes, and outputs selected index 4022 to selector 4005.

Selector 4005 selects one parameter set 4023 out of a plurality of predefined parameter sets using selected index 4022, and outputs selected parameter set 4023 to switch 4006.

Parser 4002 parses control parameter 4025 from the input bitstream. In addition, parser 4002 transmits control parameter 4025 for controlling switch 4006 to switch 4006.

Switch 4006 switches between use and unuse of parameter set 4023 that is selected using a machine learning model in a process for decoding the encoded bitstream, according to control parameter 4025.

Decoder 4001 decodes image samples of a current block using or without using parameter set 4023 that is selected using a machine learning model, according to the switching by switch 4006.

[Operations Performed by Video Decoding Apparatus]

Figure 32:
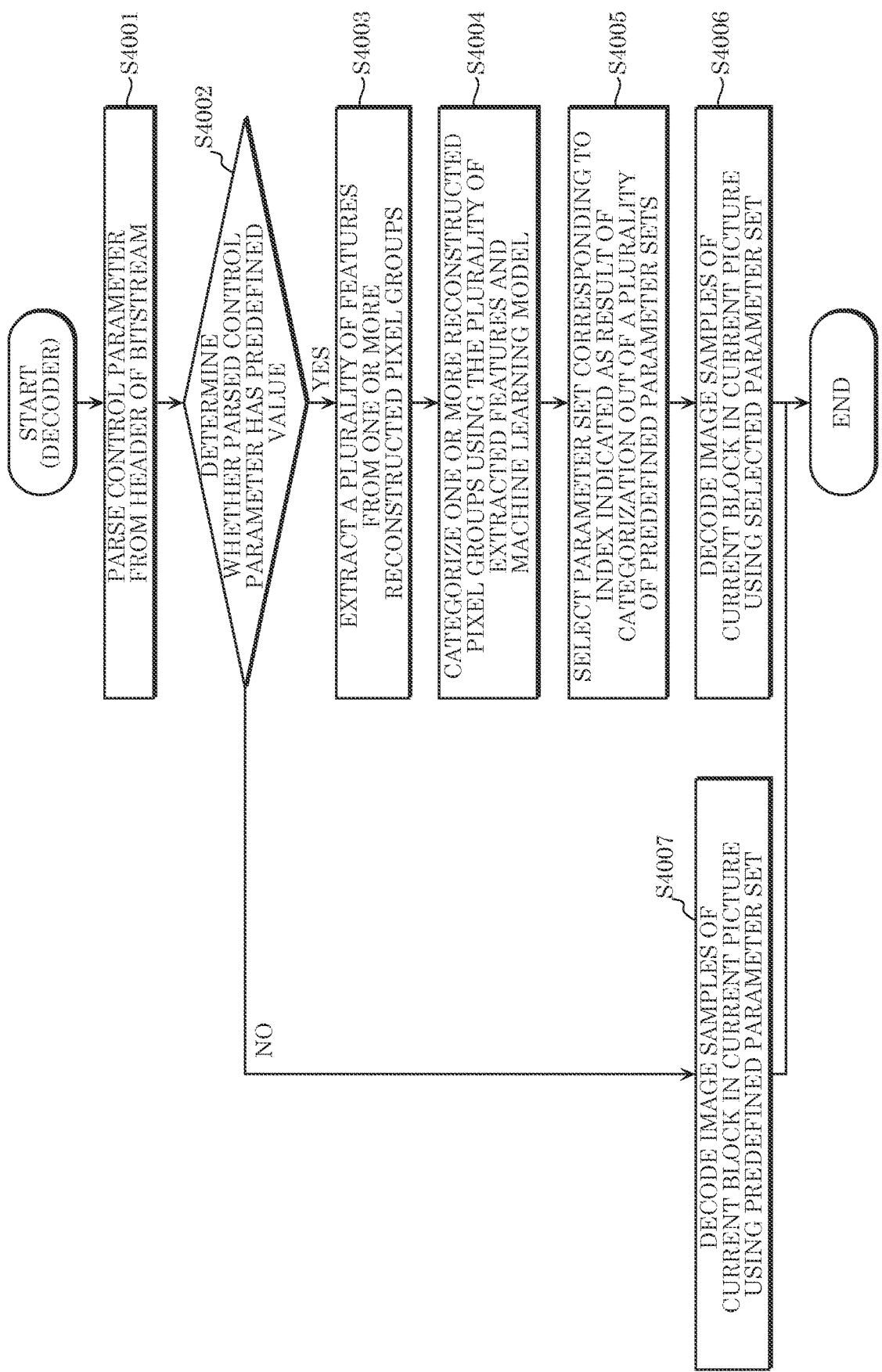
FIG. 32 is a flowchart indicating processes performed by a video decoding apparatus according to Embodiment 6.

Next, descriptions are given of operations performed by video decoding apparatus 4000 configured as described above. FIG. 32 is a flowchart indicating processes performed by the video decoding apparatus according to Embodiment 6.

First, in Step S4001, parser 4002 parses a control parameter from the header of an encoded video stream.

Next, in Step S4002, switch 4006 determines whether the parsed control parameter has a predefined value or not.

Here, when the parsed control parameter has the predefined value (Yes in S4002), the following steps are performed.

First, in Step S4003, extractor 4003 extracts one or more features from one or more reconstructed pixel groups. These features are the same as the features used in video encoding apparatus 3000 in the encoding process.

Next, in Step S4004, categorizer 4004 categorizes the one or more reconstructed pixel groups using the extracted features and a machine learning model. In this way, the index indicated as a result of categorizing the one or more reconstructed pixel groups is selected out of a plurality of predefined indexes. The machine learning model used here is the same as the machine learning model used in video encoding apparatus 3000 in the encoding process.

Next, in Step S4005, selector 4005 selects one parameter set out of a plurality of predefined parameter sets using the selected index. The parameter set used here is the same as the parameter set selected in video encoding apparatus 3000 in the encoding process.

Lastly, in Step S4006, decoder 4001 decodes image samples of a current block using the selected parameter set. The decoding process in which the selected decoding parameter set is used is, for example, one of or a combination of arbitrarily selected ones of an interpolation process and an averaging process in inter prediction, an in-loop filtering process, and an intra prediction process.

When the parsed control parameter does not have the predefined value (No in S4002), in Step S4007, decoder 4001 decodes the image samples of the current block using the predefined parameter set. The decoding process in which the predetermined decoding parameter set is used is, for example, one of or a combination of arbitrarily selected ones of an interpolation process and an averaging process in inter prediction, an in-loop filtering process, and an intra prediction process.

[Effects]

As described above, each of video encoding apparatus 3000 and video decoding apparatus 4000 according to this embodiment performs encoding/decoding using the parameter set corresponding to the result of categorization using the machine learning model when the control parameter has the predefined value, and performs encoding/decoding using the predetermined parameter set when the control parameter does not have the predefined value. Accordingly it is possible to switch between use and unuse of the machine learning model according to the control parameter, which enables encoding/decoding using the more appropriate parameter set.

Embodiment 7

Next, Embodiment 7 is described. Embodiment 7 differs from Embodiment 6 described above as to which one of a first machine learning model and a second machine learning model is to be used is controlled by a control parameter. This embodiment is described hereinafter mainly focusing on the differences from Embodiment 6.

[Configuration of Video Encoding Apparatus]

Figure 33:
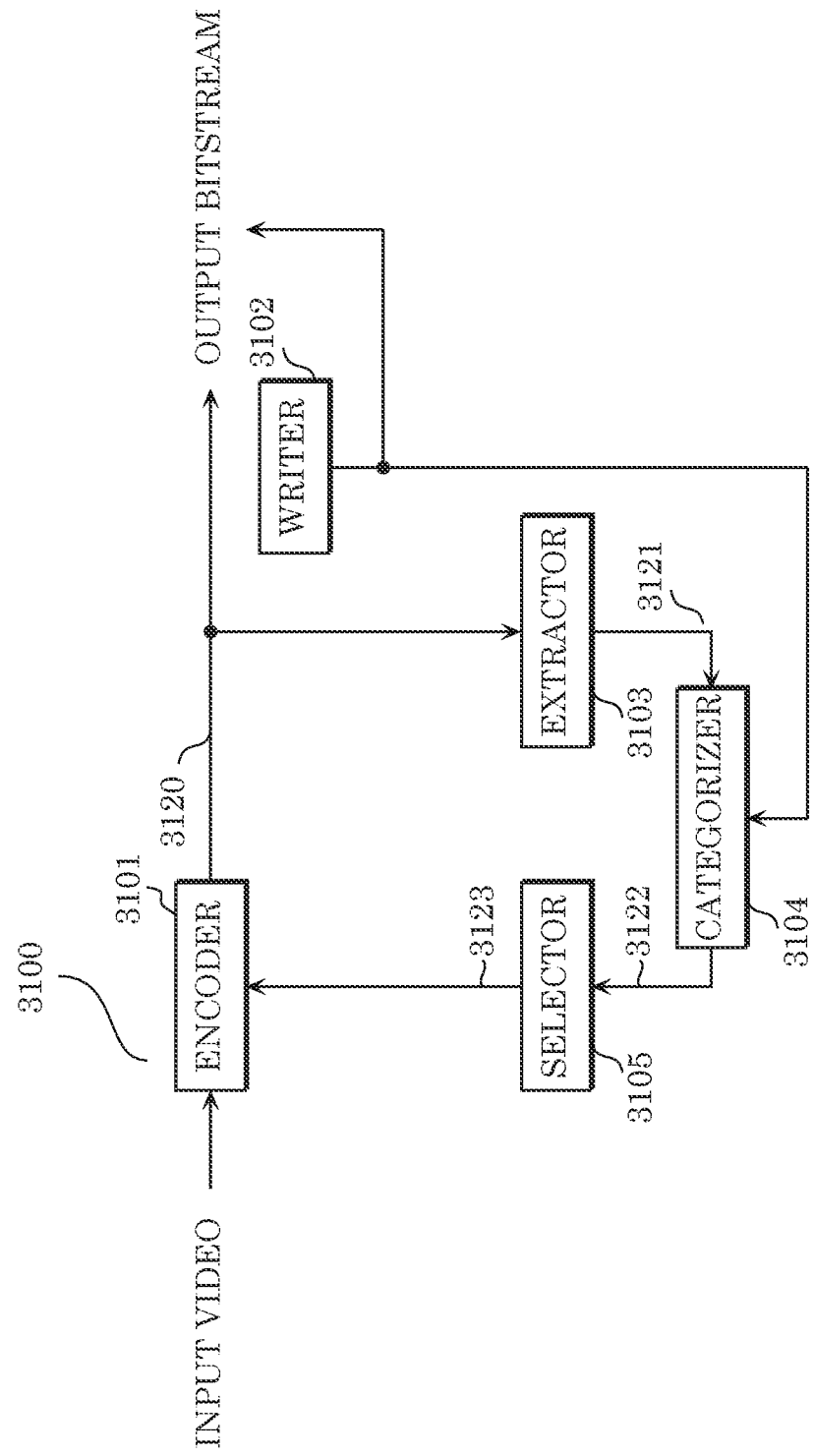
FIG. 33 is a block diagram illustrating a configuration of a video encoding apparatus according to Embodiments 7 and 8.

FIG. 33 is a block diagram illustrating a configuration of a video encoding apparatus according to Embodiments 7 and 8.

Video encoding apparatus 3100 encodes an input video/image on a per block basis to generate an encoded bitstream to be output. As illustrated in FIG. 33, video encoding apparatus 3100 includes: encoder 3101; extractor 3103; categorizer 3104; selector 3105; and writer 3102. Here, the respective constituent elements of video encoding apparatus 3000 are described.

The input video is input to encoder 3101, and encoded data 3120 is output to extractor 3103. Encoded data 3120 is, for example, one or more reconstructed pixel groups.

Extractor 3103 extracts one or more features 3121 from encoded data 3120, and transmits features 3121 to categorizer 3104.

Writer 3102 writes control parameter 3124 to the bitstream to be output. The position of control parameter 3124 in the bitstream to be output is the same as the position of any of the control parameters in Embodiment 6, and thus the description thereof is not repeated. Furthermore, writer 3102 transmits control parameter 3124 to categorizer 3104.

When control parameter 3124 has a predefined value, categorizer 3104 categorizes encoded output data 3120 using extracted features 3121 and the first machine learning model. When control parameter 3124 does not have the predefined value, categorizer 3104 categorizes encoded output data 3120 using extracted features 3121 and the second machine learning model different from the first machine learning model. In this way, the index indicated as a result of categorizing encoded output data 3120 is selected out of a plurality of predefined indexes, and selected index 3122 is transmitted to selector 3105.

Selector 3105 selects one parameter set 3123 out of a plurality of predefined parameter sets using index 3122, and outputs selected parameter set 3123 to encoder 3101.

Encoder 3101 encodes an input video using selected parameter set 3123.

[Operations Performed by Video Encoding Apparatus]

Next, descriptions are given of operations performed by video encoding apparatus 3100 configured as described above.

Figure 34:
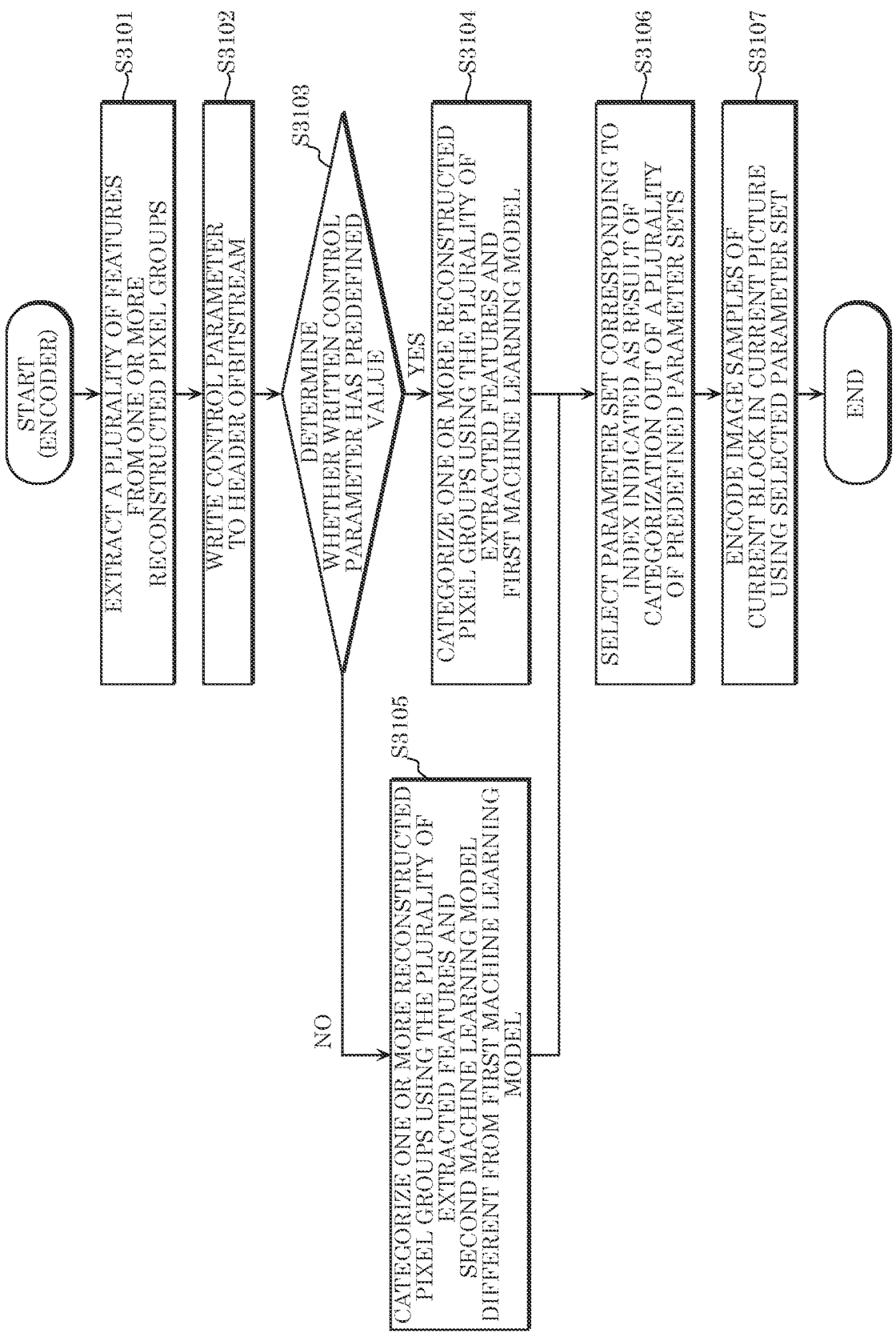
FIG. 34 is a flowchart indicating processes performed by a video encoding apparatus according to Embodiment 7.

FIG. 34 is a flowchart indicating processes performed by a video encoding apparatus according to Embodiment 7.

In Step S3101, extractor 3103 extracts one or more features from one or more reconstructed pixel groups.

Next, in Step S3102, writer 3102 writes a control parameter to the header of an encoded video stream.

Next, in Step S3103, whether each control parameter to be written has a predefined value or not is determined.

Here, when the control parameter has the predefined value (Yes in S3103), in Step S3104, categorizer 3104 categorizes one or more reconstructed pixel groups using the extracted features and a first machine learning model. In this way, the index indicated as a result of categorizing the one or more reconstructed pixel groups is selected out of a plurality of predefined indexes. The first machine learning model is, for example, a support vector machine (SVM), an artificial neural network (ANN), or k-means clustering.

When the control parameter does not have the predefined value (No in S3103), in Step S3105, categorizer 3104 categorizes one or more reconstructed pixel groups using the extracted features and a second machine learning model different from the first machine learning model. In this way, the index indicated as a result of categorizing the one or more reconstructed pixel groups is selected out of a plurality of predefined indexes. The second machine learning model is, for example, a support vector machine (SVM), an artificial neural network (ANN), or k-means clustering.

Next, in Step S3106, selector 3105 selects one parameter set out of a plurality of predefined parameter sets using the selected index. The parameter sets are parameters which are used in an encoding process performed on a current block. Specifically, the parameter sets may be, for example, filtering coefficient sets which are used in an interpolation process for generating image pixels in inter prediction. In addition, for example, the parameter sets may be filtering coefficient sets which are used in an in-loop filtering process performed on a current block. In addition, for example, the parameter sets may be intra prediction indexes. In addition, for example, the parameter sets may be weighting coefficient sets which are used in an averaging process performed on a plurality of predictive blocks in inter prediction.

Lastly, in Step S3107, encoder 3101 encodes the image samples of the current block using the selected parameter set. The encoding process in which the predefined decoding parameter set is used is, for example, one of or a combination of arbitrarily selected ones of an interpolation process and an averaging process in inter prediction, an in-loop filtering process, and an intra prediction process.

[Configuration of Video Decoding Apparatus]

Figure 35:
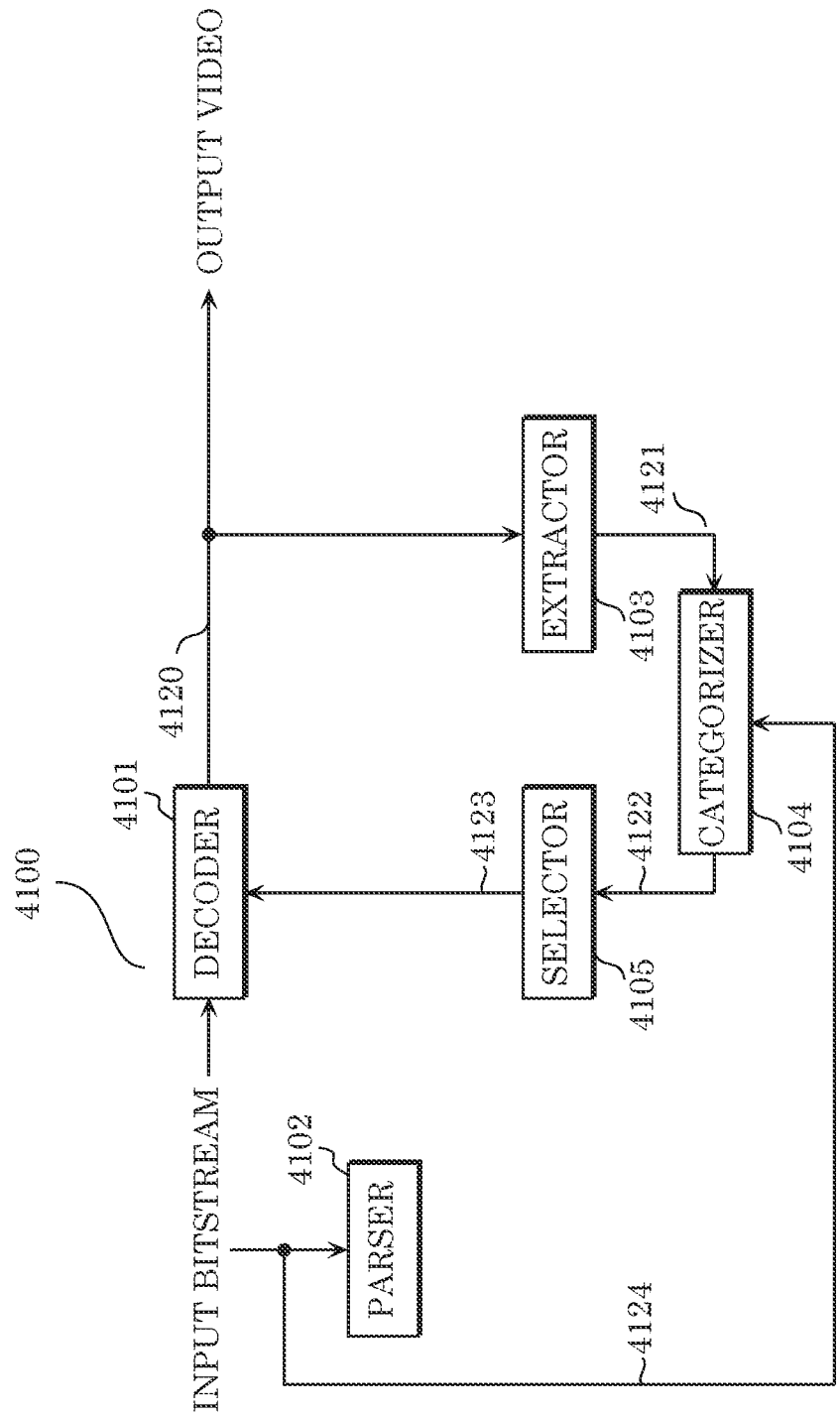
FIG. 35 is a block diagram illustrating a configuration of a video decoding apparatus according to Embodiments 7 and 8.

Next, descriptions are given of a configuration of a video decoding apparatus for decoding an encoded bitstream output from video encoding apparatus 3100 as described above. FIG. 35 is a block diagram illustrating a configuration of a video decoding apparatus according to Embodiments 7 and 8.

Video decoding apparatus 4100 decodes an input video/image bitstream on a per block basis, and outputs a video/an image. As illustrated in FIG. 35, video decoding apparatus 4100 includes: decoder 4101; extractor 4103; categorizer 4104; selector 4105; and parser 4102. Here, the respective constituent elements of video decoding apparatus 4100 are described.

The input bitstream is input to decoder 4101, and decoded data 4120 is output to extractor 4103. Decoded data 4120 is, for example, one or more reconstructed pixel groups.

Extractor 4103 extracts one or more features 4121 from decoded data 4120, and transmits features 4121 to categorizer 4104.

Parser 4102 parses control parameter 4124 from the input bitstream. Parser 4102 transmits parsed control parameter 4124 to categorizer 4104.

When control parameter 4124 has a predefined value, categorizer 4104 categorizes decoded output data 4120 using extracted features 4121 and the first machine learning model. In this way, index 4122 indicated as a result of categorizing decoded data 4120 is selected out of a plurality of predefined indexes. Selected index 4122 is output to selector 4105.

Selector 4105 selects one parameter set 4123 out of a plurality of predefined parameter sets using index 4122, and outputs selected parameter set 4123 to decoder 4101.

Decoder 4101 decodes an input bitstream using parameter set 4123.

[Operations Performed by Video Decoding Apparatus]

Figure 36:
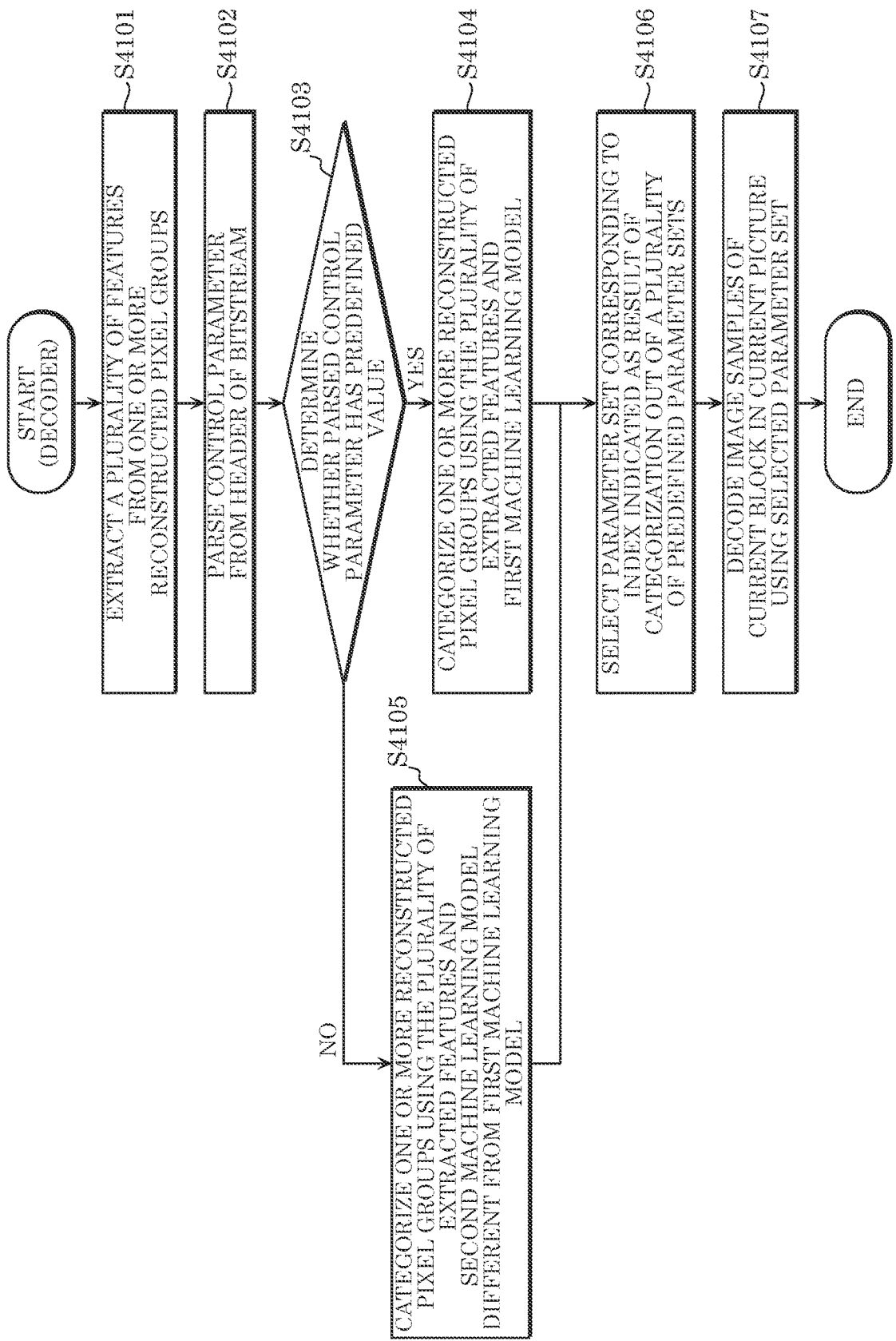
FIG. 36 is a flowchart indicating processes performed by a video decoding apparatus according to Embodiment 7.

Next, descriptions are given of operations performed by video decoding apparatus 4100 configured as described above. FIG. 36 is a flowchart indicating processes performed by a video decoding apparatus according to Embodiment 7.

In Step S4101, extractor 4103 extracts one or more features from one or more reconstructed pixel groups. These features are the same as the features used in video encoding apparatus 3100 in the encoding process.

Next, in Step S4102, parser 4102 parses control parameters from the header of an encoded video stream.

Next, in Step S4103, whether each parsed control parameter has a predefined value or not is determined.

Here, when the control parameter has the predefined value (Yes in S4103), in Step S4104, categorizer 4104 categorizes the one or more reconstructed pixel groups using the extracted features and the first machine learning model. In this way, the index indicated as a result of categorizing the one or more reconstructed pixel groups is selected out of a plurality of predefined indexes. The first machine learning model used here is the same as the first machine learning model used in video encoding apparatus 3100 in the encoding process.

When the control parameter does not have the predefined value (No in S4103), in Step S4105, categorizer 4104 categorizes the one or more reconstructed pixel groups using the extracted features and the second machine learning model different from the first machine learning model. In this way the index indicated as a result of categorizing the one or more reconstructed pixel groups is selected out of the plurality of predefined indexes. The second machine learning model used here is the same as the second machine learning model used in video encoding apparatus 3100 in the encoding process.

Next, in Step S4106, selector 4105 selects one parameter set out of a plurality of predefined parameter sets using the selected index. The parameter set used here is the same as the parameter set selected in video encoding apparatus 3100 in the encoding process.

Lastly, in Step S4107, decoder 4101 decodes image samples of a current block using the selected parameter set. The decoding process in which the selected parameter set is used is, for example, one of or a combination of arbitrarily selected ones of an interpolation process and an averaging process in inter prediction, an in-loop filtering process, and an intra prediction process.

[Effects]

As described above, each of video encoding apparatus 3100 and video decoding apparatus 4100 according to this embodiment makes it possible to categorize each of the one or more reconstructed pixel groups using either the first machine learning model or the second machine learning model according to whether the control parameter has the predefined value or not. Accordingly, it is possible to increase flexibility in machine learning model for use in the categorization, thereby obtaining the more appropriate categorization result (that is, the parameter set).

Embodiment 8

Next, Embodiment 8 is described. Embodiment 8 differs from Embodiments 6 and 7 described above in that a second control parameter for modifying a machine learning model may be included in a bitstream. This embodiment is described hereinafter mainly focusing on the differences from Embodiments 6 and 7.

[Configuration of Video Encoding Apparatus]

The video encoding apparatus according to this embodiment has a configuration that is substantially the same as the configuration of the video encoding apparatus according to Embodiment 7. Accordingly the configuration of the video encoding apparatus according to this embodiment is described with reference to FIG. 33 mainly focusing on the differences from the video encoding apparatus according to Embodiment 7.

Writer 3102 writes a first control parameter to the bitstream to be output. Writer 3102 writes a second control parameter to a bitstream to be output when the first control parameter has a predefined value. Control parameters 3124 (the first control parameter and the second control parameter) are transmitted to categorizer 3104. The positions of the first control parameter and the second control parameter in the bitstream to be output are the same as the positions of the control parameters in Embodiment 6, and thus the description thereof is not repeated.

When the first control parameter has the predefined value, categorizer 3104 modifies or updates a machine learning model using the second control parameter, and categorizes encoded output data 3120 using the modified or updated machine learning model and one or more features 3121. When the first control parameter does not have the predefined value, categorizer 3104 categorizes encoded output data 3120 using the machine learning model which has not been modified and one or more features 3121. Through the categorization, the index indicated as a result of categorizing encoded output data 3120 is selected out of a plurality of predefined indexes, and selected index 3122 is output to selector 3105.

Encoder 3101 encodes an input video using parameter set 3123 selected by selector 3105.

[Operations Performed by Video Encoding Apparatus]

Next, descriptions are given of operations performed by video encoding apparatus 3100 according to Embodiment 8 configured as described above.

Figure 37:
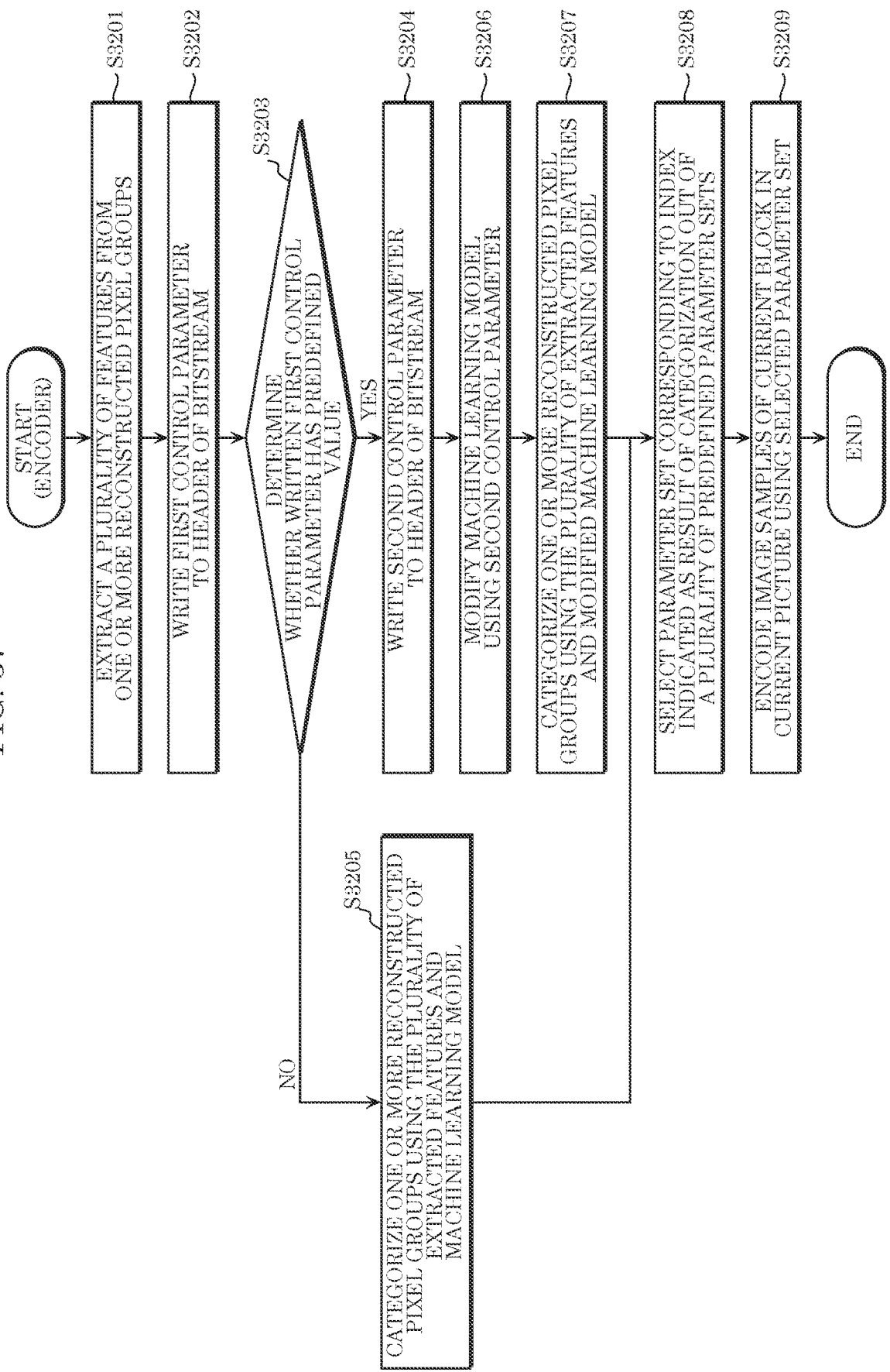
FIG. 37 is a flowchart indicating processes performed by a video encoding apparatus according to Embodiment 8.

FIG. 37 is a flowchart indicating processes performed by a video encoding apparatus according to Embodiment 8.

First, in Step S3201, extractor 3103 extracts one or more features from one or more reconstructed pixel groups.

Next, in Step S3202, writer 3102 writes a first control parameter to the header of an encoded video stream.

Next, in Step S3203, whether the written first control parameter has a predefined value or not is determined.

Here, when the first control parameter has the predefined value (Yes in S3203), the following steps are performed.

First, in Step S3204, writer 3102 writes the second control parameter to the header of the bitstream. The second parameter is a parameter which is used to modify a machine learning model. The second control parameter is, for example, training data obtained through a machine learning process in which a predetermined image group is used, or information for identifying the training data. In addition, the second control parameter may be a parameter for modifying the association between a plurality of indexes indicating categorization results and a plurality of parameter sets.

Next, in Step S3206, categorizer 3104 modifies the machine learning model using the written second control parameter. Categorizer 3104 then categorizes one or more reconstructed pixel groups using the extracted features and the modified machine learning model. In this way, the index indicated as a result of categorizing the one or more reconstructed pixel groups is selected out of a plurality of predefined indexes.

When the second control parameter does not have the predefined value (No in S3203), in Step S3205, categorizer 4104 categorizes the one or more reconstructed pixel groups using the extracted features and the machine learning model (which has not been modified). In this way the index indicated as a result of categorizing the one or more reconstructed pixel groups is selected out of a plurality of predefined indexes.

Next, in Step S3208, selector 3105 selects one parameter set out of a plurality of predefined parameter sets using the selected index.

Lastly, in Step S3209, encoder 3101 encodes the image samples of the current block using the selected parameter set.

[Configuration of Video Decoding Apparatus]

Next, descriptions are given of a configuration of a video decoding apparatus for decoding an encoded bitstream output from video encoding apparatus 3100 as described above. The video decoding apparatus according to this embodiment has a configuration that is substantially the same as the configuration of the video decoding apparatus according to Embodiment 7. Accordingly, the configuration of the video decoding apparatus according to this embodiment is described with reference to FIG. 35 mainly focusing on the differences from the video decoding apparatus according to Embodiment 7.

Parser 4102 parses a first control parameter from an input bitstream. When the first parameter has a predefined value, Parser 4102 parses, from the input bitstream, a second control parameter for modifying or updating a machine learning model. Parsed control parameters 4124 (the first control parameter and the second control parameter) are transmitted to categorizer 4104.

When the first parameter does not have the predefined value, categorizer 4104 categorizes decoded data 4120 using one or more features 4121 and a machine learning model. When the first control parameter has the predefined value, categorizer 4104 modifies the machine learning model using the second control parameter, and categorizes decoded data 4120 using the modified machine learning model and features 4121. Through the categorization, index 4122 indicated as a result of categorizing decoded data 4120 is selected out of a plurality of predefined indexes, and selected index 4122 is output to selector 4105.

Decoder 4101 encodes an input video using parameter set 4123 selected by selector 4105.

[Operations Performed by Video Decoding Apparatus]

Figure 38:
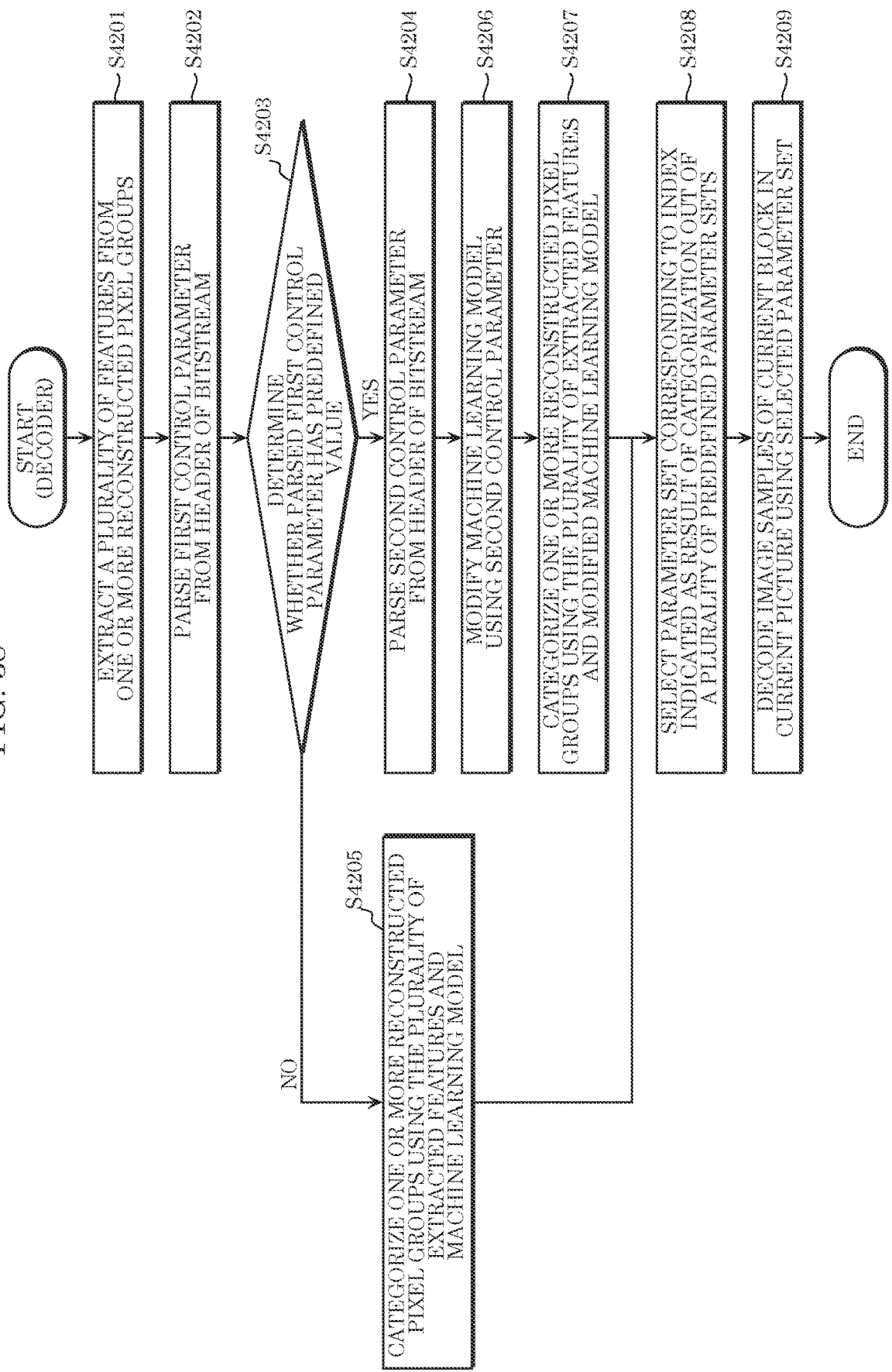
FIG. 38 is a flowchart indicating processes performed by a video decoding apparatus according to Embodiment 8.

Next, descriptions are given of operations performed by video decoding apparatus 4100 configured as described above. FIG. 38 is a flowchart indicating processes performed by a video decoding apparatus according to Embodiment 8.

First, in Step S4201, extractor 4103 extracts one or more features from one or more reconstructed pixel groups. These features are the same as the features used in video encoding apparatus 3100 in the encoding process.

First, in Step S4202, parser 4102 parses a first control parameter from the header of an encoded video stream.

Next, in Step S4203, whether the parsed first control parameter has a predefined value or not is determined.

Here, when the parsed first control parameter has the predefined value (Yes in S4203), the following steps are performed.

First, in Step 4204, parser 4102 parses a second control parameter set for modifying a machine learning model from the header of a bitstream. The second control parameter is, for example, training data obtained through a machine learning process in which a predetermined image group is used. In addition, the second control parameter may be a parameter for modifying the association between a plurality of indexes indicating categorization results and a plurality of parameter sets.

Next, in Step S4206, categorizer 4104 modifies the machine learning model using the parsed second control parameter. Categorizer 4104 then categorizes one or more reconstructed pixel groups using the extracted features and the modified machine learning model. In this way, the index indicated as a result of categorizing the one or more reconstructed pixel groups is selected out of a plurality of predefined indexes.

When the parsed first control parameter does not have the predefined value (No in S4203), in Step S4205, categorizer 4104 categorizes the one or more reconstructed pixel groups using the extracted features and the machine learning model. In this way the index indicated as a result of categorizing the one or more reconstructed pixel groups is selected out of a plurality of predefined indexes. The machine learning model used here is a machine learning model which has not been modified using the second control parameter.

Next, in Step S4208, selector 4105 selects one parameter set out of a plurality of predefined parameter sets using the selected index. The parameter set used here is the same as the parameter set selected in video encoding apparatus 3100 in the encoding process.

Lastly, in Step S4209, decoder 4101 decodes image samples of a current block using the selected parameter set. The decoding process in which the selected parameter set is used is, for example, one of or a combination of arbitrarily selected ones of an interpolation process and an averaging process in inter prediction, an in-loop filtering process, and an intra prediction process.

[Effects]

As described above, video encoding apparatus 3100 and video decoding apparatus 4100 make it possible to modify the machine learning model using the second control parameter. Accordingly, it is possible to categorize the one or more reconstructed pixel groups using the more appropriate machine learning model, thereby obtaining the more appropriate categorization result (that is, the parameter set).

Embodiment 9

Next, Embodiment 9 is described. Embodiment 9 differs from Embodiments 6 to 8 in that a second control parameter for selecting parameter sets for use in encoding/decoding process(es) without using any machine learning model may be included in a bitstream. This embodiment is described hereinafter mainly focusing on the differences from Embodiments 6 to 8 described above.

[Configuration of Video Encoding Apparatus]

Figure 39:
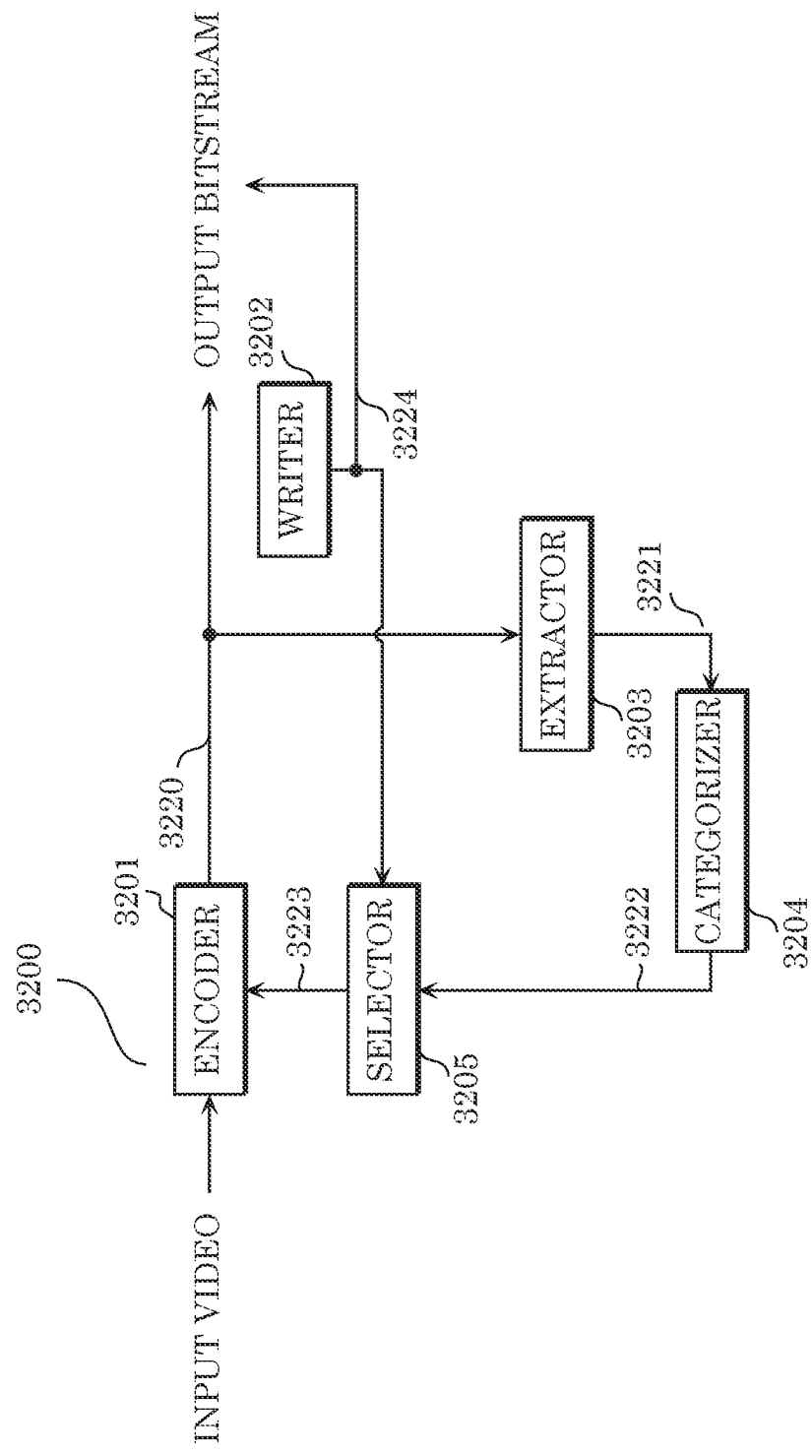
FIG. 39 is a block diagram illustrating a configuration of a video encoding apparatus according to Embodiment 9.

FIG. 39 is a block diagram illustrating a configuration of a video encoding apparatus according to Embodiment 9.

Video encoding apparatus 3200 encodes an input video/image on a per block basis to generate an encoded bitstream to be output. As illustrated in FIG. 39, video encoding apparatus 3200 includes: encoder 3201; extractor 3203; categorizer 3204; selector 3205; and writer 3202. Here, the respective constituent elements of video encoding apparatus 3200 are described.

The input video is input to encoder 3201, and encoded data 3220 is output to extractor 3203. Encoded data 3220 is, for example, one or more reconstructed pixel groups.

Extractor 3203 extracts one or more features 3221 from encoded data 3220, and transmits features 3221 to categorizer 3204.

Writer 3202 writes first control parameter to the bitstream to be output Writer 3202 writes a second control parameter to the bitstream to be output when the first control parameter has a predefined value. Control parameters 3224 (the first control parameter and the second control parameter) are transmitted to selector 3205. The positions of the first control parameter and the second control parameter in the bitstream to be output are the same as the positions of the control parameters in Embodiment 6, and thus the description thereof is not repeated.

Categorizer 3204 categorizes encoded data 3220 using extracted features 3221 and a machine learning model. As a result, index 3222 indicated as a result of categorizing encoded data 3220 is selected out of a plurality of predefined indexes. Selected index 3222 is output to selector 3205.

When the first control parameter has the predefined value, selector 3205 selects one parameter set 3223 out of a plurality of predefined parameter sets using the second parameter, and outputs selected parameter set 3223 to encoder 3201. When the first control parameter does not have the predefined value, selector 3205 selects one parameter set 3223 out of a plurality of predefined parameter sets using index 3222 selected by categorizer 3204, and outputs selected parameter set 3223 to encoder 3201.

Encoder 3201 encodes an input video using selected parameter set 3223.

[Operations Performed by Video Encoding Apparatus]

Next, descriptions are given of operations performed by video encoding apparatus 3200 configured as described above.

Figure 40:
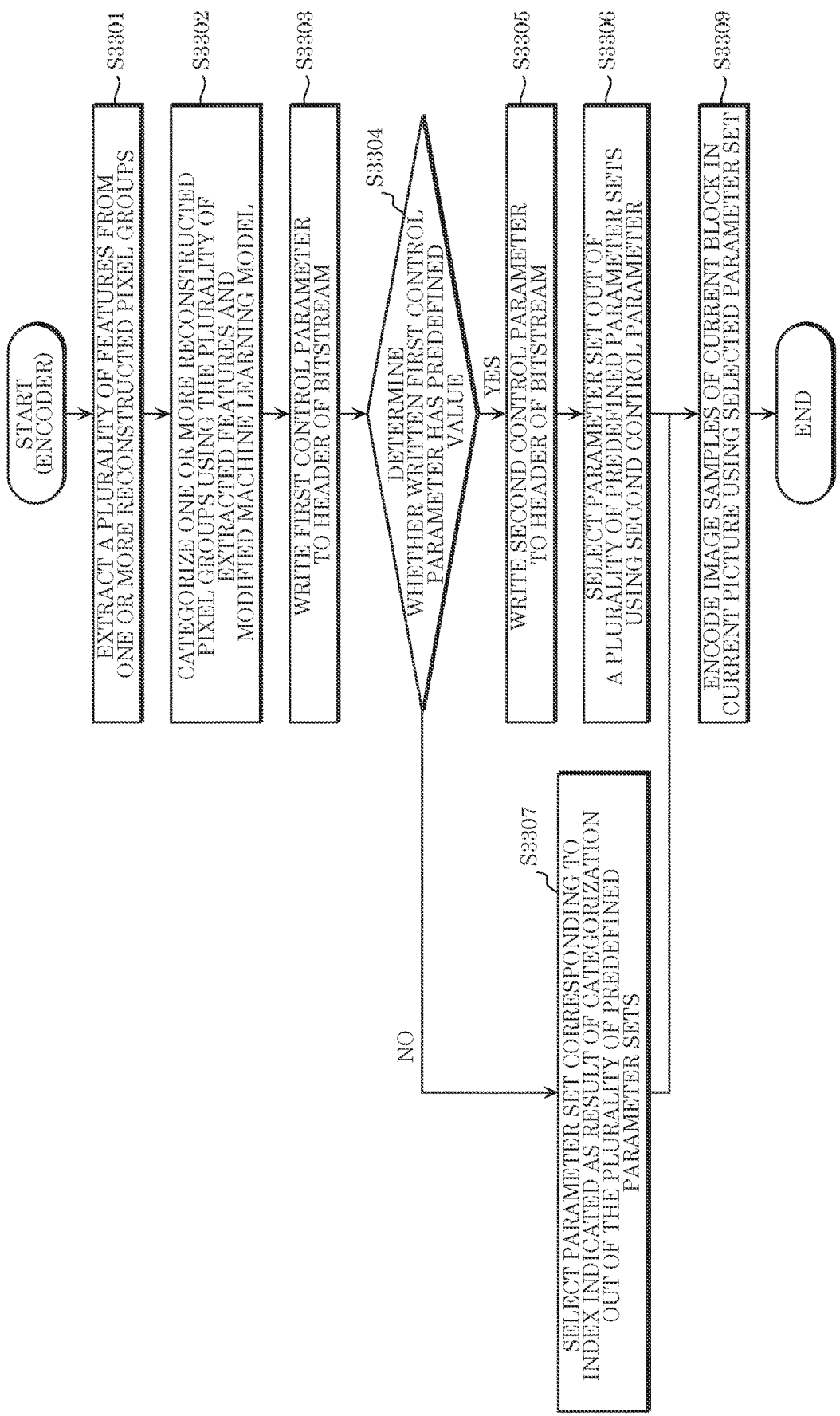
FIG. 40 is a flowchart indicating processes performed by a video encoding apparatus according to Embodiment 9.

FIG. 40 is a flowchart indicating processes performed by a video encoding apparatus according to Embodiment 9.

First, in Step S3301, extractor 3203 extracts one or more features from one or more reconstructed pixel groups.

Next, in Step S3302, categorizer 3204 categorizes the one or more reconstructed pixel groups using the extracted features and a machine learning model. In this way, the index indicated as a result of categorizing the one or more reconstructed pixel groups is selected out of a plurality of predefined indexes. The machine learning model is, for example, a support vector machine (SVM), an artificial neural network (ANN), or k-means clustering.

Next, in Step S3303, writer 3202 writes a first control parameter to the header of an encoded video stream.

Next, in Step S3304, whether the written control parameter has a predefined value or not is determined.

Here, when the first control parameter to be written has the predefined value (Yes in S3304), the following steps are performed.

First, in Step S3305, writer 3202 writes the second control parameter to the header of the bitstream. The second control parameter is a parameter for selecting one index out of a plurality of predefined indexes.

In Step S3306, selector 3205 selects one parameter set out of a plurality of predefined parameter sets using the second control parameter. The parameter sets are parameter sets which are used in an encoding process performed on a current block. Specifically the parameter sets may be, for example, filtering coefficient sets for use in an interpolation process for generating image pixels in inter prediction. In addition, for example, the parameter sets may be filtering coefficient sets for use in an in-loop filtering process performed on a current block. In addition, for example, the parameter sets may be intra prediction indexes. In addition, for example, the parameter sets may be weighting coefficient sets for use in an averaging process performed on a plurality of predictive blocks in inter prediction.

When the first control parameter to be written does not have the predefined value (No in S3304), in Step S3307, selector 3205 selects one parameter set out of a plurality of predefined parameter sets using the second control parameter.

Lastly in Step S3309, encoder 3201 encodes the image samples of the current block using the selected parameter set. The encoding process in which the selected parameter set is used is, for example, one of or a combination of arbitrarily selected ones of an interpolation process and an averaging process in inter prediction, an in-loop filtering process, and an intra prediction process.

[Configuration of Video Decoding Apparatus]

Figure 41:
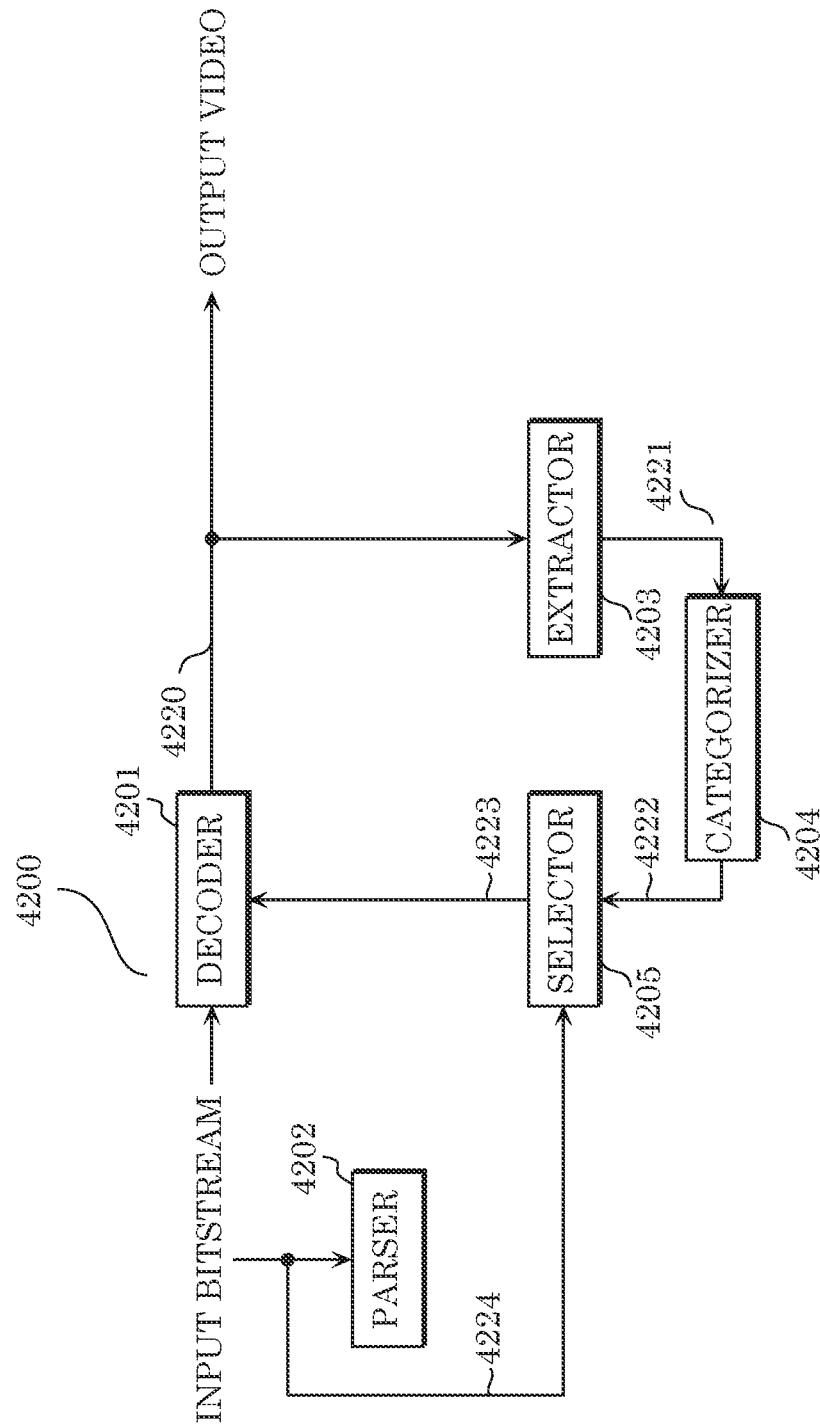
FIG. 41 is a block diagram illustrating a configuration of a video decoding apparatus according to Embodiment 9.

Next, descriptions are given of a configuration of a video decoding apparatus for decoding an encoded bitstream output from video encoding apparatus 3200 as described above. FIG. 41 is a block diagram illustrating the configuration of the video decoding apparatus according to Embodiment 9.

Video decoding apparatus 4200 decodes an input video/image bitstream on a per block basis, and outputs the decoded video/image. As illustrated in FIG. 41, video decoding apparatus 4200 includes: decoder 4201; extractor 4203; categorizer 4204; selector 4205; and parser 4202. Here, the respective constituent elements of video decoding apparatus 4200 are described.

The input bitstream is input to decoder 4201, and decoded data 4220 is output to extractor 4203. Decoded data 4220 is, for example, a reconstructed pixel group.

Extractor 4203 extracts one or more features 4221 from decoded data 4220, and transmits features 4221 to categorizer 4204.

Categorizer 4204 categorizes decoded data 4220 using extracted features 4221 and a machine learning model. Through the categorization, index 4222 indicated as a result of categorizing decoded data 4220 is selected out of a plurality of predefined indexes, and selected index 4222 is output to selector 4205.

Parser 4202 parses the first control parameter from an input bitstream. When a first control parameter has a predefined value, parser 4202 parses the second control parameter from an input bitstream. Parsed control parameters 4224 (the first control parameter and the second control parameter) are transmitted to selector 4205.

When the first control parameter has the predefined value, selector 4205 selects one parameter set 4223 out of a plurality of predefined parameter sets using the second control parameter, and outputs selected parameter set 4223 to decoder 4201. When the first control parameter does not have the predefined value, selector 4205 selects one parameter set 4223 out of the plurality of predefined parameter sets using index 4222 selected by categorizer 4204, and outputs selected parameter set 4223 to decoder 4201.

Decoder 4201 decodes an input video using selected parameter set 4223.

[Operations Performed by Video Decoding Apparatus]

Figure 42:
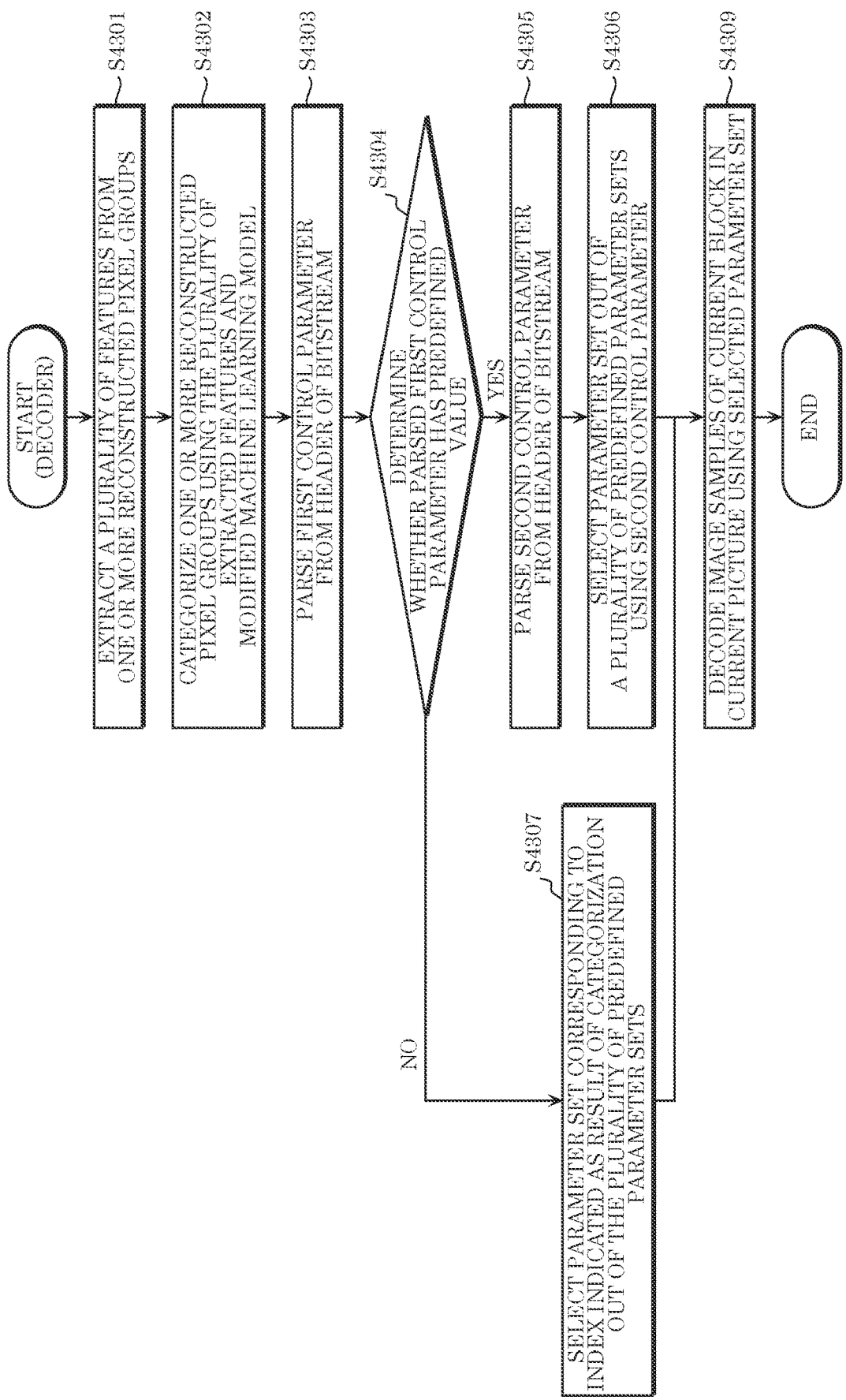
FIG. 42 is a flowchart indicating processes performed by a video decoding apparatus according to Embodiment 9.

Next, descriptions are given of operations performed by video decoding apparatus 4200 configured as described above. FIG. 42 is a flowchart indicating processes performed by a video decoding apparatus according to Embodiment 9.

First, in Step S4301, extractor 4203 extracts one or more features from one or more reconstructed pixel groups. These features are the same as the features used in video encoding apparatus 3200 in the encoding process.

Next, in Step S4302, categorizer 4204 categorizes the one or more reconstructed pixel groups using the extracted features and a machine learning model. In this way, the index indicated as a result of categorizing the one or more reconstructed pixel groups is selected out of a plurality of predefined indexes. The machine learning model used here is the same as the machine learning model used in video encoding apparatus 3200 in the encoding process.

Next, in Step S4303, parser 4202 parses a first control parameter from the header of an encoded video stream.

Next, in Step S4304, whether the parsed first control parameter has the predefined value or not is determined.

Here, when the parsed first control parameter has the predefined value (Yes in S4304), the following steps are performed.

First, in Step S4305, parser 4202 parses a second control parameter from the header of the bitstream. The second control parameter is used to select parameter sets to be used in a decoding process.

In Step S4306, selector 4205 selects one parameter set out of the plurality of predefined parameter sets using the parsed second control parameter set. The parameter set used here is the same as the parameter set selected in video encoding apparatus 3200 in the encoding process.

When the parsed first control parameter does not have the predefined value (No in S4304), in Step S4307, selector 4205 selects one parameter set out of the plurality of predefined parameter sets using the index selected in Step S4302.

Lastly, in Step S4309, decoder 4201 decodes the image samples of the current block using the selected parameter set. The decoding process in which the selected parameter set is used is, for example, one of or a combination of arbitrarily selected ones of an interpolation process and an averaging process in inter prediction, an in-loop filtering process, and an intra prediction process.

[Effects]

As described above, when the first control parameter has the predefined value, each of video encoding apparatus 3200 and video decoding apparatus 4200 makes it possible to perform the encoding process on the current block using the parameter set indicated by the second control parameter. Accordingly, it is possible to select either reduction in code amount by categorization by a machine learning model or reduction in processing load by the second control parameter, thereby balancing the processing load and the encoding efficiency.

Embodiment 10

Next, Embodiment 10 is described. Embodiment 10 differs from Embodiments 6 to 9 described above in that a control parameter for switching feature extraction methods between a first method and a second method is included in a bitstream. This embodiment is described hereinafter mainly focusing on the differences from Embodiments 6 to 9 described above.

[Configuration of Video Encoding Apparatus]

Figure 43:
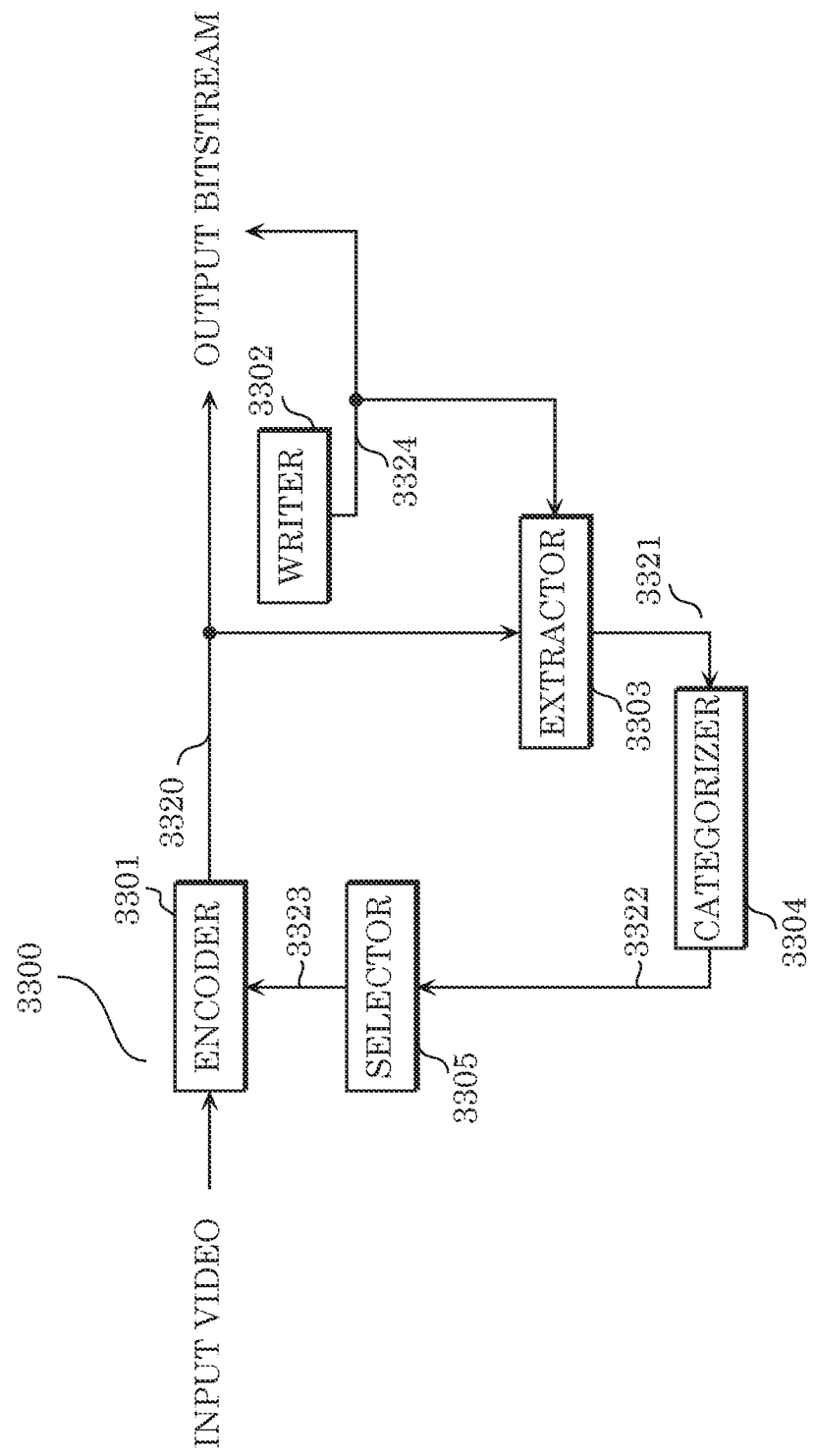
FIG. 43 is a block diagram illustrating a configuration of a video encoding apparatus according to Embodiments 10 and 11.

FIG. 43 is a block diagram illustrating a configuration of a video encoding apparatus according to Embodiments 10 and 11.

Video encoding apparatus 3300 encodes an input video/image on a per block basis to generate an encoded bitstream to be output. As illustrated in FIG. 43, video encoding apparatus 3300 includes: encoder 3301; extractor 3303; categorizer 3304; selector 3305; and writer 3302. Here, the respective constituent elements of video encoding apparatus 3300 are described.

The input video is input to encoder 3301, and encoded data 3320 is output to extractor 3303. Encoded data 3320 is, for example, one or more reconstructed pixel groups.

Writer 3302 writes control parameter 3324 to the bitstream to be output. Furthermore, writer 3302 transmits control parameter 3324 to extractor 3303. The position of control parameter 3324 in the bitstream to be output is the same as the position of any of the control parameters in Embodiment 6, and thus the description thereof is not repeated.

When control parameter 3324 has a predefined value, extractor 3303 extracts one or more features 3321 from encoded data 3320 using the predetermined first method, and transmits features 3321 to categorizer 3304. When control parameter 3324 does not have the predefined value, extractor 3303 extracts one or more features 3321 from encoded data 3320 using the predetermined second method different from the first method, and transmits features 3321 to categorizer 3304.

The features extracted using the first method and the features extracted using the second methods are different from each other. For example, the features extracted using the first method may be luminance variance values in a block, and the features extracted using the second methods may be SIFTs.

Categorizer 3304 categorizes encoded data 3320 using extracted features 3221 and a machine learning model. In this way, the index indicated as a result of categorizing encoded output data 3320 is selected out of a plurality of predefined indexes, and selected index 3322 is output to selector 3305.

Selector 3305 selects one parameter set 3323 out of a plurality of parameter sets using selected index 3322, and outputs selected parameter set 3323 to encoder 3301.

Encoder 3301 encodes an input video using selected parameter set 3323.

[Operations Performed by Video Encoding Apparatus]

Next, descriptions are given of operations performed by video encoding apparatus 3300 configured as described above.

Figure 44:
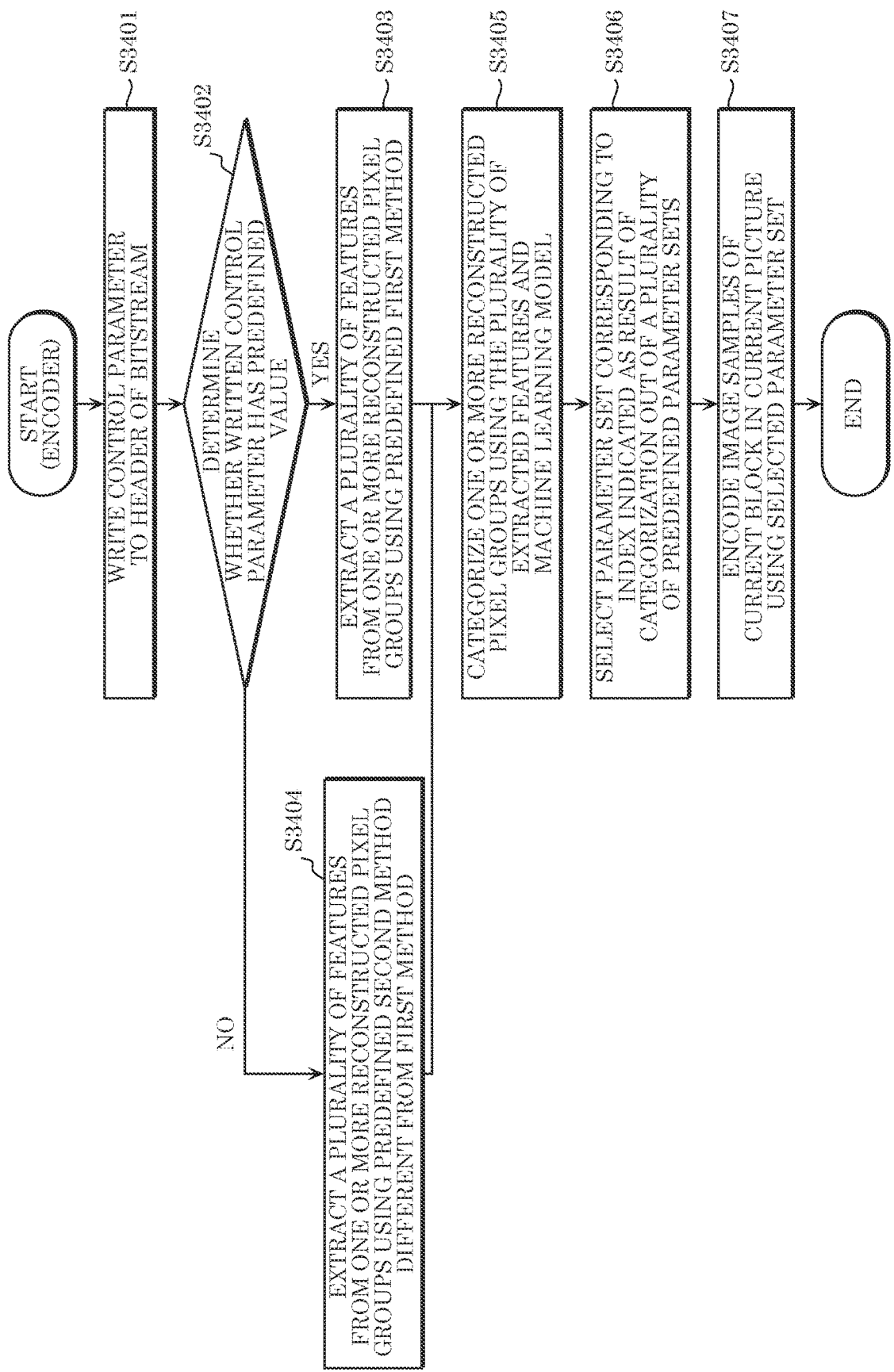
FIG. 44 is a flowchart indicating processes performed by a video encoding apparatus according to Embodiment 10.

FIG. 44 is a flowchart indicating processes performed by a video encoding apparatus according to Embodiment 10.

First, in Step S3401, writer 3302 writes a control parameter to the header of an encoded video stream.

Next, in Step S3402, whether the written control parameter has a predefined value or not is determined.

Here, when the written control parameter has the predefined value (Yes in S3402), in Step S3403, extractor 3303 extracts one or more features from one or more reconstructed pixel groups using a predetermined first method.

When the written control parameter does not have the predefined value (No in S3402), in Step S3404, extractor 3303 extracts one or more features from one or more reconstructed pixel groups using a predetermined second method different from the first method.

Next, in Step S3405, categorizer 3304 categorizes the one or more reconstructed pixel groups using the extracted features and a machine learning model. In this way the index indicated as a result of categorizing the one or more reconstructed pixel groups is selected out of a plurality of predefined indexes.

Next, in Step S3406, selector 3305 selects one parameter set out of the plurality of parameter sets using the index selected in Step S3405.

Lastly, in Step S3407, encoder 3301 encodes the image samples of the current block using the selected parameter set. The encoding process in which the predefined decoding parameter set is used is, for example, one of or a combination of arbitrarily selected ones of an interpolation process and an averaging process in inter prediction, an in-loop filtering process, and an intra prediction process.

[Configuration of Video Decoding Apparatus]

Figure 45:
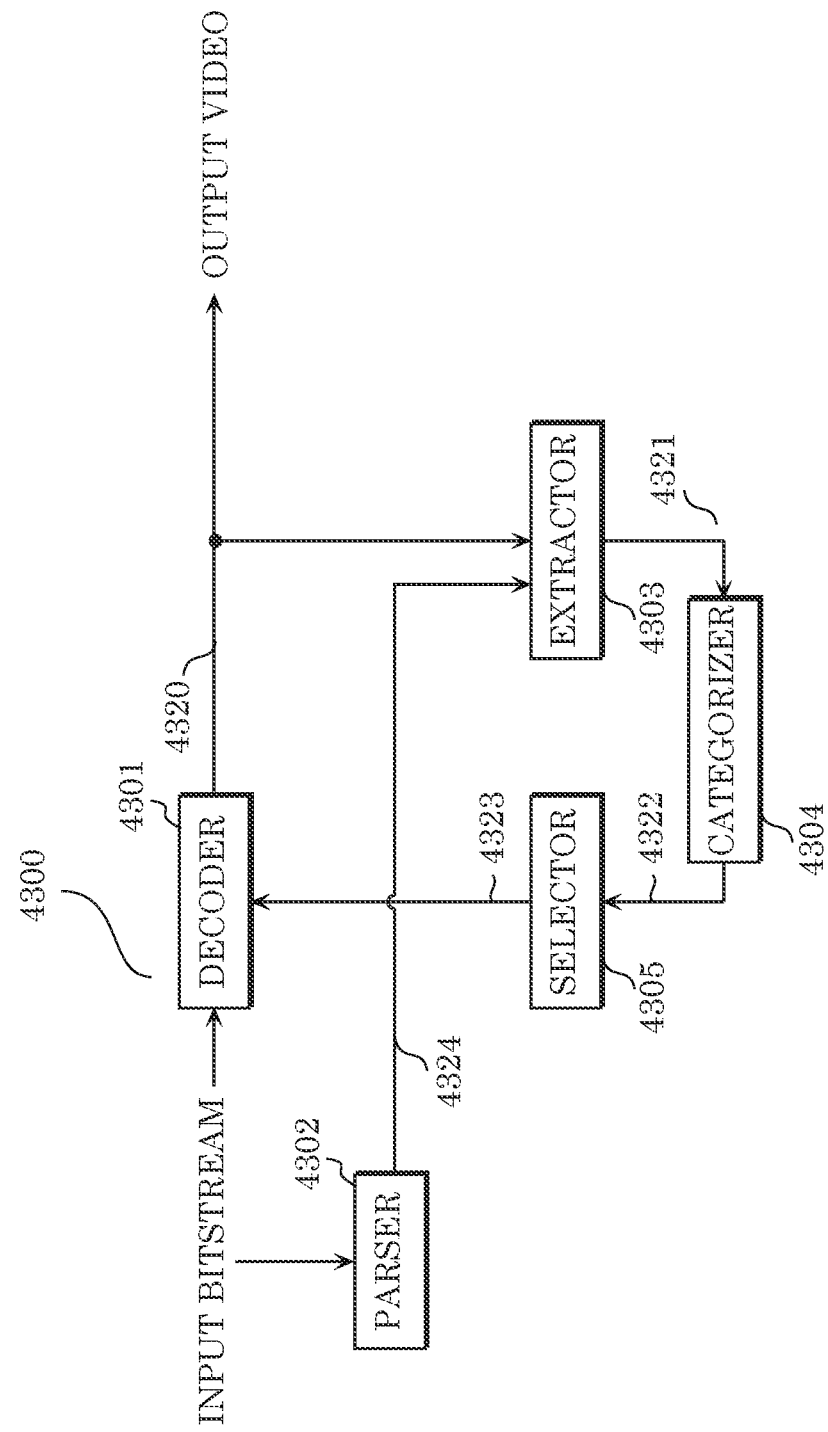
FIG. 45 is a block diagram illustrating a configuration of a video decoding apparatus according to Embodiments 10 and 11.

Next, descriptions are given of a configuration of a video decoding apparatus for decoding an encoded bitstream output from video encoding apparatus 3300 as described above. FIG. 45 is a block diagram illustrating a configuration of a video decoding apparatus according to Embodiments 10 and 11.

Video decoding apparatus 4300 decodes an input video/image bitstream on a per block basis, and outputs a video an image. As illustrated in FIG. 45, video decoding apparatus 4300 includes: decoder 4301; extractor 4303: categorizer 4304; selector 4305: and parser 4302. Here, the respective constituent elements of video decoding apparatus 4300 are described.

The input bitstream is input to decoder 4301, and decoded data 4320 is output to extractor 4303. Decoded data 4320 is, for example, one or more reconstructed pixel groups.

Parser 4302 parses a control parameter from the input bitstream. Parser 4302 transmits the parsed control parameter to extractor 4303.

When the control parameter has a predefined value, extractor 4303 extracts one or more features 4321 from decoded data 4320 using the predetermined first method, and transmits features 4321 to categorizer 4304. When control parameter 3324 does not have the predefined value, extractor 4303 extracts one or more features 4321 from encoded data 4320 using the predetermined second method different from the first method, and transmits features 4321 to categorizer 4304.

Categorizer 4304 categorizes decoded data 4320 using extracted features 4321 and a machine learning model. In this way, the index indicated as a result of categorizing decoded data 4320 is selected out of a plurality of predefined indexes, and selected index 4322 is output to selector 4305.

Selector 4305 selects one parameter set 4323 out of a plurality of parameter sets using selected index 4322, and outputs selected parameter set 4323 to decoder 4301.

Decoder 4301 decodes an input video using selected parameter set 4323.

[Operations Performed by Video Decoding Apparatus]

Figure 46:
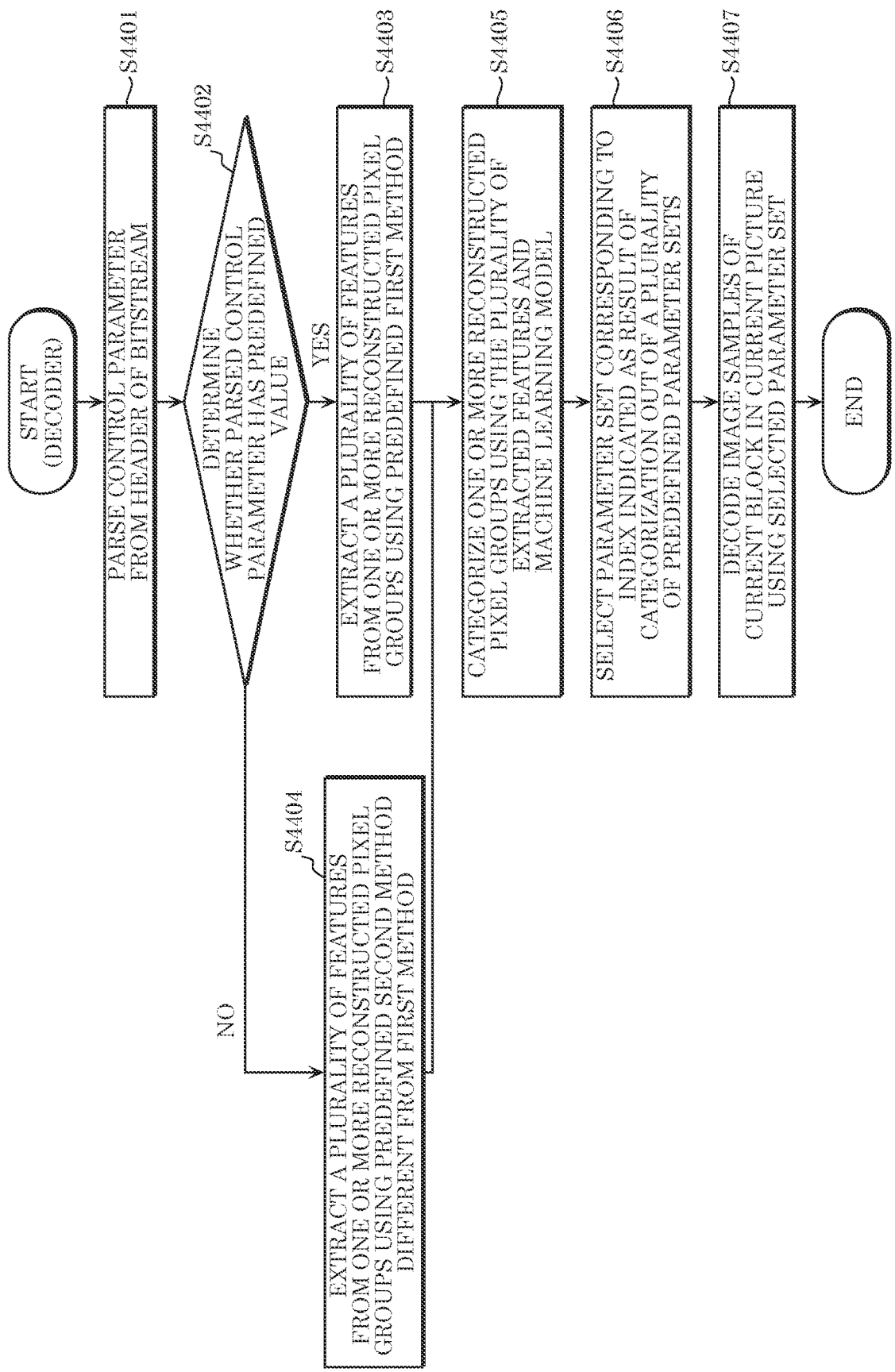
FIG. 46 is a flowchart indicating processes performed by a video decoding apparatus according to Embodiment 10.

Next, descriptions are given of operations performed by video decoding apparatus configured as described above. FIG. 46 is a flowchart indicating processes performed by a video decoding apparatus according to Embodiment 10.

Next, in Step S4401, parser 4302 parses a control parameter from the header of an encoded video stream.

Next, in Step S4402, whether each parsed control parameter has a predefined value or not is determined.

Here, when the parsed control parameter has the predefined value (Yes in S4402), in Step S4403, extractor 4303 extracts one or more features from one or more reconstructed pixel groups using a predetermined first method. When the parsed control parameter does not have the predefined value (No in S4402), in Step S4404, extractor 4303 extracts one or more features from one or more reconstructed pixel groups using a predetermined second method different from the first method. These features are the same as the features used in video encoding apparatus 3400 in the encoding process.

Next, in Step S4405, categorizer 4304 categorizes one or more reconstructed pixel groups using the extracted features and a machine learning model. In this way the index indicated as a result of categorizing the one or more reconstructed pixel groups is selected out of a plurality of predefined indexes. The machine learning model used here is the same as the machine learning model used in video encoding apparatus 3400 in the encoding process.

Next, in Step S4406, selector 4305 selects one parameter set out of the plurality of parameter sets using the index selected in Step S4405.

Lastly, in Step S4407, decoder 4301 decodes image samples of a current block using the selected parameter set. The decoding process in which the selected parameter set is used is, for example, one of or a combination of arbitrarily selected ones of an interpolation process and an averaging process in inter prediction, an in-loop filtering process, and an intra prediction process.

[Effects]

As described above, each of video encoding apparatus 3300 and video decoding apparatus 4300 makes it possible to switch feature extraction methods between the first method and the second method according to whether the control parameter has the predefined value or not. Accordingly, it is possible to extract the one or more features using the method which is more suitable for the current block.

Embodiment 11

Next, Embodiment 11 is described. Embodiment 11 differs from Embodiments 6 to 10 described above in that a control parameter for controlling a feature extraction method is included in a bitstream. This embodiment is described hereinafter mainly focusing on the differences from Embodiments 6 to 10 described above.

[Configuration of Video Encoding Apparatus]

The video encoding apparatus according to this embodiment has a configuration that is substantially the same as the configuration of the video encoding apparatus according to Embodiment 10. Accordingly the configuration of the video encoding apparatus according to this embodiment is described with reference to FIG. 43 mainly focusing on the differences from the video encoding apparatus according to Embodiment 10.

Writer 3302 writes control parameter 3324 to the bitstream to be output in order to control the feature extraction method. Furthermore, writer 3302 transmits control parameter 3324 to extractor 3303. The position of control parameter 3324 in the bitstream to be output is the same as the position of any of the control parameters in Embodiment 6, and thus the description thereof is not repeated.

Extractor 3303 extracts one or more features 3321 from encoded data 3320 using the predefined extractio method indicated by control parameter 3324, and transmits features 3321 to categorizer 3304.

[Operations Performed by Video Encoding Apparatus]

Figure 47:
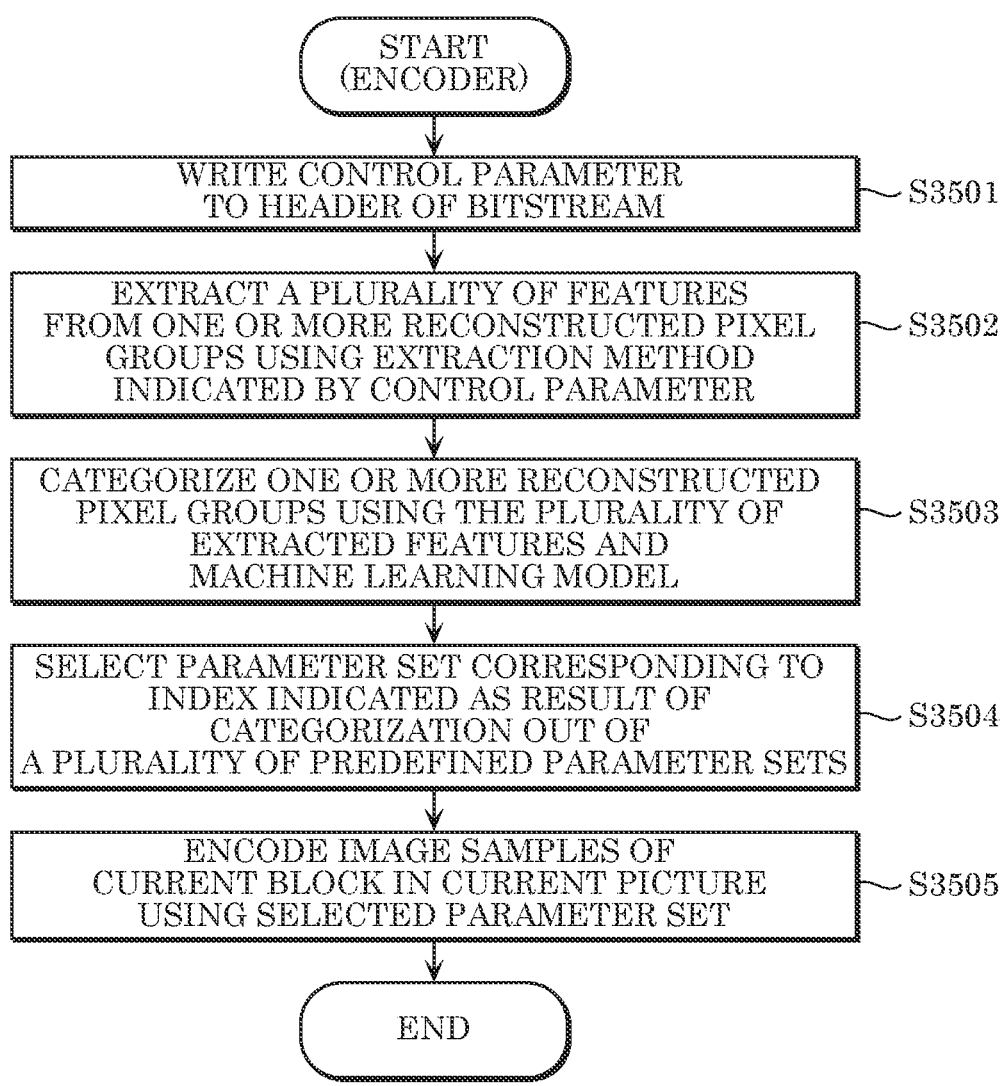
FIG. 47 is a flowchart indicating processes performed by a video encoding apparatus according to Embodiment 11.

Next, descriptions are given of operations performed by a video encoding apparatus configured as described above. FIG. 47 is a flowchart indicating processes performed by a video encoding apparatus according to Embodiment 11.

First, in Step S3501, writer 3302 writes a control parameter indicating the feature extraction method to the header of an encoded video stream.

In Step S3502, extractor 3303 extracts one or more features from one or more reconstructed pixel groups using the extraction method indicated by the written control parameter. This control parameter controls the types of the features to be extracted from the one or more reconstructed pixel groups or the extraction method. For example, the control parameter may indicate the size (width and height) of an image block for which a feature is to be extracted. In addition, the control parameter may indicate the type of the feature. Examples of feature types include luminance information, gradient information, variance information, a Gabor filter, LBP, SIFT, HOG, FV, etc.

Next, in Step S3503, categorizer 3304 categorizes the one or more reconstructed pixel groups using the extracted features and a machine learning model. In this way the index indicated as a result of categorizing the one or more reconstructed pixel groups is selected out of a plurality of predefined indexes.

Next, in Step S3504, selector 3305 selects one parameter set out of the plurality of predefined parameter sets using the index selected in Step S3503.

Lastly in Step S3505, encoder 3301 encodes the image samples of the current block using the selected parameter set. The encoding process in which the selected parameter set is used is, for example, one of or a combination of arbitrarily selected ones of an interpolation process and an averaging process in inter prediction, an in-loop filtering process, and an intra prediction process.

[Configuration of Video Decoding Apparatus]

Next, descriptions are given of a configuration of a video decoding apparatus for decoding an encoded bitstream output from video encoding apparatus 3300 as described above. The video decoding apparatus according to this embodiment has a configuration that is substantially the same as the configuration of the video decoding apparatus according to Embodiment 10. Accordingly the configuration of the video decoding apparatus according to this embodiment is described with reference to FIG. 45 mainly focusing on the differences from the video decoding apparatus according to Embodiment 10.

Parser 4302 parses control parameter 4324 for controlling a feature extraction method from the input bitstream. Parser 4302 transmits parsed control parameter 4324 to extractor 4303.

Extractor 4303 extracts one or more features 4321 from decoded data 4320 using the extraction method indicated by control parameter 4324, and transmits features 4321 to categorizer 4304.

[Operations Performed by Video Decoding Apparatus]

Figure 48:
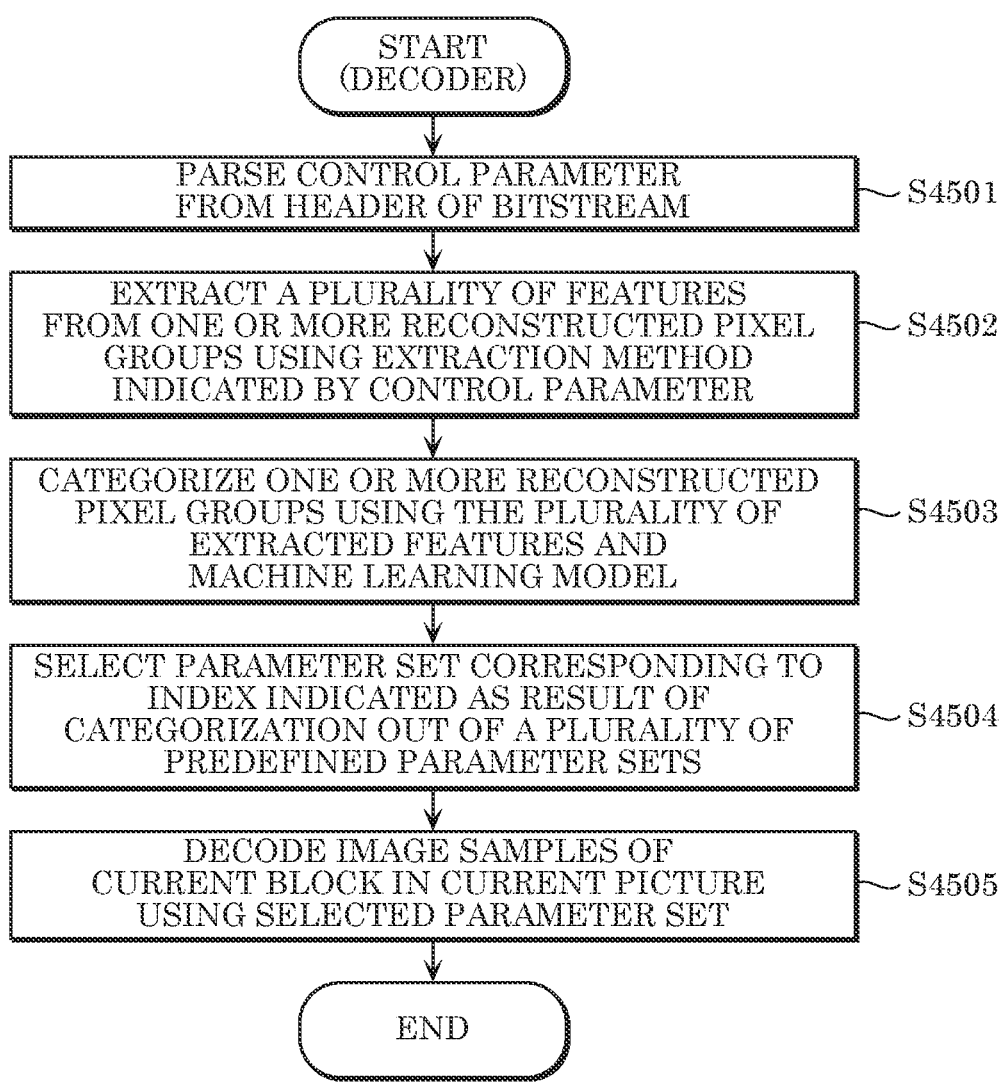
FIG. 48 is a flowchart indicating processes performed by a video decoding apparatus according to Embodiment 11.

Next, descriptions are given of operations performed by video decoding apparatus 4300 configured as described above. FIG. 48 is a flowchart indicating processes performed by a video decoding apparatus according to Embodiment 11.

Next, in Step S4501, parser 4302 parses a control parameter from the header of an encoded video stream.

In Step S4502, extractor 4303 extracts one or more features from one or more reconstructed pixegroups using the extraction method indicated by the parsed control parameter.

Next, in Step S4503, categorizer 4304 categorizes one or more reconstructed pixegroups using the extracted features and a machine learning model. In this way the index indicated as a result of categorizing the one or more reconstructed pixegroups is selected out of a plurality of predefined indexes. The machine learning mode used here is the same as the machine learning mode used in video encoding apparatus 3300 in the encoding process.

Next, in Step S4504, selector 4305 selects a parameter set out of the plurality of parameter sets using the index selected in Step S4503.

Lastly, in Step S4505, decoder 4301 decodes the image samples of the current block using the selected parameter set. The decoding process in which the selected parameter set is used is, for example, one of or a combination of arbitrarily selected ones of an interpolation process and an averaging process in inter prediction, an in-loop filtering process, and an intra prediction process.

[Effects]

As described above, each of video encoding apparatus 3300 and video decoding apparatus 4300 makes it possible to extract the one or more features using the extraction method indicated by the control parameter. Accordingly, it is possible to select the extraction method more flexibly; thereby being able to extract the features using the method more suitable for each current block.

Embodiment 12

Next, Embodiment 12 is described. Embodiment 12 differs from Embodiments 6 to 11 in that an index is derived from a block which is spatially or temporally neighboring a current block according to a control parameter. This embodiment is described hereinafter mainly focusing on the differences from Embodiments 6 to 11 described above.

[Configuration of Video Encoding Apparatus]

Figure 49:
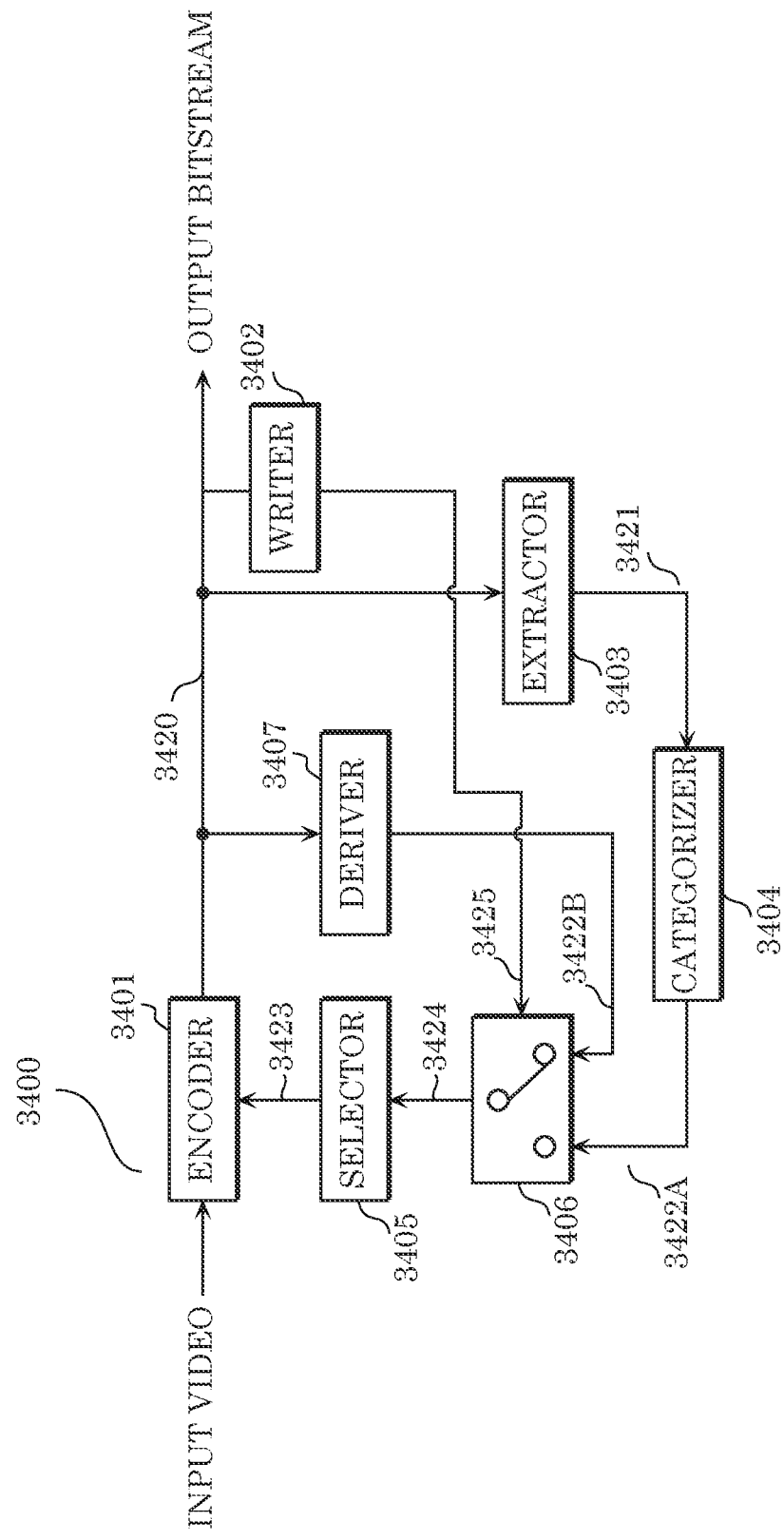
FIG. 49 is a block diagram illustrating a configuration of a video encoding apparatus according to Embodiment 12.

FIG. 49 is a block diagram illustrating a configuration of a video encoding apparatus according to Embodiment 12.

Video encoding apparatus 3400 encodes an input video/image on a per block basis to generate an encoded bitstream to be output. As illustrated in FIG. 49, video encoding apparatus 3400 includes: encoder 3401; extractor 3403; categorizer 3404; selector 3405; switch 3406; deriver 3407; and writer 3402. Here, the respective constituent elements of video encoding apparatus 3400 are described.

The input video is input to encoder 3401, and encoded data 3420 is output to extractor 3403. Encoded data 3420 is, for example, one or more reconstructed pixegroups.

Extractor 3403 extracts one or more features 3421 from encoded data 3420, and transmits features 3421 to categorizer 3404.

Categorizer 3404 categorizes encoded data 3420 using extracted features 3421 and a machine learning model. In this way, index 3422A indicated as a result of categorizing encoded data 3420 is selected out of a plurality of predefined indexes, and selected index 3322A is output to switch 3406.

Writer 3402 writes control parameter 3425 to the bitstream to be output. Furthermore, writer 3402 transmits control parameter 3425 to switch 3406. The position of control parameter 3425 in the bitstream to be output is the same as the position of any of the control parameters in Embodiment 6, and thus the description thereof is not repeated.

Deriver 3407 derives index 3422B from a block which is spatially or temporally neighboring a current block, and outputs derived index 3422B to switch 3406. For example, deriver 3407 derives the index used in the block spatially or temporally neighboring the current block. A temporally neighboring block is an image block included in a reference picture different from a current picture, and a spatially neighboring block is an image block located in the same current picture.

Switch 3406 switches either transmission of index 3422A from categorizer 3404 to selector 3405 or transmission of index 3422B from deriver 3407 to selector 3405, according to the value of the control parameter. In other words, through switch 3406, one of index 3422A and index 3422B is transmitted to selector 3405 as index 3424.

Selector 3405 selects one parameter set 3423 out of a plurality of predefined parameter sets using index 3424 transmitted from switch 3406, and outputs selected parameter set 3423 to encoder 3401.

Encoder 3401 encodes an input video using the selected parameter set.

[Operations Performed by Video Encoding Apparatus]

Next, descriptions are given of operations performed by a video encoding apparatus configured as described above.

Figure 50:
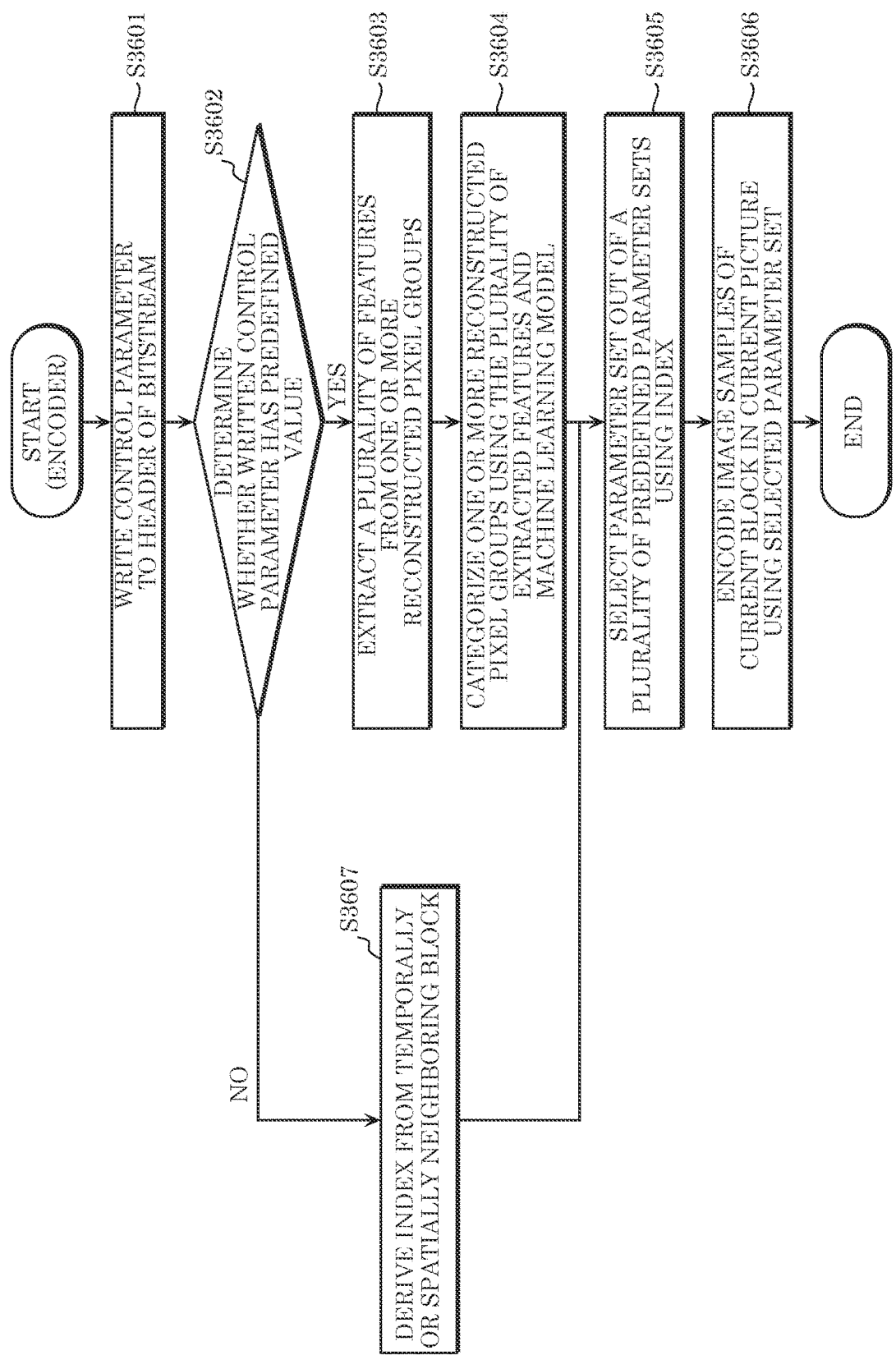
FIG. 50 is a flowchart indicating processes performed by a video encoding apparatus according to Embodiment 12.

FIG. 50 is a flowchart indicating processes performed by a video encoding apparatus according to Embodiment 12.

First, in Step S3601, writer 3402 writes a control parameter to the header of an encoded video stream.

Here, when the written control parameter has the predefined value (Yes in S3602), the following steps are performed.

First, in Step S3603, extractor 3403 extracts one or more features from one or more reconstructed pixegroups.

Next, in Step S3604, categorizer 3404 categorizes the one or more reconstructed pixegroups using the extracted features and a machine learning model. In this way the index indicated as a result of categorizing the one or more reconstructed pixegroups is selected out of a plurality of predefined indexes.

When the written control parameter does not have the predefined value (No in S3602), in Step S3607, deriver 3407 derives an index from a spatially or temporally neighboring block.

Next, in Step S3605, selector 3405 selects one decoding parameter set out of a plurality of predefined decoding parameter sets using the selected index.

Lastly, in Step S3606, encoder 3401 encodes the image samples of the current block using the selected parameter set. The encoding process in which the selected parameter set is used is, for example, one of or a combination of arbitrarily selected ones of an interpolation process and an averaging process in inter prediction, an in-loop filtering process, and an intra prediction process.

[Configuration of Video Decoding Apparatus]

Figure 51:
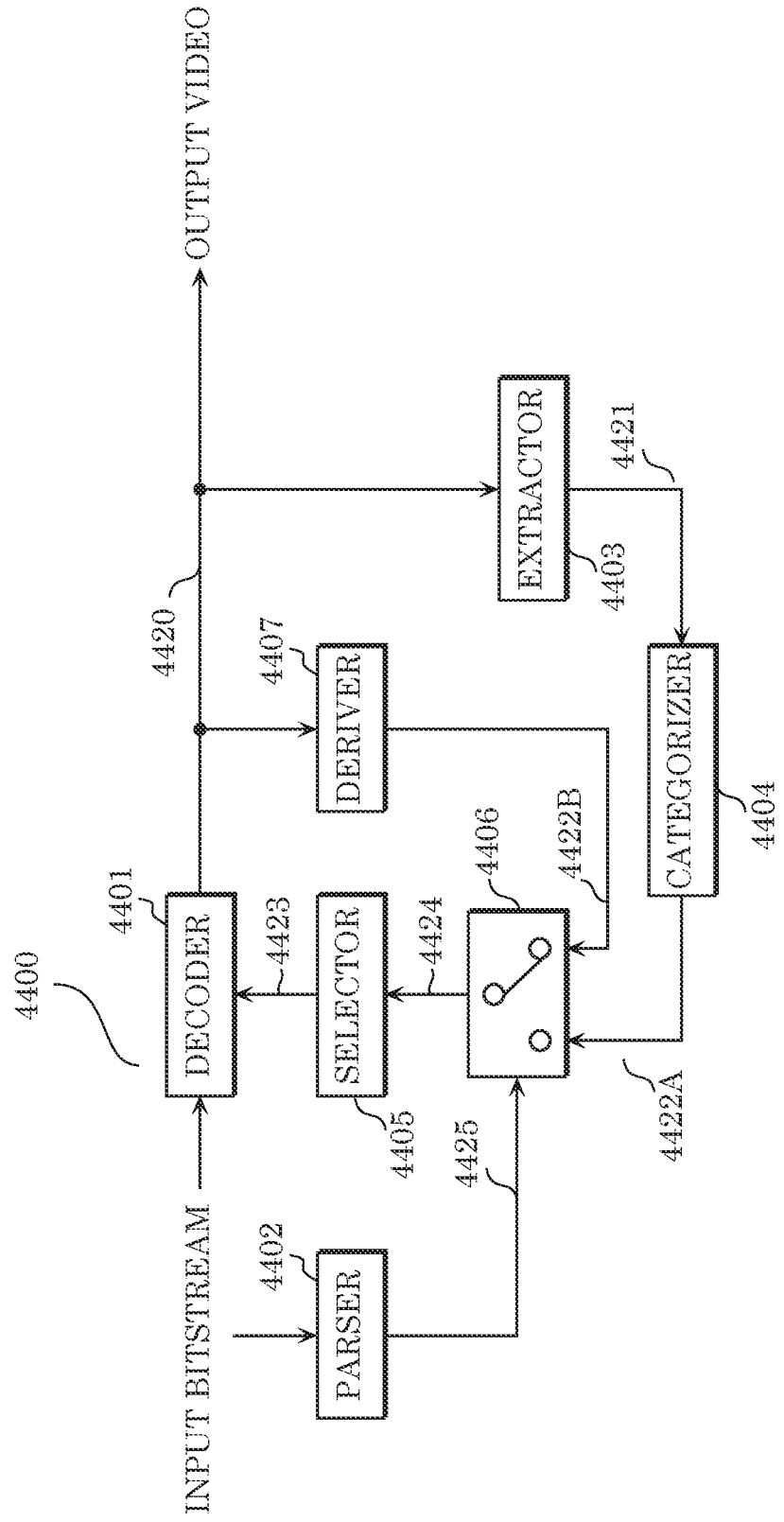
FIG. 51 is a block diagram illustrating a configuration of a video decoding apparatus according to Embodiment 12.

Next, descriptions are given of a configuration of a video decoding apparatus for decoding an encoded bitstream output from video encoding apparatus 3400 as described above. FIG. 51 is a block diagram illustrating the configuration of the video decoding apparatus according to Embodiment 12.

Video decoding apparatus 4400 decodes an input video/image bitstream on a per block basis, and outputs the decoded video/image. As illustrated in FIG. 51, video decoding apparatus 4400 includes: decoder 4401; extractor 4403; categorizer 4404; selector 4405; switch 4406; deriver 4407; and parser 4402. Here, the respective constituent elements of video decoding apparatus 4400 are described.

The encoded input bitstream is input to decoder 4401, and decoded data 4420 is output to extractor 4403. Decoded data 4420 is, for example, one or more reconstructed pixegroups.

Extractor 4403 extracts one or more features 4441 from decoded data. 4420, and transmits features 4421 to categorizer 4404.

Categorizer 4404 categorizes decoded data 4420 using extracted features 4421 and a machine learning model. In this way index 4422A indicated as a result of categorizing decoded data 4420 is selected out of a plurality of predefined indexes, and selected index 4422A is output to selector 4405.

Parser 4402 parses control parameter 4425 from the input bitstream. Furthermore, parser 4402 transmits control parameter 4425 to switch 4406.

Deriver 4407 derives index 4422B from a block which is spatially or temporally neighboring a current block, and outputs derived index 4422B to switch 4406.

Switch 4406 switches either transmission of index 4422A from categorizer 4404 to selector 4405 or transmission of index 4422B from deriver 4407 to selector 4405, according to the value of the control parameter. In other words, through switch 4406, one of index 4422A and index 44221B is transmitted to selector 4405 as index 4424.

Selector 4405 selects one parameter set 4423 out of a plurality of predefined parameter sets using index 4424 transmitted from switch 4406, and outputs selected parameter set 4423 to decoder 4401.

Decoder 4401 decodes an encoded video using selected parameter set 4423.

[Operations Performed by Video Decoding Apparatus]

Figure 52:
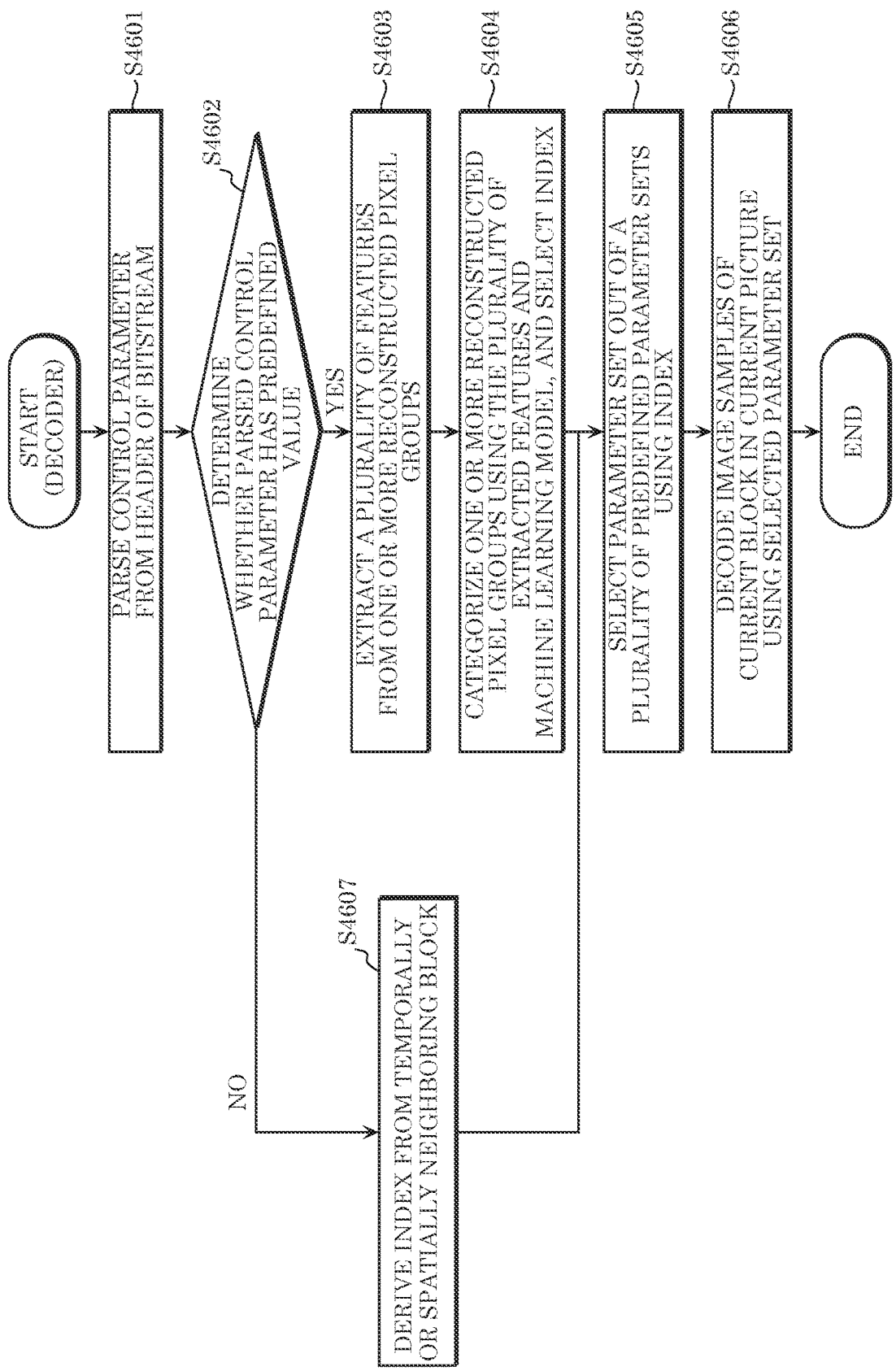
FIG. 52 is a flowchart indicating processes performed by a video decoding apparatus according to Embodiment 12.

Next, descriptions are given of operations performed by video decoding apparatus 4400 configured as described above. FIG. 52 is a flowchart indicating processes performed by a video decoding apparatus according to Embodiment 12.

First, in Step S4601, parser 4402 parses a control parameter from the header of an encoded video stream. When the control parameter does not have a predefined value, the parameter indicates a low complexity mode.

In Step S4602, whether each parsed control parameter has the predefined value or not is determined.

Here, when the parsed control parameter has the predefined value (Yes in S4602), the following steps are performed.

In Step S4603, extractor 4403 extracts one or more features from one or more reconstructed pixel groups. These features are the same as the features used in video encoding apparatus 3400 in the encoding process.

Next, in Step S4604, categorizer 4404 categorizes one or more reconstructed pixel groups using the extracted features and a machine learning model. In this way, the index indicated as a result of categorizing the one or more reconstructed pixel groups is selected out of a plurality of predefined indexes. The machine learning model used here is the same as the machine learning model used in video encoding apparatus 3400 in the encoding process.

When the parsed control parameter does not have the predefined value, in Steps S4607, deriver 4407 derives an index from a spatially or temporally neighboring block.

Next, in Step S4605, selector 4405 selects one parameter set out of a plurality of predefined parameter sets using the selected or derived index.

Lastly in Step S4606, decoder 4401 decodes the image samples of the current block using the selected parameter set. The decoding process in which the selected parameter set is used is, for example, one of or a combination of arbitrarily selected ones of an interpolation process and an averaging process in inter prediction, an in-loop filtering process, and an intra prediction process.

[Effects]

As described above, each of video encoding apparatus 3400 and video decoding apparatus 4400 makes it possible to selectively use either the parameter set derived from the neighboring block or the parameter set obtained through the categorization using the machine learning model. Accordingly when the parameter set derived from the neighboring block is suitable for encoding/decoding to be performed on the current block, it is possible to reduce the processing load by using the parameter set derived from the neighboring block.

Embodiment 13

Next, Embodiment 13 is described Embodiment 13 differs from Embodiments 6 to 12 in that the index itself of the parameter set is included in a bitstream according to the value of a control parameter. This embodiment is described hereinafter mainly focusing on the differences from Embodiments 6 to 12 described above.

[Configuration of Video Encoding Apparatus]

Figure 53:
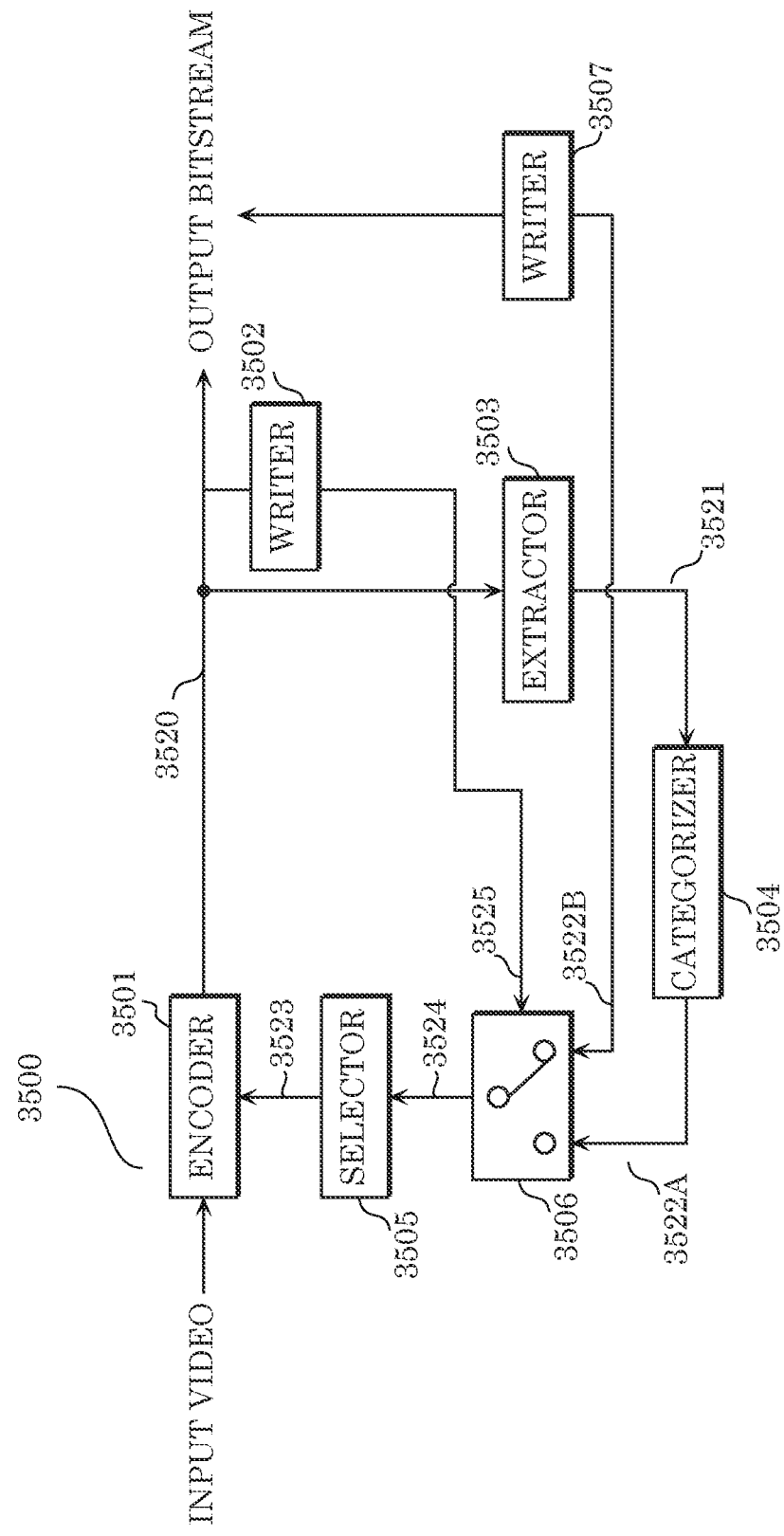
FIG. 53 is a block diagram illustrating a configuration of a video encoding apparatus according to Embodiment 13.

FIG. 53 is a block diagram illustrating a configuration of a video encoding apparatus according to Embodiment 13.

Video encoding apparatus 3500 encodes an input video/image on a per block basis to generate an encoded bitstream to be output. As illustrated in FIG. 53, video encoding apparatus 3500 includes: encoder 3501; extractor 3503; categorizer 3504; selector 3505; switch 3506; writer 3507; and writer 3502. Here, the respective constituent elements of video encoding apparatus 3500 are described.

The input video is input to encoder 3501, and encoded data 3520 is output to extractor 3503, Encoded data 3520 is, for example, one or more reconstructed pixel groups.

Extractor 3503 extracts one or more features 3521 from encoded data 3520, and transmits features 3521 to categorizer 3504.

Categorizer 3504 categorizes encoded data 3520 using extracted features 3521 and a machine learning model. In this way, index 3522A indicated as a result of categorizing encoded data 3520 is selected out of a plurality of predefined indexes, and selected index 3522A is output to switch 3506.

Writer 3502 writes control parameter 3525 to the bitstream to be output. Furthermore, writer 3502 transmits control parameter 3525 to switch 3506.

Writer 3507 writes index 352213 into a bitstream to be output, and transmits the bitstream including written index 3522B to switch 3506.

The position of control parameter 3525 in the bitstream to be output is the same as the position of any of the control parameters in Embodiment 6, and thus the description thereof is not repeated. The position of index 3522B may be the same as the position of control parameter 3525. When the index cannot be parsed from the header, an index may be derived from a spatially or temporally neighboring block.

Switch 3506 switches either transmission of index 3522A from categorizer 3504 to selector 3505 or transmission of index 3522B from writer 3507 to selector 3505, according to the value of the control parameter. In other words, through switch 3506, one of index 3522A and index 3522B is transmitted to selector 3505 as index 3524.

Selector 3505 selects one parameter set 3523 out of a plurality of predefined parameter sets using index 3524 transmitted from switch 3506, and outputs selected parameter set 3523 to encoder 3501.

Encoder 3501 encodes an input video using selected parameter set 3523.

[Operations Performed by Video Encoding Apparatus]

Next, descriptions are given of operations performed by video encoding apparatus 3500 configured as described above.

Figure 54:
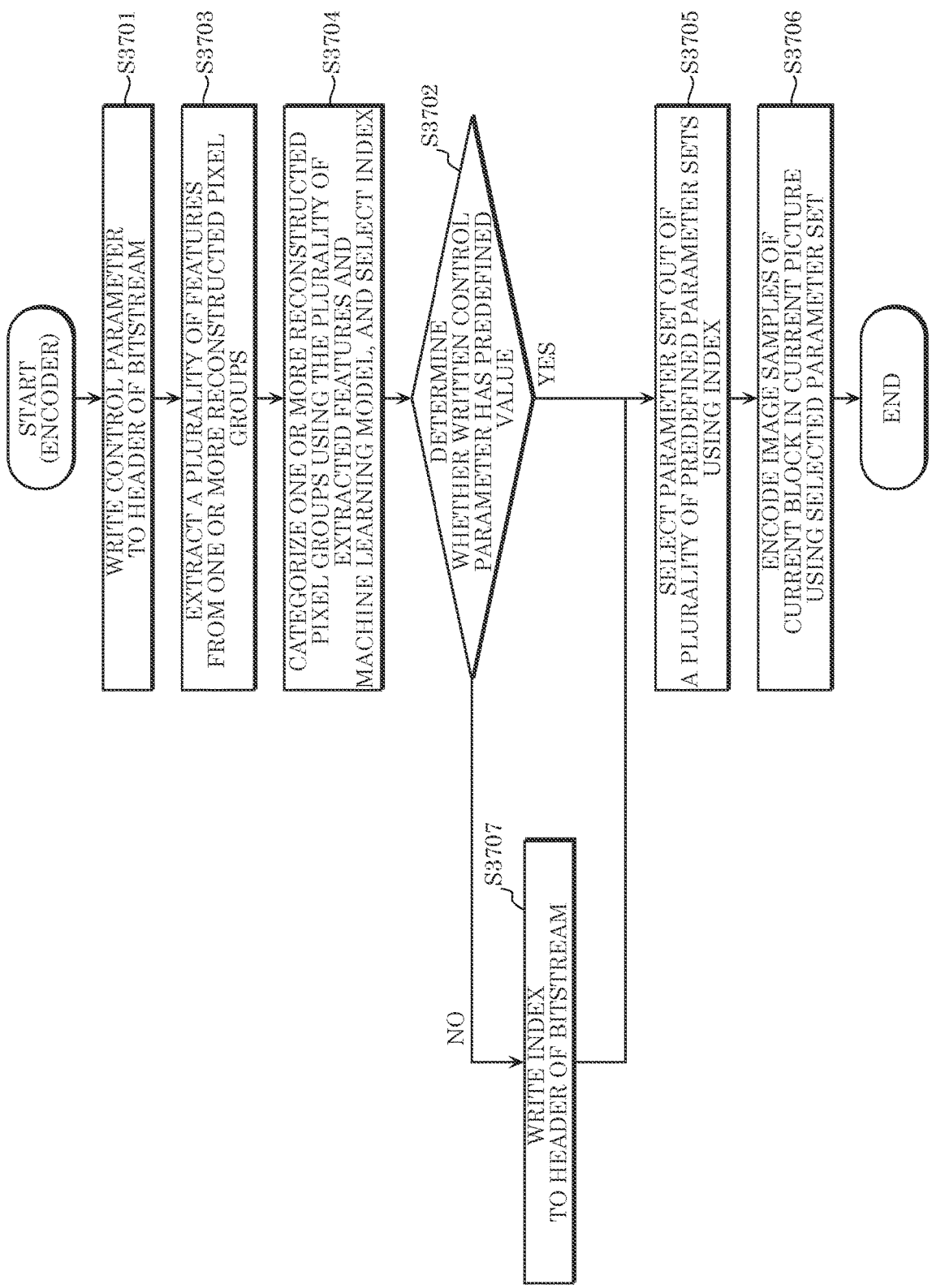
FIG. 54 is a flowchart indicating processes performed by a video encoding apparatus according to Embodiment 13.

FIG. 54 is a flowchart indicating processes performed by a video encoding apparatus according to Embodiment 13.

First, in Step S3701, writer 3502 writes a control parameter to the header of an encoded video stream.

In Step S3703, extractor 3503 extracts one or more features from one or more reconstructed pixel groups.

Next, in Step S3704, categorizer 3504 categorizes one or more reconstructed pixel groups using the extracted features and a machine learning model. In this way the index indicated as a result of categorizing the one or more reconstructed pixel groups is selected out of a plurality of predefined indexes.

Next, in Step S3702, whether each parsed control parameter has the predefined value or not is determined.

Here, when the written control parameter does not have the predefined value (No in S3702), in Step S3707, writer 3507 writes an index to the header of the encoded video stream. When the written control parameter has the predefined value (Yes in S3702), no index is written into the header, and next Step S3705 is performed.

In Step S3705, selector 3505 selects one parameter set out of a plurality of predefined parameter sets using the selected index.

Lastly, in Step S3706, encoder 3501 encodes the image samples of the current block using the selected parameter set. The encoding process in which the selected parameter set is used is, for example, one of or a combination of arbitrarily selected ones of an interpolation process and an averaging process in inter prediction, an in-loop filtering process, and an intra prediction process.

[Configuration of Video Decoding Apparatus]

Figure 55:
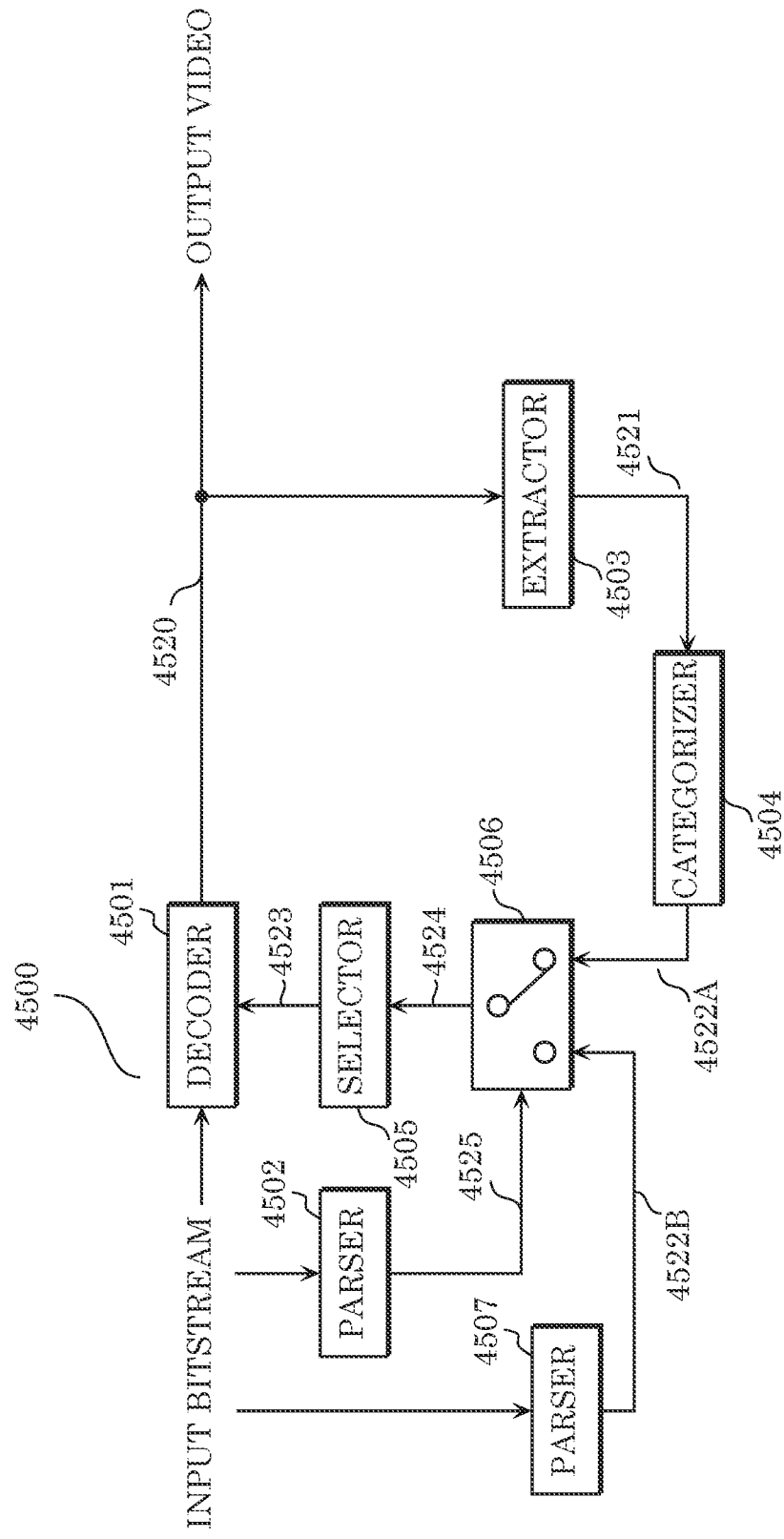
FIG. 55 is a block diagram illustrating a configuration of a video decoding apparatus according to Embodiment 13.

Next, descriptions are given of a configuration of a video decoding apparatus for decoding an encoded bitstream output from video encoding apparatus 3500 as described above. FIG. 55 is a block diagram illustrating the configuration of the video decoding apparatus according to Embodiment 13.

Video decoding apparatus 4500 decodes an input video/image bitstream on a per block basis, and outputs the decoded video/image. As illustrated in FIG. 55, video decoding apparatus 4500 includes: decoder 4501; extractor 4503; categorizer 4504; selector 4505; switch 4506; parser 4507; and parser 4502. Here, the respective constituent elements of video decoding apparatus 4500 are described.

The encoded input bitstream is input to decoder 4501, and decoded data 4520 is output to extractor 4503. Decoded data 4520 is, for example, one or more reconstructed pixel groups.

Extractor 4503 extracts one or more features 4541 from decoded data. 4520, and transmits features 4521 to categorizer 4504.

Categorizer 4504 categorizes decoded data 4520 using extracted features 4521 and a machine learning model. In this way index 4522A indicated as a result of categorizing decoded data 4520 is selected out of a plurality of predefined indexes, and selected index 4522A is output to selector 4505.

Parser 4502 parses control parameter 4525 from the input bitstream. Furthermore, parser 4502 transmits parsed control parameter 4525 to switch 4506.

When control parameter 4525 does not have the predefined value, parser 4507 parses index 4522B from the input bitstream, and transmits parsed index 4522b to switch 4506.

Switch 4506 switches either transmission of index 4522A from categorizer 4504 to selector 4505 or transmission of index 4522B from parser 4507 to selector 4505, according to the value of control parameter 4525. In other words, through switch 4506, one of index 4522A and index 4522B is transmitted to selector 4505 as index 4524.

Selector 4505 selects one parameter set 4523 out of a plurality of predefined parameter sets using index 4524 transmitted from switch 4506, and outputs selected parameter set 4523 to decoder 4501.

Decoder 4501 decodes an encoded video using selected parameter set 4523.

[Operations Performed by Video Decoding Apparatus]

Figure 56:
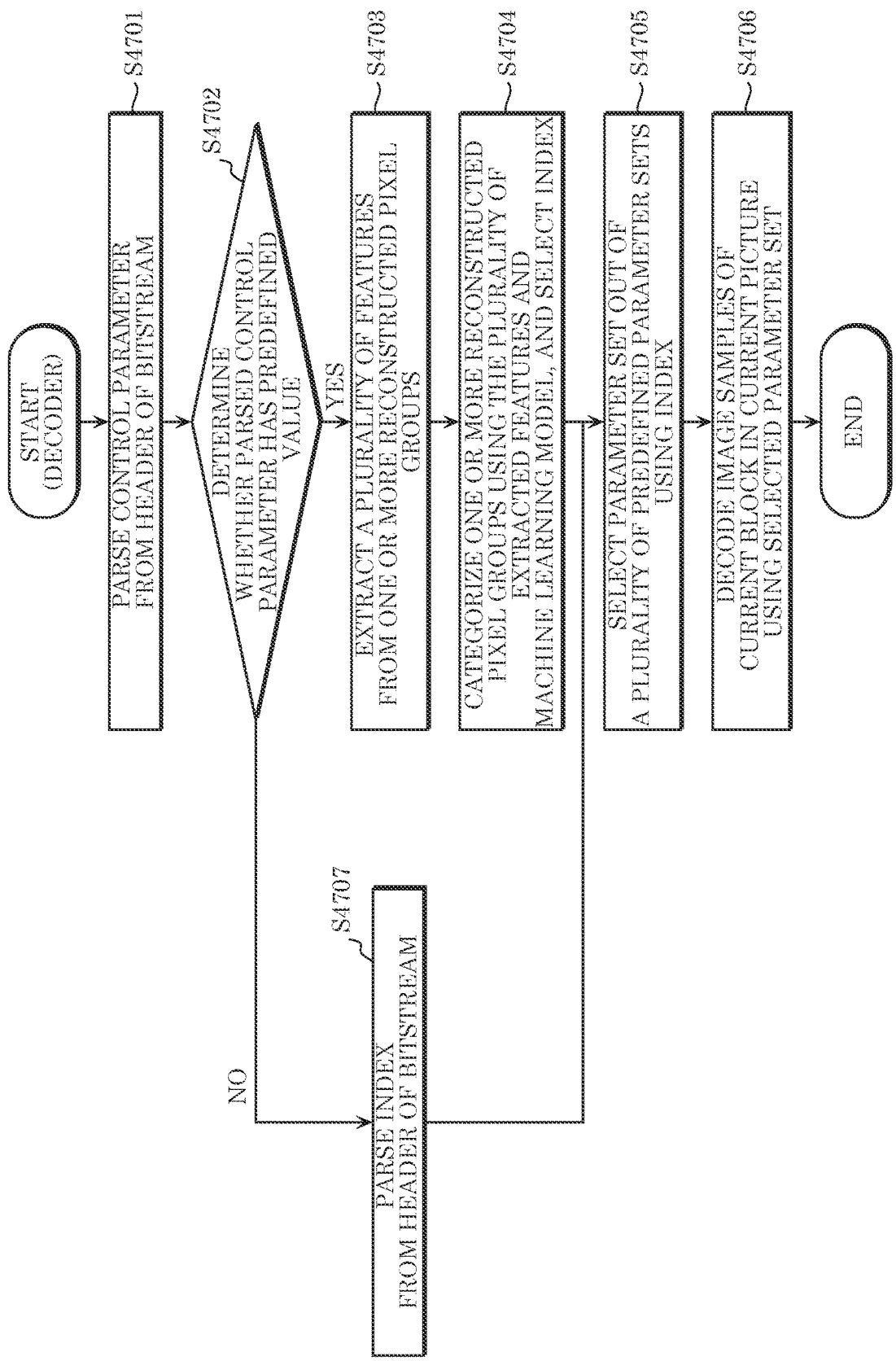
FIG. 56 is a flowchart indicating processes performed by a video decoding apparatus according to Embodiment 13.

Next, descriptions are given of operations performed by video decoding apparatus 4500 configured as described above. FIG. 56 is a flowchart indicating processes performed by a video decoding apparatus according to Embodiment 13.

First, in Step S4701, parser 4502 parses a control parameter from the header of the encoded video stream.

Next, in Step S4702, whether each parsed control parameter has a predefined value or not is determined.

Here, when the parsed control parameter has the predefined value (Yes in S4702), the following steps are performed.

First, in Step S4703, extractor 4503 extracts one or more features from one or more reconstructed pixel groups. These features are the same as the features used in video encoding apparatus 3500 in the encoding process.

Next, in Step S4704, categorizer 4504 categorizes one or more reconstructed pixel groups using the extracted features and a machine learning model. In this way, the index indicated as a result of categorizing the one or more reconstructed pixel groups is selected out of a plurality of predefined indexes. The machine learning model used here is the same as the machine learning model used in video encoding apparatus 3500 in the encoding process.

When the parsed control parameter does not have the predefined value (No in S4702), in Step S4707, parser 4507 parses the index from the header of the encoded video stream.

Next, in Step S4705, selector 4505 selects one parameter set out of a plurality of predefined parameter sets using the selected or derived index. The parameter set used here is the same as the parameter set selected in video encoding apparatus 3500 in the encoding process.

Lastly, in Step S4706, decoder 4501 decodes the image samples of the current block using the selected parameter set. The decoding process in which the selected parameter set is used is, for example, one of or a combination of arbitrarily selected ones of an interpolation process and an averaging process in inter prediction, an in-loop filtering process, and an intra prediction process.

[Effects]

As described above, each of video encoding apparatus 3500 and video decoding apparatus 4500 makes it possible to include the index itself of the parameter set in the bitstream. Accordingly it is possible to select either reduction in code amount using the machine learning model or reduction in processing load by including the index in the bitstream, thereby balancing the encoding efficiency and the processing load.

Other Embodiments

Although video encoding apparatuses and video decoding apparatuses according to one or more aspects have been described based on the embodiments above, the present disclosure is not limited to these embodiments. The one or more aspects may encompass embodiments obtainable by adding various kinds of modifications that a person ordinarily skilled in the art would arrive at and embodiments configured by arbitrarily combining the constituent elements of different embodiments.

For example, Embodiments 2 to 5 may be arbitrarily combined. Furthermore, Embodiments 6 to 13 may be configured by arbitrarily combining Embodiments 2 to 5.

Although the parameter set is selected using the index in each of the above-described embodiments, it should be noted that the way of selecting the parameter set is not limited thereto. For example, a parameter set may be selected directly from the result of categorization.

Embodiment 14

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 57:
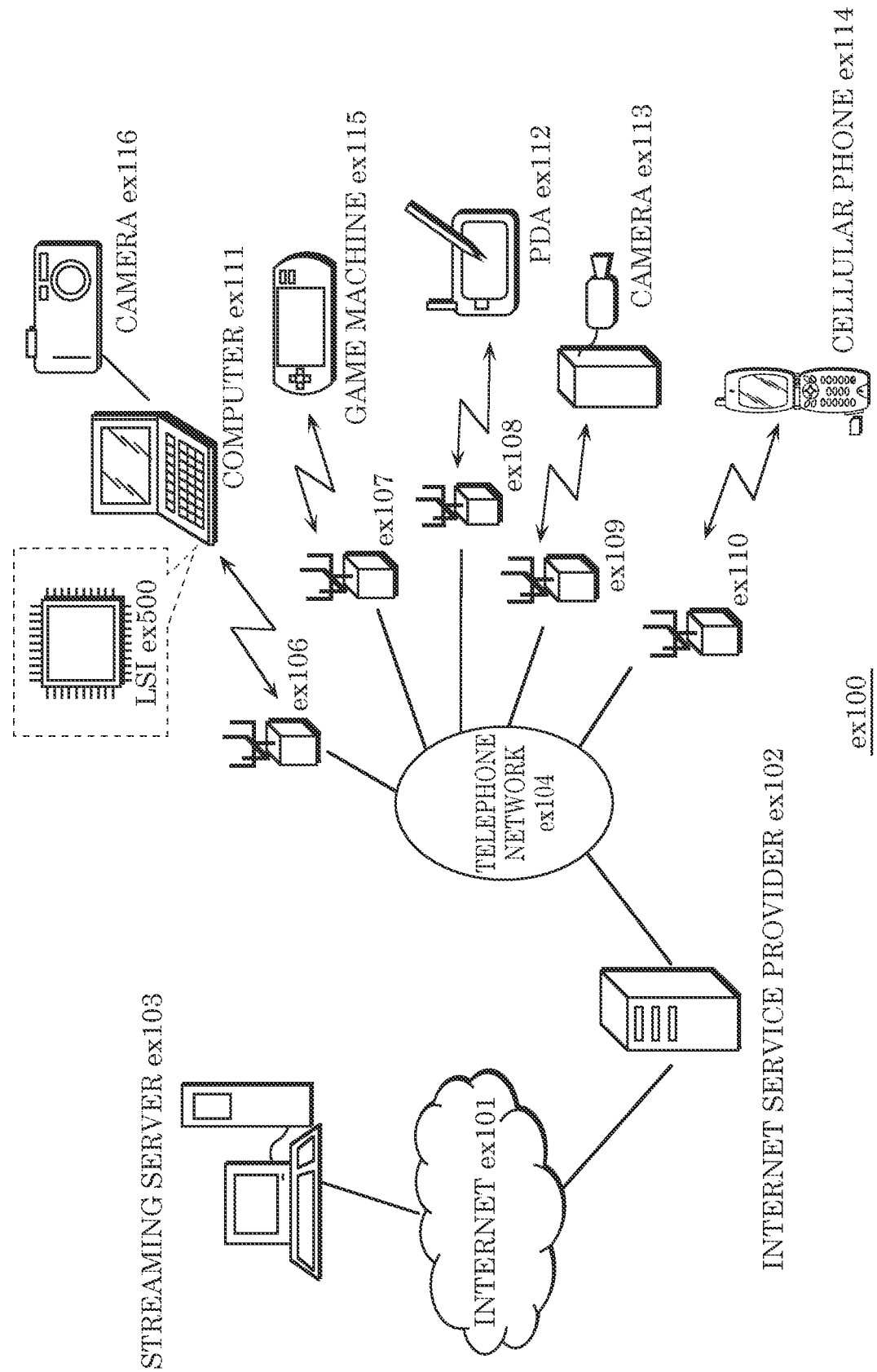
FIG. 57 shows an overall configuration of a content providing system for implementing content distribution services.

FIG. 57 illustrates an overall configuration of content providing system ex100 for implementing content distribution services. The area for providing communication services is divided into cells of desired size, and base stations ex106, ex107, ex108, ex109, and ex110 which are fixed wireless stations are placed in each of the cells.

Content providing system ex100 is connected to devices, such as computer ex111, personal digital assistant (PDA) ex112, camera ex113, cellular phone ex114 and game machine ex115, via Internet ex101, Internet service provider ex102, telephone network ex104, as well as base stations ex106 to ex110, respectively.

However, the configuration of content providing system ex100 is not limited to the configuration shown in FIG. 57, and a combination in which any of the elements are connected is acceptable. In addition, each device may be directly connected to telephone network ex104, rather than via base stations ex106 to ex110 which are the fixed wireless stations. Furthermore, the devices may be interconnected to each other via a short distance wireless communication and others.

Camera ex113, such as a digital video camera, is capable of capturing video. Camera ex116, such as a digital camera, is capable of capturing both still images and video. Furthermore, cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (I-ISPA). Alternatively cellular phone ex114 may be a Personal Handyphone System (PHS).

In content providing system ex100, streaming server ex103 is connected to camera ex113 and others via telephone network ex104 and base station ex109, which enables distribution of images of a live show and others. In such a distribution, a content (for example, video of a music live show) captured by the user using camera ex113 is encoded as described above in each of embodiments (i.e., the camera functions as the image encoding apparatus according to an aspect of the present disclosure), and the encoded content is transmitted to streaming server ex103. On the other hand, streaming server ex103 carries out stream distribution of the transmitted content data to the clients upon their requests. The clients include computer ex111, PDA ex112, camera ex113, cellular phone ex114, and game machine ex115 that are capable of decoding the above-mentioned encoded data. Each of the devices that have received the distributed data decodes and reproduces the encoded data (i.e., functions as the image decoding apparatus according to an aspect of the present disclosure).

The captured data may be encoded by camera ex113 or streaming server ex103 that transmits the data, or the encoding processes may be shared between camera ex113 and streaming server ex103. Similarly, the distributed data may be decoded by the clients or streaming server ex103, or the decoding processes may be shared between the clients and streaming server ex103. Furthermore, the data of the still images and video captured by not only camera ex113 but also camera ex116 may be transmitted to streaming server ex103 through computer ex111. The encoding processes may be performed by camera ex116, computer ex111, or streaming server ex103, or shared among them.

Furthermore, the coding processes may be performed by LSI ex500 generally included in each of computer ex111 and the devices. LSI ex500 may be configured of a single chip or a plurality of chips. Software for coding video may be integrated into some type of a recording medium (such as a CD-ROM, a flexible disk, and a hard disk) that is readable by computer ex111 and others, and the coding processes may be performed using the software. Furthermore, when cellular phone ex114 is equipped with a camera, the video data obtained by the camera may be transmitted. The video data is data encoded by LSI ex500 included in cellular phone ex114.

Furthermore, streaming server ex103 may be composed of servers and computers, and may decentralize data and process the decentralized data, record, or distribute data.

As described above, the clients may receive and reproduce the encoded data in content providing system ex100. In other words, the clients can receive and decode information transmitted by the user, and reproduce the decoded data in real time in content providing system ex100, so that the user who does not have any particular right and equipment can implement personal broadcasting.

Figure 58:
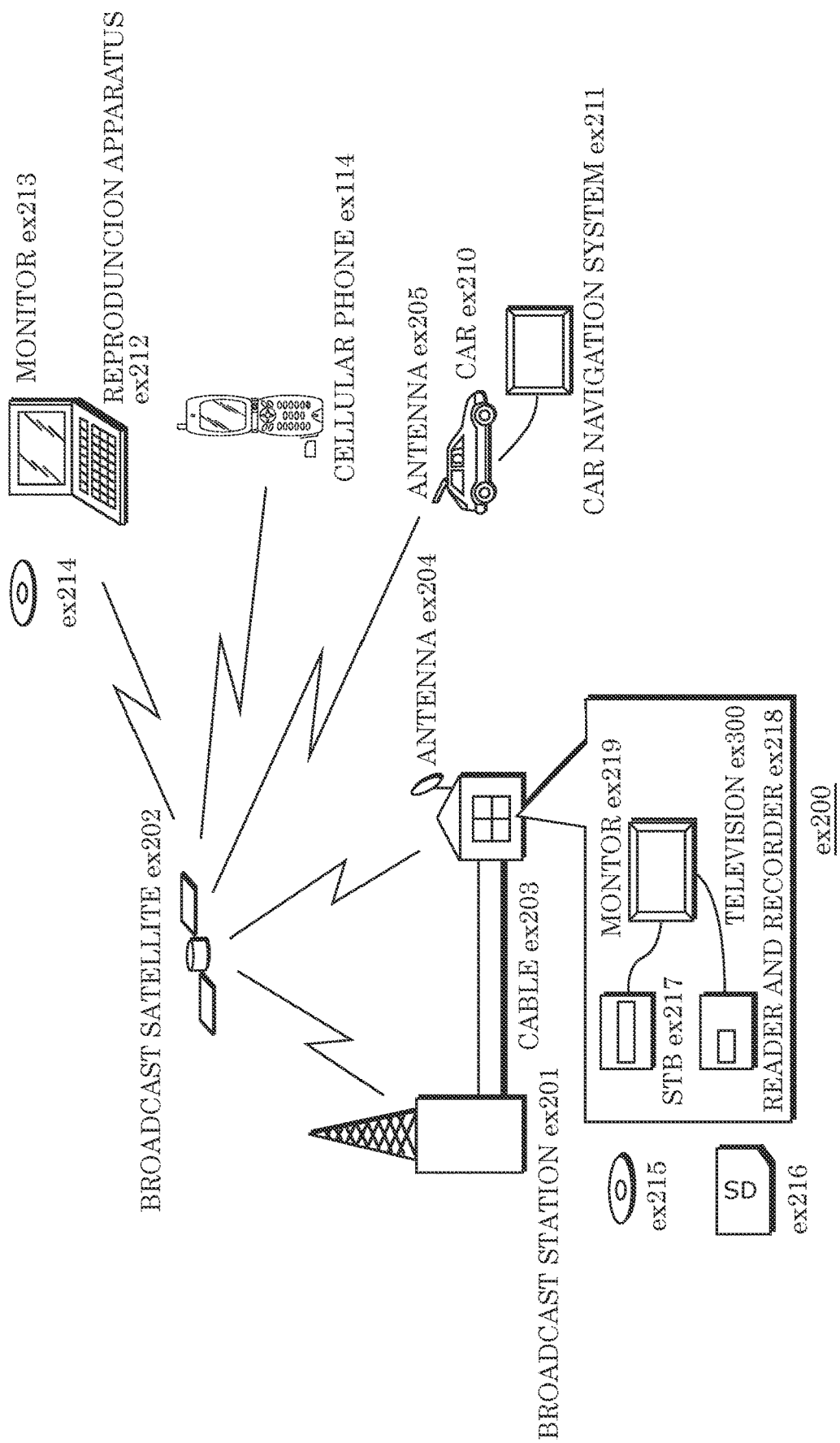
FIG. 58 shows an overall configuration of a digital broadcasting system.

Aside from the example of content providing system ex100, at least one of the moving picture coding apparatus (image coding apparatus) described in each of embodiments may be implemented in digital broadcasting system ex200 illustrated in FIG. 58. More specifically broadcast station ex201 communicates or transmits, via radio waves to broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present disclosure). Upon receipt of the multiplexed data, broadcast satellite ex202 transmits radio waves for broadcasting. Then, home-use antenna ex204 with a satellite broadcast reception function receives the radio waves. Next, a device such as television (receiver) ex300 and set top box (STB) ex217 decodes the received multiplexed data, and reproduces the decoded data (i.e., functions as the image decoding apparatus according to an aspect of the present disclosure).

Furthermore, reader/recorder ex218 (i) reads and decodes the multiplexed data recorded on recording medium ex215, such as a DVD and a BD, or (i) encodes video signals in recording medium ex215, and in some cases, writes data obtained by multiplexing an audio signal on the encoded data. Reader/recorder ex218 can include the moving picture decoding apparatus or the moving picture encoding apparatus as shown in each of embodiments. In this case, the reproduced video signals are displayed on monitor ex219, and can be reproduced by another device or system using recording medium ex215 on which the multiplexed data is recorded. It is also possible to implement the moving picture decoding apparatus in set top box ex217 connected to cable ex203 for a cable television or to antenna ex204 for satellite and/or terrestrial broadcasting, so as to display the video signals on monitor ex219 of television ex300. The moving picture decoding apparatus may be implemented not in the set top box but in television ex300.

Figure 59:
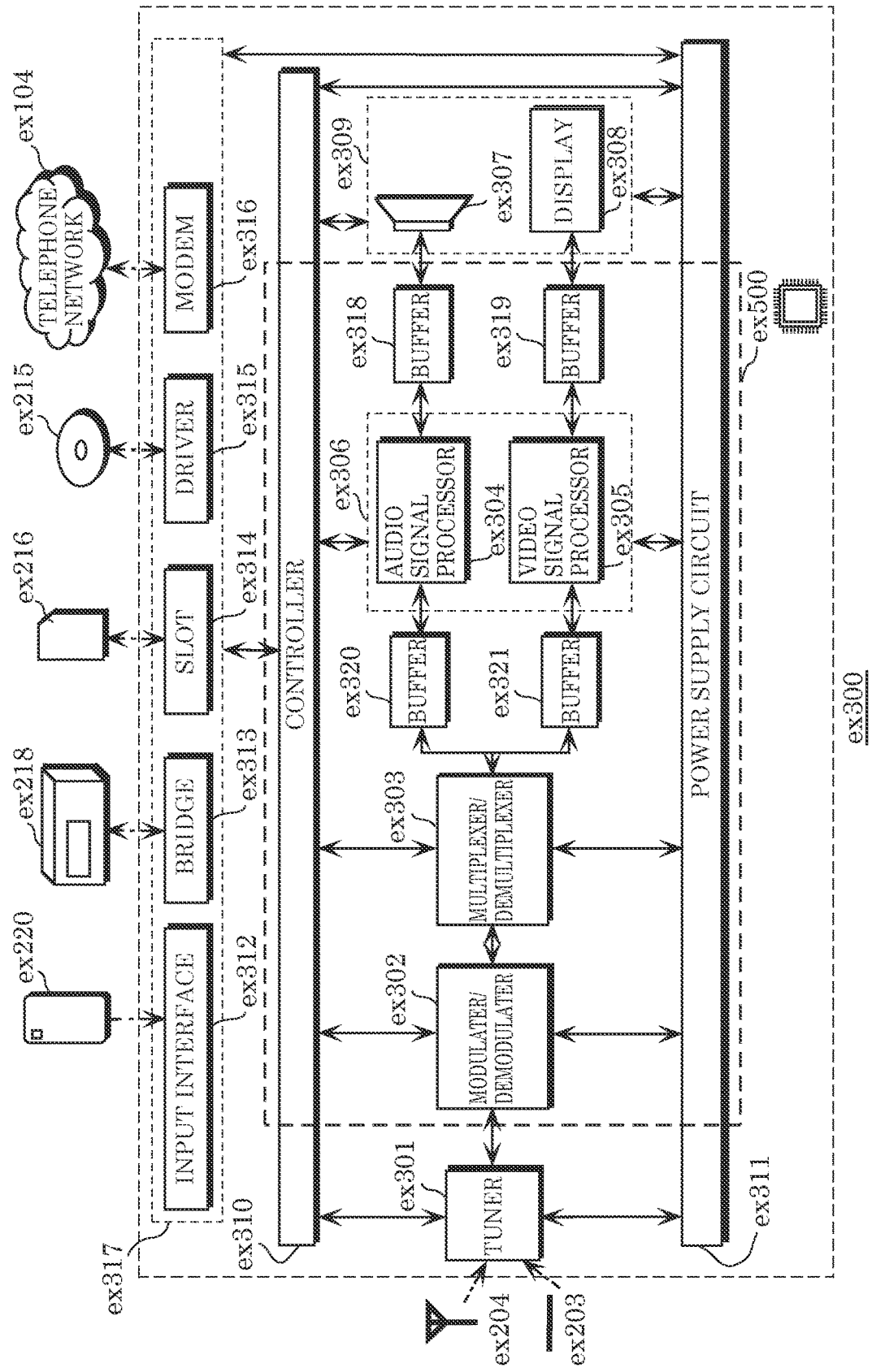
FIG. 59 shows a block diagram illustrating an example of a configuration of a television.

FIG. 59 illustrates television (receiver) ex300 that uses the moving picture encoding method and the moving picture decoding method described in each of embodiments. Television ex300 includes: tuner ex301 that obtains or provides multiplexed data obtained by multiplexing audio data onto video data, through antenna ex204 or cable ex203, etc. that receives a broadcast; modulater/demodulater ex302 that demodulates the received multiplexed data or modulates data into multiplexed data to be supplied outside; and multiplexer/demultiplexer ex303 that demultiplexes the modulated multiplexed data into video data and audio data, or multiplexes video data and audio data encoded by signal processor ex306 into data.

Television ex300 further includes: signal processor ex306 including audio signal processor ex304 and video signal processor ex305 that code each of audio data and video data, (which function as the image coding apparatus according to the aspects of the present disclosure); and output ex309 including speaker ex307 that provides the decoded audio signal, and display ex308 that displays the decoded video signal, such as a display. Furthermore, television ex300 includes interface ex317 including input interface ex312 that receives an input of a user operation. Furthermore, television ex300 includes controller ex310 that controls overall each constituent element of television ex300, and power supply circuit ex311 that supplies power to each of the elements. Other than input interface ex312, interface ex317 may include: bridge ex313 that is connected to an external device, such as reader/recorder ex218; slot ex314 for enabling attachment of recording medium ex216, such as an SD card; driver ex315 to be connected to an external recording medium, such as a hard disk; and modem ex316 to be connected to a telephone network. Here, recording medium ex216 can electrically record information using a non-volatile/volatile semiconductor memory element for storage. The constituent elements of television ex300 are connected to each other through a synchronous bus.

First, the configuration in which television ex300 decodes multiplexed data obtained from outside through antenna ex204 and others and reproduces the decoded data will be described. In television ex300, upon a user operation through remote controller ex220 and others, multiplexer/demultiplexer ex303 demultiplexes the multiplexed data demodulated by modulator/demodulater ex302, under control of controller ex310 including a CPU. Furthermore, audio signal processor ex304 decodes the demultiplexed audio data, and video signal processor ex305 decodes the demultiplexed video data, using the decoding method described in each of embodiments, in television ex300. Output ex309 provides the decoded video signal and audio signal outside, respectively. When output ex309 provides the video signal and the audio signal, the signals may be temporarily stored in buffers ex318 and ex319, and others so that the signals are reproduced in synchronization with each other. Furthermore, television ex300 may read multiplexed data not through a broadcast and others but from recording media ex215 and ex216, such as a magnetic disk, an optical disk, and a SD card. Next, a configuration in which television ex300 encodes an audio signal and a video signal, and transmits the data outside or writes the data on a recording medium will be described. In television ex300, upon a user operation through remote controller ex220 and others, audio signal processor ex304 encodes an audio signal, and video signal processor ex305 encodes a video signal, under control of controller ex310 using the encoding method described in each of embodiments. Multiplexer/demultiplexer ex303 multiplexes the encoded video signal and audio signal, and provides the resulting signal outside. When multiplexer/demultiplexer ex303 multiplexes the video signal and the audio signal, the signals may be temporarily stored in buffers ex320 and ex321, and others so that the signals are reproduced in synchronization with each other. Here, buffers ex318, ex319, ex320, and ex321 may be plural as illustrated, or at least one buffer may be shared in television ex300. Furthermore, data may be stored in a buffer so that the system overflow and underflow may be avoided between modulater/demodulater ex302 and multiplexer/demultiplexer ex303, for example.

Furthermore, television ex300 may include a configuration for receiving an AV input from a microphone or a camera other than the configuration for obtaining audio and video data from a broadcast or a recording medium, and may encode the obtained data. Although television ex300 can encode, multiplex, and provide outside data in the description, it may be capable of only receiving, decoding, and providing outside data but not the encoding, multiplexing, and providing outside data.

Furthermore, when reader/recorder ex218 reads or writes multiplexed data from or on a recording medium, one of television ex300 and reader/recorder ex218 may code the multiplexed data, and television ex300 and reader/recorder ex218 may share the coding partly.

Figure 60:
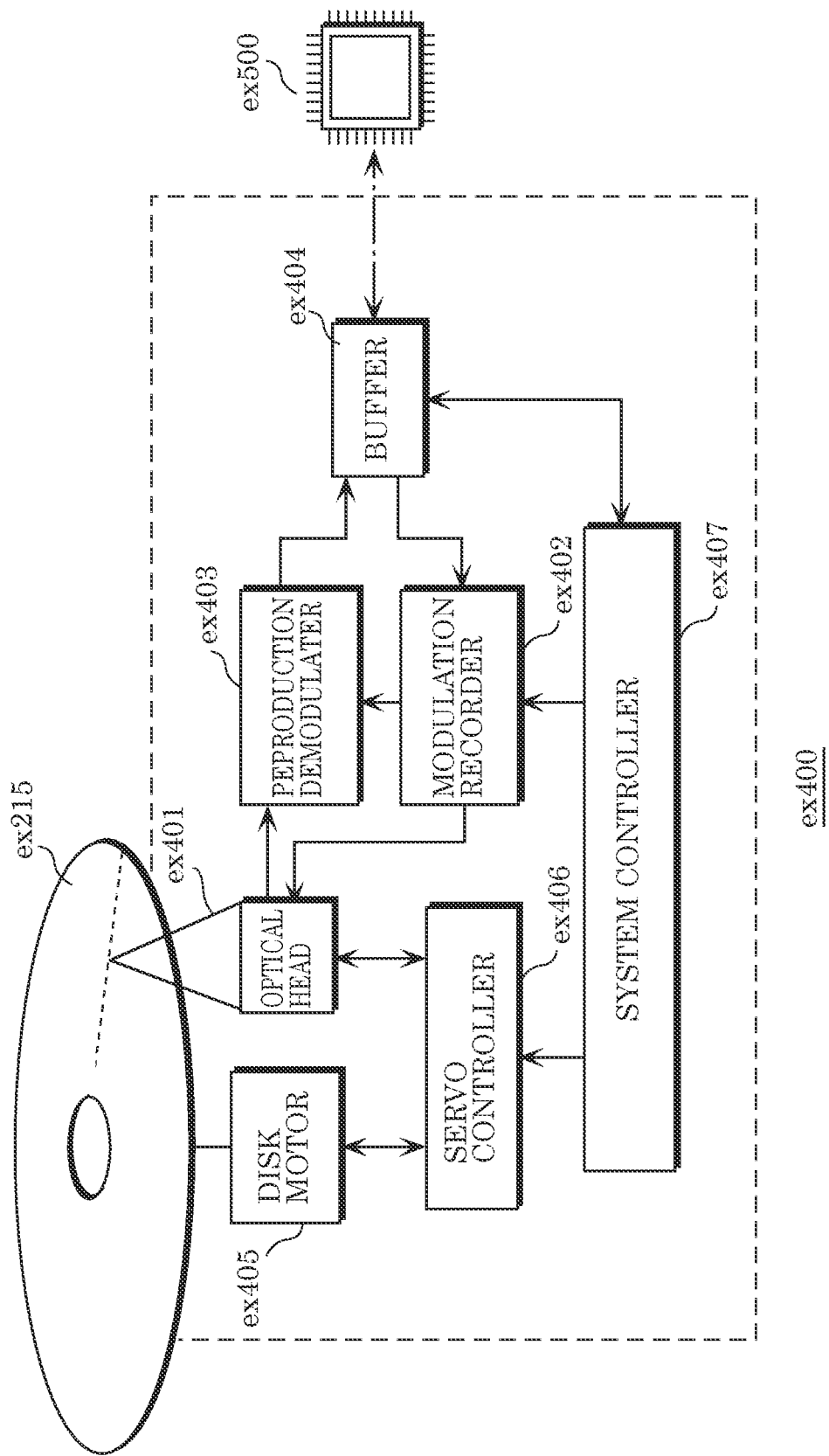
FIG. 60 shows a block diagram illustrating an example of a configuration of an information reproducer/recorder that reads and writes information from and on a recording medium that is an optical disk.

As an example, FIG. 60 illustrates a configuration of information reproducer/recorder ex400 when data is read or written from or on an optical disk. Information reproducer/recorder ex400 includes constituent elements ex401, ex402, ex403, ex404, ex405, ex406, and ex407 to be described hereinafter. Optical head ex401 irradiates a laser spot in a recording surface of recording medium ex215 that is an optical disk to write information, and detects reflected light from the recording surface of recording medium ex215 to read the information. Modulation recorder ex402 electrically drives a semiconductor laser included in optical head ex401, and modulates the laser light according to recorded data. Reproduction demodulater ex403 amplifies a reproduction signal obtained by electrically detecting the reflected light from the recording surface using a photo detector included in optical head ex401, and demodulates the reproduction signal by separating a signal component recorded on recording medium ex215 to reproduce the necessary information, Buffer ex404 temporarily holds the information to be recorded on recording medium ex215 and the information reproduced from recording medium ex215, Disk motor ex405 rotates recording medium ex215. Servo controller ex406 moves optical head ex401 to a predetermined information track while controlling the rotation drive of disk motor ex405 so as to follow the laser spot. System controller ex407 controls overall information reproducer/recorder ex400. The reading and writing processes can be implemented by system controller ex407 using various information stored in buffer ex404 and generating and adding new information as necessary, and by modulation recorder ex/402, reproduction demodulater ex403, and servo controller ex406 that record and reproduce information through optical head ex401 while being operated in a coordinated manner. System controller ex407 includes, for example, a microprocessor, and executes processing by causing a computer to execute a program for read and write.

Although optical head ex401 irradiates a laser spot in the description, it may perform high-density recording using near field light.

Figure 61:
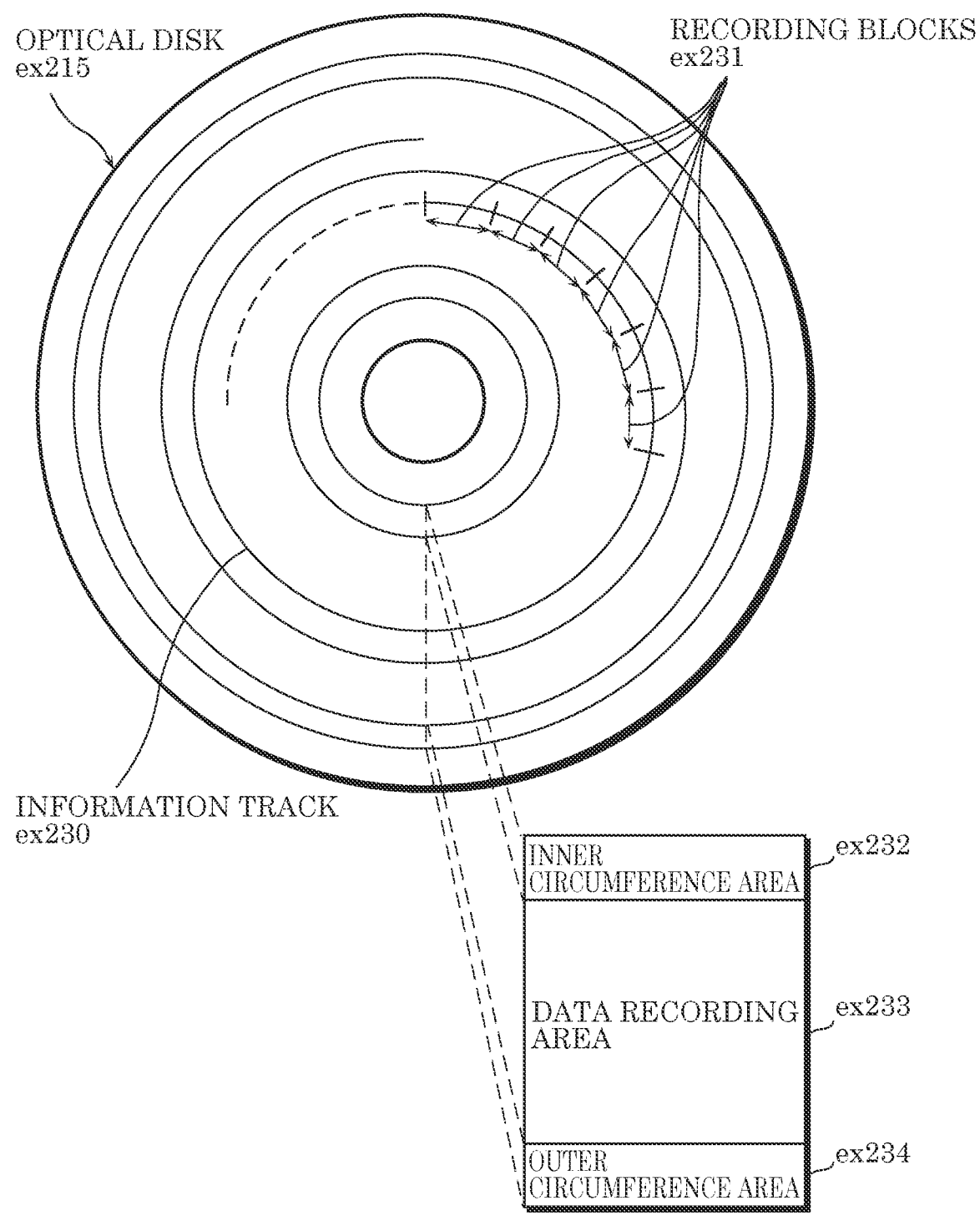
FIG. 61 shows an example of a configuration of a recording medium that is an optical disk.

FIG. 61 illustrates recording medium ex215 that is the optical disk. On the recording surface of recording medium ex215, guide grooves are spirally formed, and information track ex230 records, in advance, address information indicating an absolute position on the disk according to change in a shape of the guide grooves. The address information includes information for determining positions of recording blocks ex231 that are a unit for recording data. Reproducing information track ex230 and reading the address information in an apparatus that records and reproduces data can lead to determination of the positions of the recording blocks. Furthermore, recording medium ex215 includes data recording area ex233, inner circumference area ex232, and outer circumference area ex234. Data recording area ex233 is an area for use in recording the user data inner circumference area ex232 and outer circumference area ex234 that are inside and outside of data recording area ex233, respectively are for specific use except for recording the user data. The information reproducer/recorder 400 reads and writes encoded audio, encoded video data, or multiplexed data obtained by multiplexing the encoded audio and video data, from and on data recording area ex233 of recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, car ex210 having antenna ex205 can receive data from satellite ex202 and others, and reproduce video on a display device such as car navigation system ex211 set in car ex210, in digital broadcasting system ex200. Here, a configuration of car navigation system ex211 will be a configuration, for example, including a GPS receiver from the configuration illustrated in FIG. 59. The same will be true for the configuration of computer ex111, cellular phone ex114, and others.

Figure 62A:
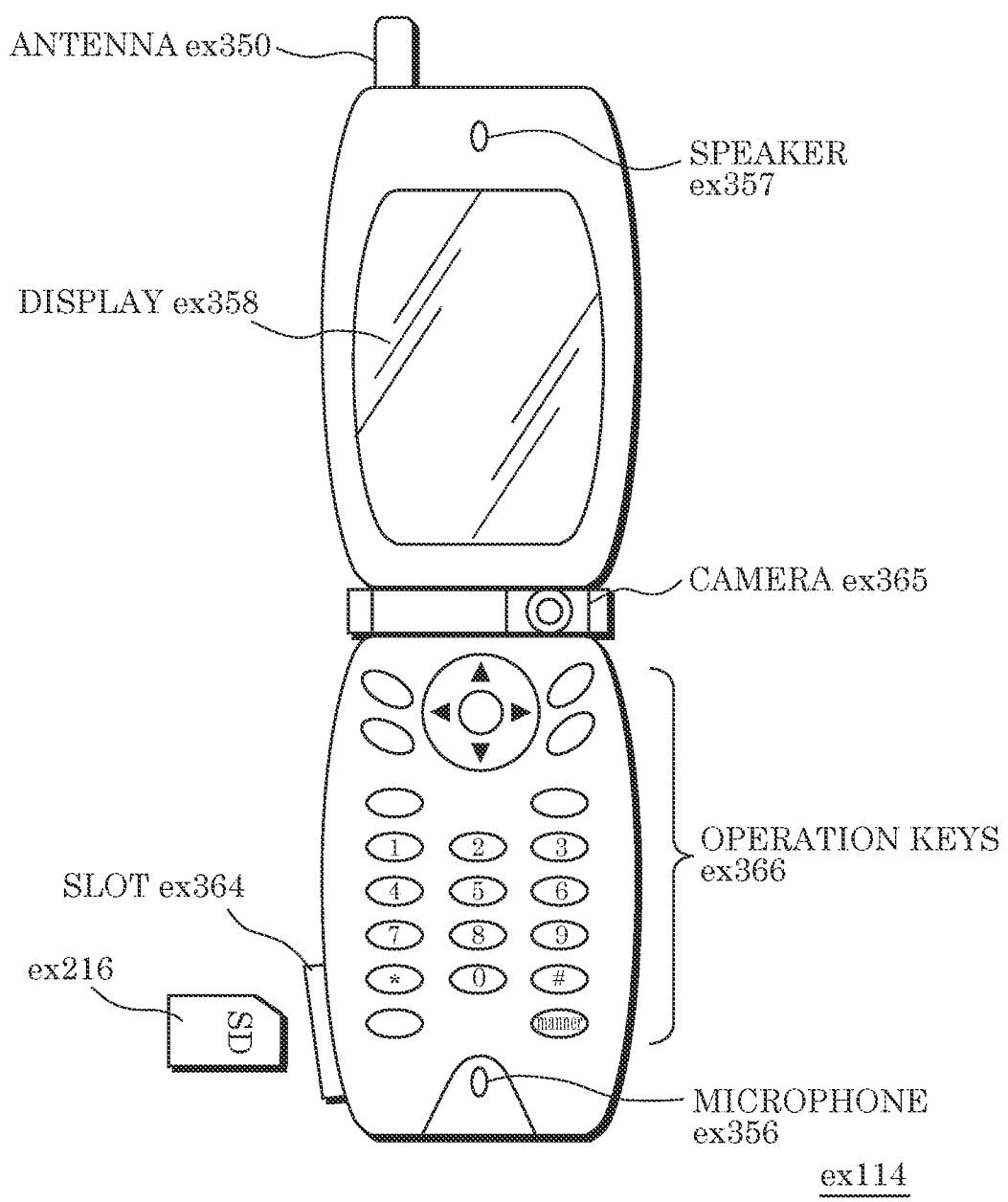
FIG. 62A shows an example of a cellular phone.

FIG. 62A illustrates cellular phone ex114 that uses the moving picture coding method described in embodiments. Cellular phone ex114 includes: antenna ex350 for transmitting and receiving radio waves through base station ex110; camera ex365 capable of capturing moving and still images; and display ex358 such as a liquid crystal display for displaying the data such as decoded video captured by camera ex365 or received by antenna ex350. Cellular phone ex114 further includes: a main body including operation keys ex366; speaker ex357 such as a speaker for output of audio; microphone ex356 such as a microphone for input of audio; memory ex367 for storing captured video or still pictures, recorded audio, coded data of the received video, the still pictures, e-mails, or others; and slot ex364 that is an interface for a recording medium that stores data in the same manner as memory ex367.

Figure 62B:
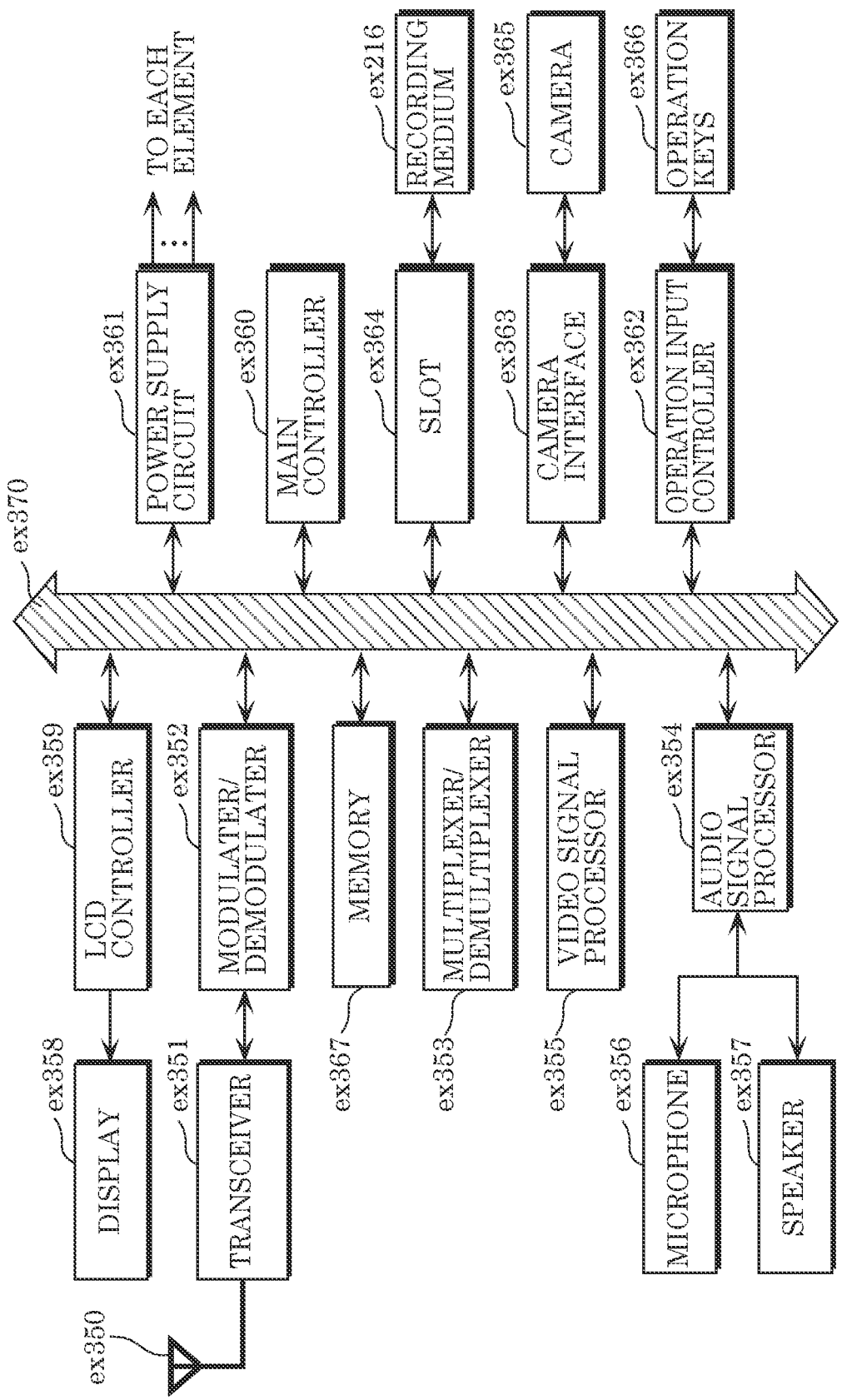
FIG. 62B is a block diagram showing an example of a configuration of a cellular phone.

Next, an example of a configuration of cellular phone ex114 will be described with reference to FIG. 62B. In cellular phone ex114 main controller ex360 designed to control overall each unit of the main body including display ex358 as well as operation keys ex366 is connected mutually via synchronous bus ex370, to power supply circuit ex361, operation input controller ex362, video signal processor ex355, camera interface ex363, liquid crystal display (LCD) controller ex359, modulater/demodulater ex352, multiplexer/demultiplexer ex353, audio signal processor ex354, slot ex364, and memory ex367.

When a call-end key or a power key is turned ON by a user's operation, power supply circuit ex361 supplies the respective elements with power from a battery pack so as to activate cell phone ex114.

In cellular phone ex114 audio signal processor ex354 converts the audio signals collected by microphone ex356 in voice conversation mode into digital audio signals under the control of main controller ex360 including a CPU, ROM, and RAM. Then, modulater/demodulater ex352 performs spread spectrum processing on the digital audio signals, and transceiver ex351 performs digital-to-analog conversion and frequency conversion on the data, so as to transmit the resulting data via antenna ex350. Also, in cellular phone ex114, transceiver ex351 amplifies the data received by antenna ex350 in voice conversation mode and performs frequency conversion and the analog-to-digital conversion on the data. Then, modulater/demodulater ex352 performs inverse spread spectrum processing on the data, and audio signal processor ex354 converts it into analog audio signals, so as to output them via speaker ex357.

Furthermore, when an e-mail in data communication mode is transmitted, text data of the e-mail inputted by operating operation keys ex366 and others of the main body is sent out to main controller ex360 via operation input controller ex362. Main controller ex360 causes modulater/demodulater ex352 to perform spread spectrum processing on the text data, and transceiver ex351 performs the digital-to-analog conversion and the frequency conversion on the resulting data to transmit the data to base station ex110 via antenna ex350. When an e-mail is received, processing that is approximately inverse to the processing for transmitting an e-mail is performed on the received data, and the resulting data is provided to display ex358.

When video, still images, or video and audio in data communication mode is or are transmitted, video signal processor ex355 compresses and encodes video signals supplied from camera ex365 using the moving picture encoding method shown in each of embodiments functions as the image encoding apparatus according to the aspect of the present disclosure), and transmits the encoded video data to multiplexer/demultiplexer ex353. In contrast, during when camera ex365 captures video, still images, and others, audio signal processor ex354 encodes audio signals collected by microphone ex356, and transmits the encoded audio data to multiplexer/demultiplexer ex353.

Multiplexer/demultiplexer ex353 multiplexes the encoded video data supplied from video signal processor ex355 and the encoded audio data supplied from audio signal processor ex354, using a predetermined method. Then, modulater/demodulater (modulation/demodulation circuit) ex352 performs spread spectrum processing on the multiplexed data, and transceiver ex351 performs digital-to-analog conversion and frequency conversion on the data so as to transmit the resulting data via antenna ex350.

When receiving data of a video file which is linked to a Web page and others in data communication mode or when receiving an e-mail with video and/or audio attached, in order to decode the multiplexed data received via antenna ex350, multiplexer/demultiplexer ex353 demultiplexes the multiplexed data into a video data bit stream and an audio data bit stream, and supplies video signal processor ex355 with the encoded video data and audio signal processor ex354 with the encoded audio data, through synchronous bus ex370. Video signal processor ex355 decodes the video signal using a moving picture decoding method corresponding to the moving picture encoding method shown in each of embodiments (i.e., functions as the image decoding apparatus according to the aspect of the present disclosure), and then display ex358 displays, for instance, the video and still images included in the video file linked to the Web page via LCI) controller ex359. Furthermore, audio signal processor ex354 decodes the audio signal, and speaker ex357 provides the audio.

Furthermore, similarly to television ex300, a terminal such as cellular phone ex114 probably have 3 types of implementation configurations including not only (i) a transmitting and receiving terminal including both an encoding apparatus and a decoding apparatus, but also (ii) a transmitting terminal including only an encoding apparatus and a receiving terminal including only a decoding apparatus. Although digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Embodiment 15

Video data can be generated by switching, as necessary between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and IC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 63 illustrates a structure of the multiplexed data. As illustrated in FIG. 63, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital. Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 64:
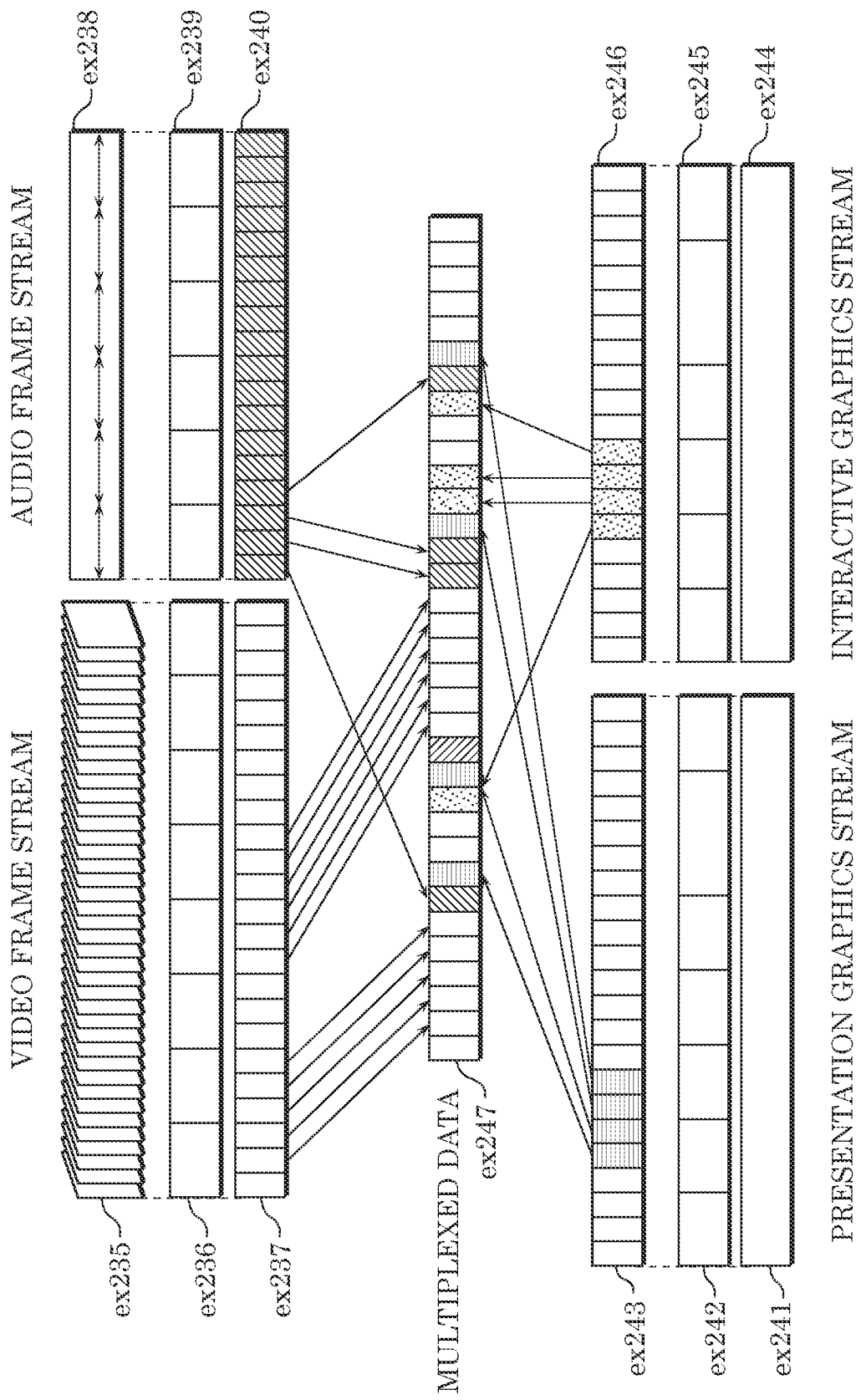
FIG. 64 schematically shows how each stream is multiplexed in multiplexed data.

FIG. 64 schematically illustrates how data is multiplexed. First, video stream ex235 composed of video frames and audio stream ex238 composed of audio frames are transformed into a stream of PES packets ex236 and a stream of PES packets ex239, and further into TS packets ex237 and TS packets ex240, respectively. Similarly data of presentation graphics stream ex241 and data of interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 65:
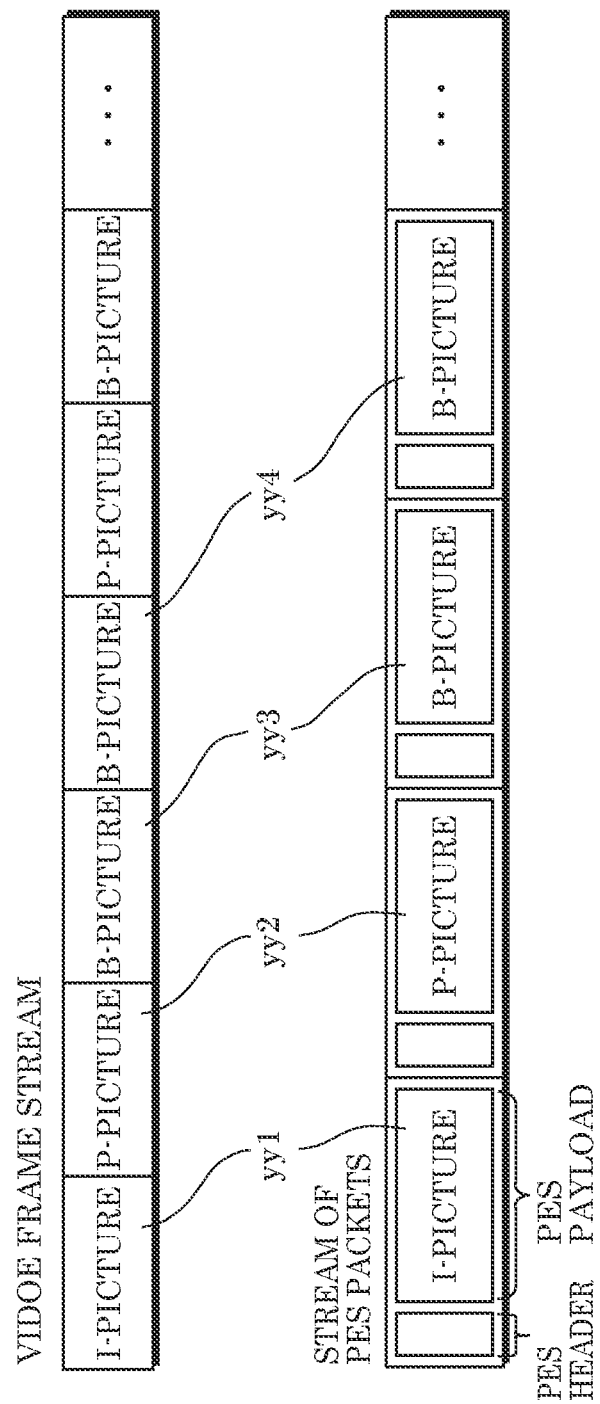
FIG. 65 shows how a video stream is stored in a stream of PES packets in more detail.

FIG. 65 illustrates how a video stream is stored in a stream of PES packets in more detail. The first bar in FIG. 65 shows a video frame stream in a video stream. The second bar shows the stream of PES packets. As indicated by arrows denoted as yy1, yy2, yy3, and yy4 in FIG. 65, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 66 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 66. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival. Time Clock (ATC) that is a time axis of ATSs, and an System Time Clock (STC) that is a time axis of PTSs and DTSs.

Figure 67:
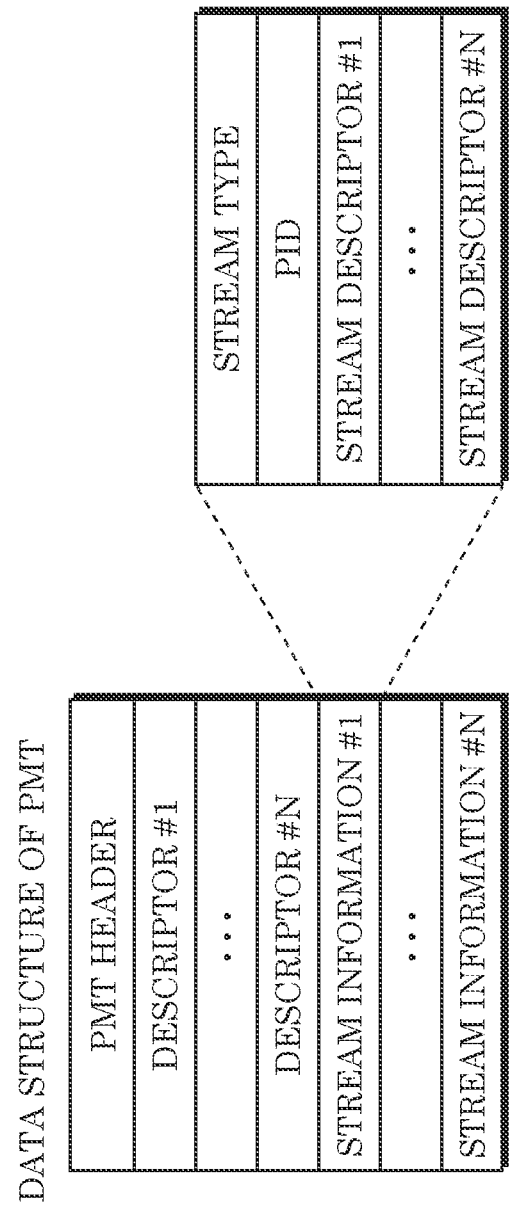
FIG. 67 shows a data structure of a PMT.

FIG. 67 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 68:
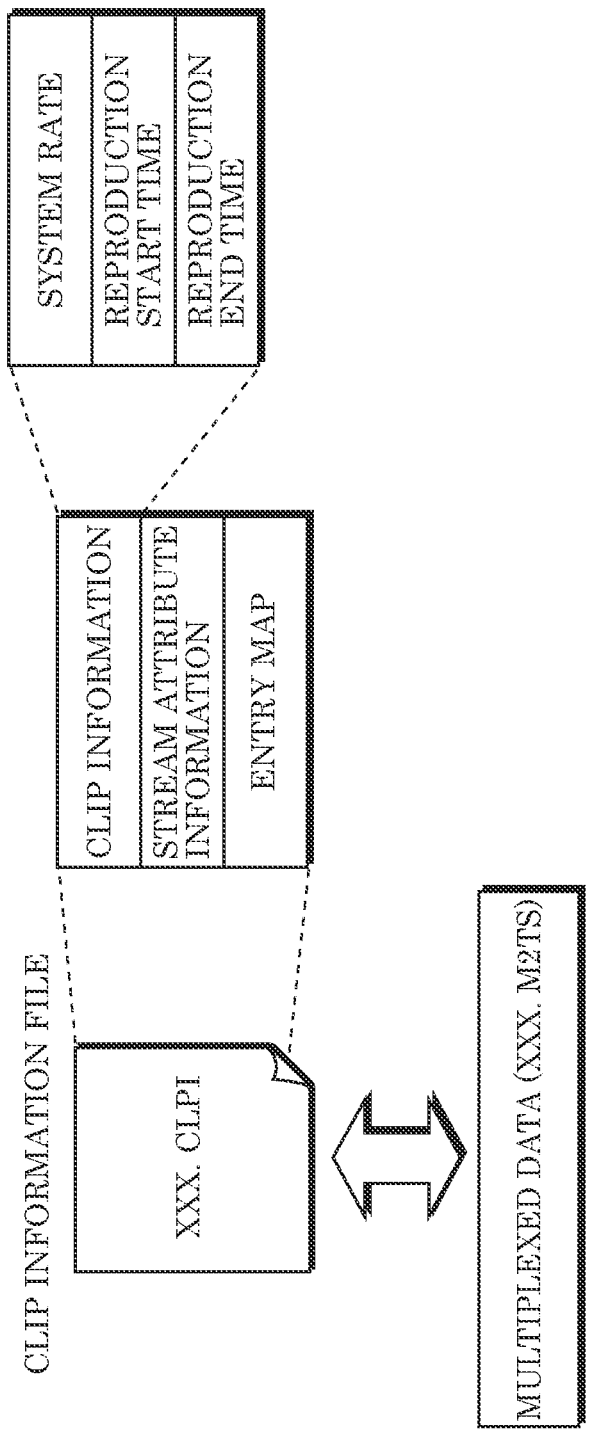
FIG. 68 shows an internal structure of multiplexed data information.

Each of the multiplexed data information files is management information of the multiplexed data as shown in FIG. 68. The multiplexed data information files are in one to one correspondence with the multiplexed data, and each of the files includes multiplexed data information, stream attribute information, and an entry map.

As illustrated in FIG. 68, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 69:
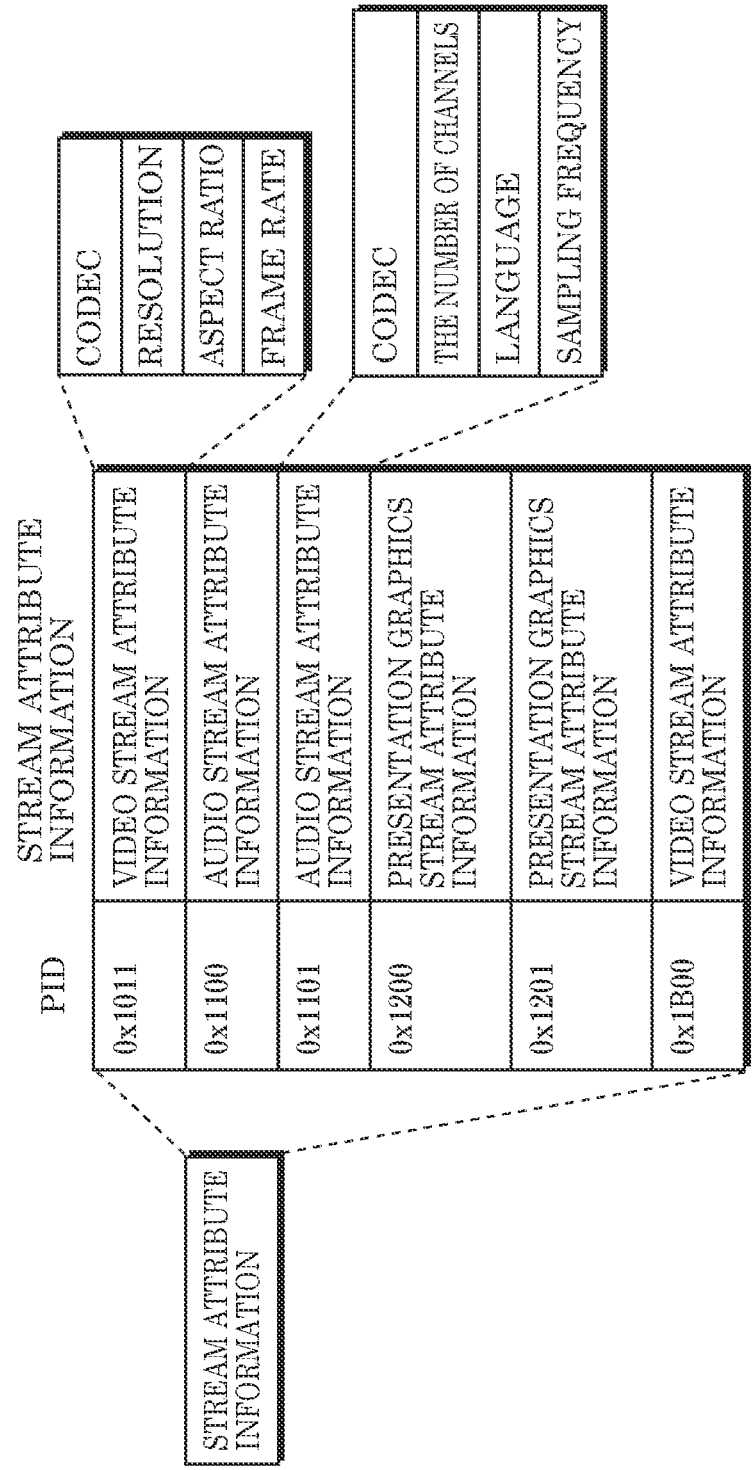
FIG. 69 shows an internal structure of stream attribute information.

As shown in FIG. 69, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT Furthermore, when the multiplexed data is recorded on a recording medium, the video stream attribute information included in the multiplexed data information is used. More specifically, the moving picture encoding method or the moving picture encoding apparatus described in each of embodiments includes a step or an element for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 70:
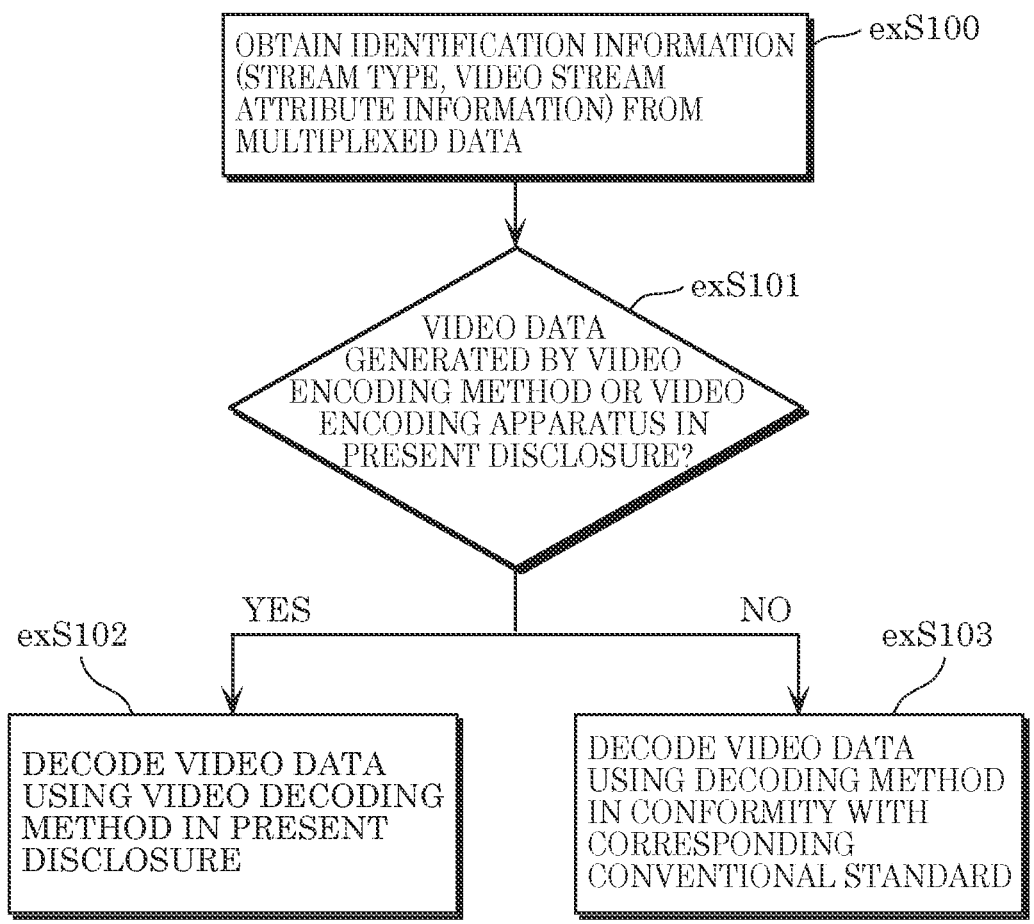
FIG. 70 shows steps for identifying video data.

Furthermore, FIG. 70 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the muitiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 16

Figure 71:
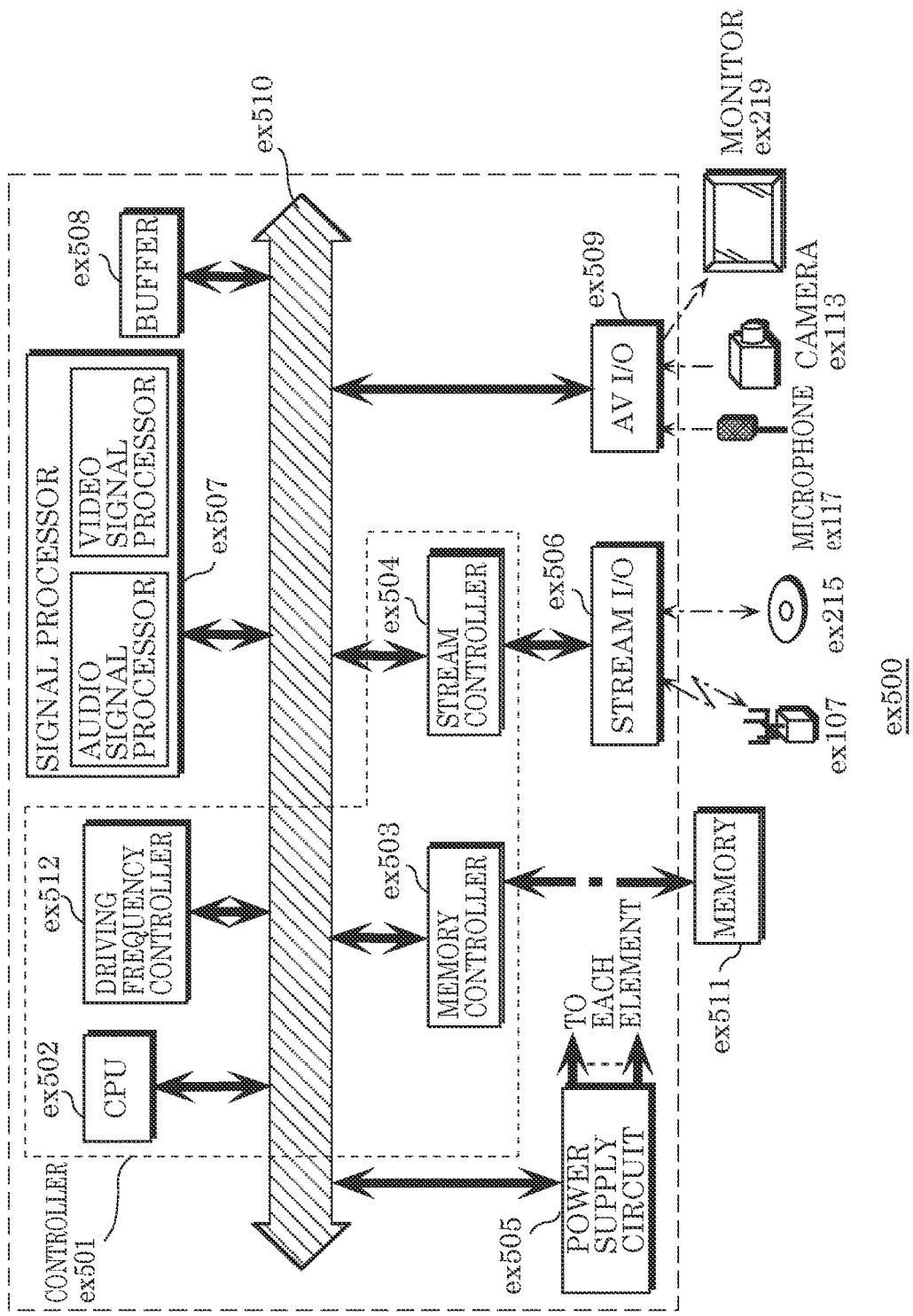
FIG. 71 shows an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 71 illustrates a configuration of LSI ex500 that is made into one chip. LSI ex500 includes elements ex501, ex502, ex503, ex504, ex505, ex506, ex507, ex508, and ex509 to be described below, and the elements are connected to each other through bus ex510. Power supply circuit ex505 is activated by supplying each of the elements with power when power supply circuit ex505 is turned on.

For example, when encoding is performed, LSI ex500 receives an AV signal from microphone ex117, camera ex113, and others through AV IO ex509 under control of controller ex501 including CPU ex502, memory controller ex503, stream controller ex504, and driving frequency controller ex512. The received AV signal is temporarily stored in external memory ex511, such as an SDRAM. Under control of controller ex501, the stored data is segmented into data portions according to the processing amount and speed to be transmitted to signal processor ex507. Then, signal processor ex507 encodes an audio signal and/or a video signal. Here, the encoding of the video signal is the encoding described in each of embodiments. Furthermore, signal processor ex507 sometimes multiplexes the encoded audio data and the encoded video data, and stream IO ex506 provides the multiplexed data outside. The provided multiplexed data is transmitted to base station ex107, or written on recording medium ex215. When data sets are multiplexed, the data should be temporarily stored in buffer ex508 so that the data sets are synchronized with each other.

Although memory ex511 is an element outside LSI ex500, it may be included in LSI ex500. Buffer ex508 is not limited to one buffer, but may be composed of buffers. Furthermore, LSI ex500 may be made into one chip or a plurality of chips.

Furthermore, although controller ex501 includes CPU ex502, memory controller ex503, stream controller ex504, driving frequency controller ex512, configuration of controller ex501 is not limited to such. For example, signal processor ex507 may further include a CPU. Inclusion of another CPU in signal processor ex507 can improve the processing speed. Furthermore, as another example, CPU ex502 may serve as or be a part of signal processor ex507, and for example, may include an audio signal processor. In such a case, controller ex501 includes signal processor ex507 or CPU ex502 including a part of signal processor ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 17

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, LSI ex500 needs to be set to a driving frequency higher than that of CPU ex502 to be used when video data in conformity with the conventional standard is decoded. However, there is a problem that the power consumption increases when the driving frequency is set higher.

Figure 72:
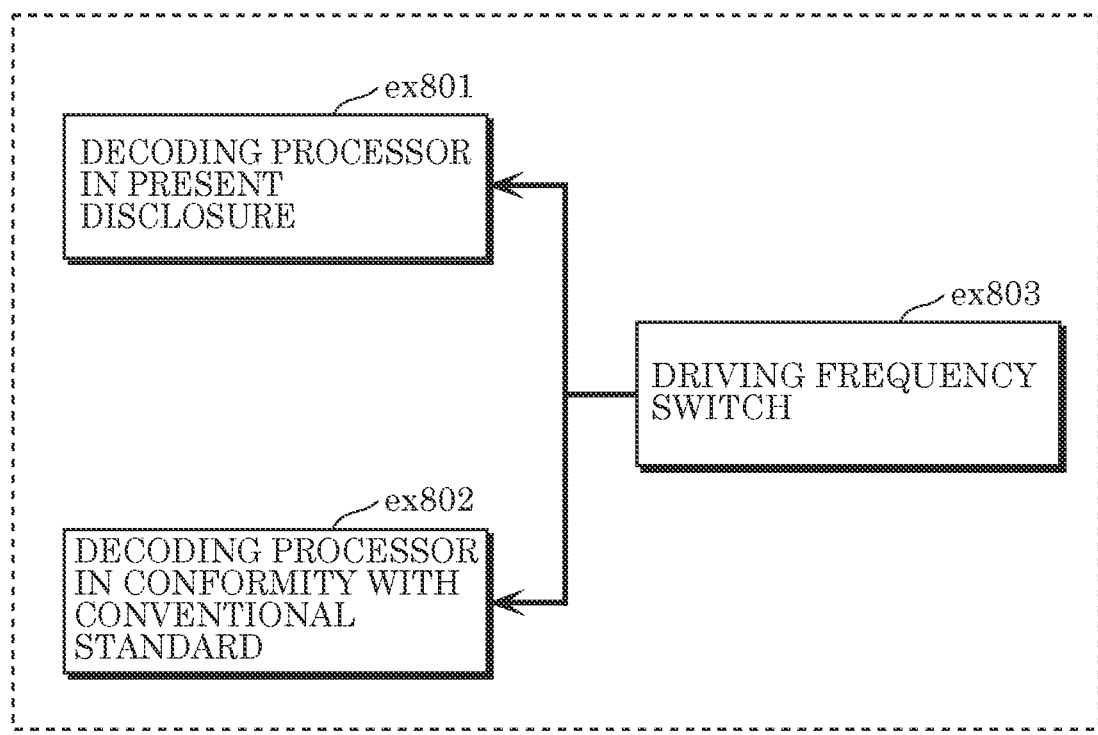
FIG. 72 shows a configuration for switching between driving frequencies.

In order to solve the problem, the moving picture decoding apparatus, such as television ex300 and LSI ex500 is configured to determine to which standard the video data conforms, and switch between the driving frequencies according to the determined standard. FIG. 72 illustrates configuration ex800 in the present embodiment. Driving frequency switch ex803 sets a driving frequency to a higher driving frequency when video data is generated by the moving picture encoding method or the moving picture encoding apparatus described in each of embodiments. Then, driving frequency switch ex803 instructs decoding processor ex801 that executes the moving picture decoding method described in each of embodiments to decode the video data. When the video data conforms to the conventional standard, driving frequency switch ex803 sets a driving frequency to a lower driving frequency than that of the video data generated by the moving picture encoding method or the moving picture encoding apparatus described in each of embodiments. Then, driving frequency switch ex803 instructs decoding processor ex802 that conforms to the conventional standard to decode the video data.

More specifically driving frequency switch ex803 includes CPU ex502 and driving frequency controller ex512 in FIG. 71. Here, each of decoding processor ex801 that executes the moving picture decoding method described in each of embodiments and decoding processor ex802 that conforms to the conventional standard corresponds to signal processor ex507 in FIG. 71. CPU ex502 determines to which standard the video data conforms. Then, driving frequency controller ex512 determines a driving frequency based on a signal from CPU ex502. Furthermore, signal processor ex507 decodes the video data based on the signal from CPU ex502. For example, the identification information described in Embodiment 15 is probably used for identifying the video data. The identification information is not limited to the one described in Embodiment 15 but may be any information as long as the information indicates to which standard the video data conforms. For example, when which standard video data conforms to can be determined based on an external signal for determining that the video data is used for a television or a disk, etc., the determination may be made based on such an external signal. Furthermore, CPU ex502 selects a driving frequency based on, for example, a look-up table in which the standards of the video data are associated with the driving frequencies as shown in FIG. 74. The driving frequency can be selected by storing the look-up table in buffer ex508 and in an internal memory of an LSI, and with reference to the look-up table by CPU ex502.

Figure 73:
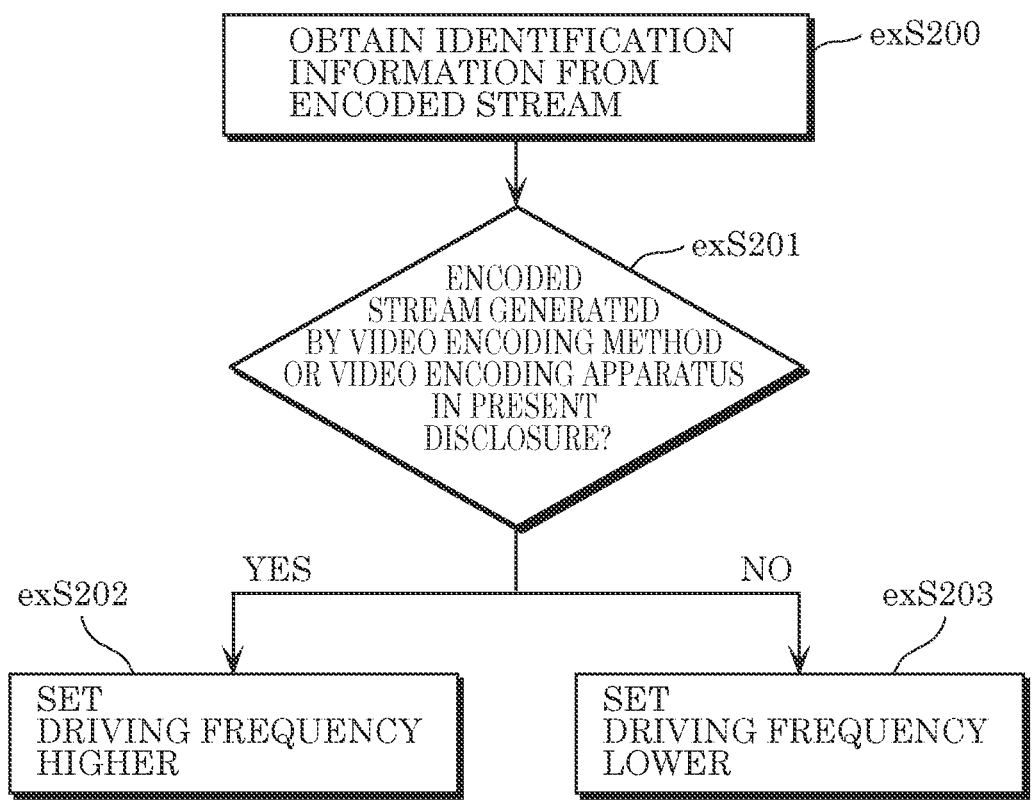
FIG. 73 shows steps for identifying video data and switching between driving frequencies.

FIG. 73 illustrates steps for executing a method in the present embodiment. First, in Step exS200, signal processor ex507 obtains identification information from the multiplexed data. Next, in Step exS201, CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, CPU ex502 transmits a signal for setting the driving frequency to a higher driving frequency to driving frequency controller ex512. Then, driving frequency controller ex512 sets the driving frequency to the higher driving frequency. On the other hand, when the identification information indicates that the video data conforms to the conventional standard, such as MPEG-2, MPEG-4 AVC, and VC-1, in Step exS203, CPU ex502 transmits a signal for setting the driving frequency to a lower driving frequency to driving frequency controller ex512. Then, driving frequency controller ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to LSI ex500 or an apparatus including LSI ex500. For example, when the driving frequency is set lower, the voltage to be applied to LSI ex500 or the apparatus including LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to LSI ex500 or the apparatus including LSI ex500 is probably set higher. When the identification information indicates that the video data conforms to the conventional standard, such as MPEG-2, MPEG-4 AVC, and VC-1, the voltage to be applied to LSI ex500 or the apparatus including LSI ex500 is probably set lower. As another example, when the identification information indicates that the video data is generated by the moving picture encoding method and the moving picture encoding apparatus described in each of embodiments, the driving of CPU ex502 does not probably have to be suspended. When the identification information indicates that the video data conforms to the conventional standard, such as MPEG-2, MPEG-4 AVC, and VC-1, the driving of CPU ex502 is probably suspended at a given time because CPU ex502 has extra processing capacity. Even when the identification information indicates that the video data is generated by the moving picture encoding method and the moving picture encoding apparatus described in each of embodiments, in the case where CPU ex502 has extra processing capacity the driving of CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when LSI ex500 or the apparatus including LSI ex500 is driven using a battery the battery life can be extended with the power conservation effect.

Embodiment 18

There are cases where a plurality of video data that conforms to different standards, is provided to the devices and systems, such as a television and a cellular phone. In order to enable decoding the plurality of video data that conforms to the different standards, signal processor ex507 of LSI ex500 needs to conform to the different standards. However, the problems of increase in the scale of the circuit of LSI ex500 and increase in the cost arise with the individual use of signal processors ex507 that conform to the respective standards.

Figure 75A:
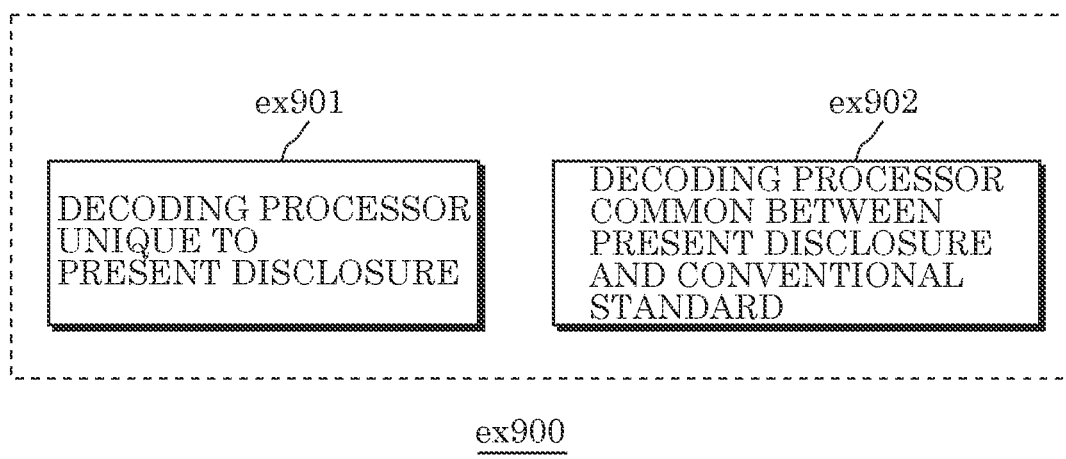
FIG. 75A is a diagram showing an example of a configuration for sharing a module of a signal processor.
Figure 75B:
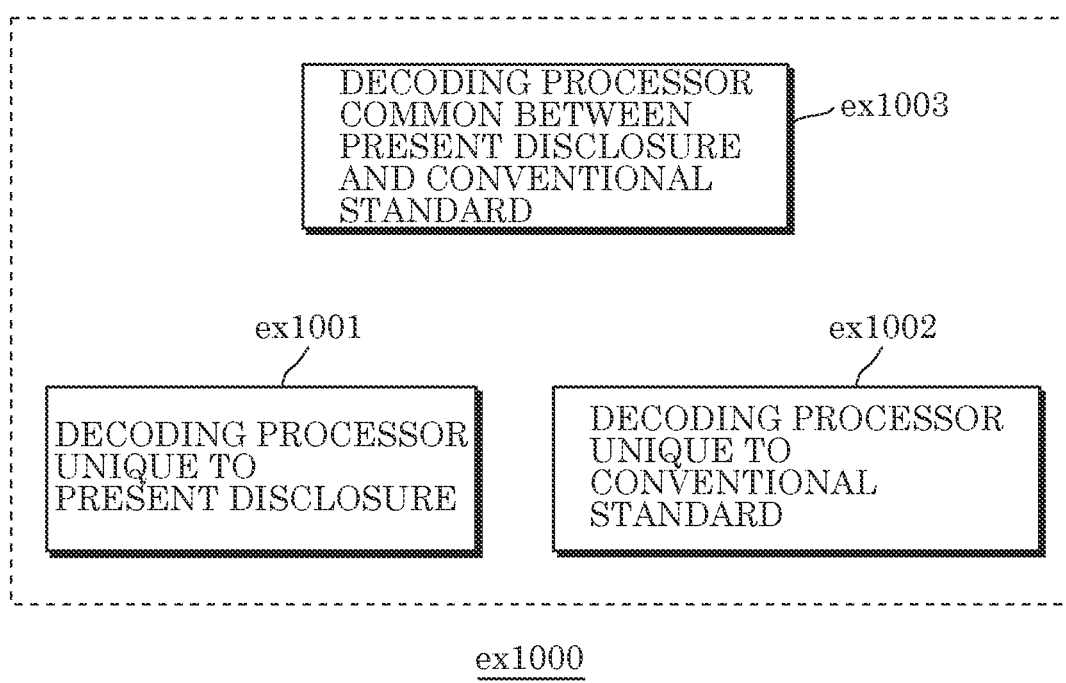
FIG. 75B is a diagram showing another example of a configuration for sharing a module of the signal processor.

In order to solve the problem, what is conceived is a configuration in which the decoding processor for implementing the moving picture decoding method described in each of embodiments and the decoding processor that conforms to the conventional standard, such as MPEG-2, MPEG-4 AVC, and VC-1 are partly common Ex900 in FIG. 75A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be common probably include use of decoding processor ex902 that conforms to MPEG-4 AVC. In contrast, unique decoding processor ex901 is probably used for other processing which is unique to an aspect of the present disclosure and does not conform to MPEG-4 AVC. The decoding processor for implementing the moving picture decoding method described in each of embodiments may be common for the processing to be common, and a dedicated decoding processor may be used for processing unique to that of MPEG-4 AVC.

Furthermore, ex1000 in FIG. B shows another example in that processing is partly common. This example uses a configuration including unique decoding processor ex1001 that supports the processing unique to an aspect of the present disclosure, unique decoding processor ex1002 that supports the processing unique to another conventional standard, and decoding processor ex1003 that supports processing to be common between the moving picture decoding method according to the aspect of the present disclosure and the conventional moving picture decoding method. Here, unique decoding processors ex1001 and ex1002 are not necessarily specialized for the processing according to the aspect of the present disclosure and the processing of the conventional standard, respectively and may be the ones capable of implementing general processing. Furthermore, the configuration of the present embodiment can be implemented by LSI ex500.

As such, reducing the scale of the circuit of an LSI and reducing the cost are possible by sharing the decoding processor for the processing to be common between the moving picture decoding method according to the aspect of the present disclosure and the moving picture decoding method in conformity with the conventional standard.

INDUSTRIAL APPLICABILITY

The encoding method and the decoding method according to the present disclosure are used to various applications which are information display apparatuses and imaging apparatuses including, for example, television receivers, digital video recorders, car navigation systems, mobile phones, digital cameras, and digital video cameras.

REFERENCE MARKS IN THE DRAWINGS 1100, 1300, 1500, 1700, 1900, 3000, 3100, 3200, 3300, 3400, 3500 video encoding apparatus
1101, 3001, 3101, 3201, 3301, 3401, 3501 encoder
1102, 1310, 1508, 1706, 1911, 2102, 2310, 2511, 2705, 2911, 3003, 3103, 3203, 3303, 3403, 3503, 4003, 4103, 4203, 4303, 4403, 4503 extractor
1103, 1311, 1509, 1707, 1912, 2103, 2311, 2512, 2706, 2912, 3004, 3104, 3204, 3304, 3404, 3504, 4004, 4104, 4204, 4304, 4404, 4504 categorizer
1104, 1312, 1510, 1708, 1913, 2104, 2312, 2513, 2707, 2913, 3005, 3105, 3205, 3305, 3405, 3505, 4005, 4105, 4205, 4305, 4405, 4505 selector
1301 transformer
1302 quantizer
1303, 2302 inverse quantizer
1304, 2303 inverse transformer
1305, 1309, 1705, 1909, 2304, 2309, 2704, 2909 block memory
1306, 1709, 2305, 2708 intra predictor
1307, 1507, 1512, 2308, 2508, 2510 picture memory
1308, 1908, 2307, 2907 vector predictor
1313, 1910, 2313, 2910 interpolator
1314, 1514, 1712, 1915, 2314, 2509, 2712, 2915 inter predictor
1315, 1713 entropy encoder
1316, 1317, 2315 adder
1511, 2514 in-loop filter
1914, 2914 averager
2101, 4001, 4101, 4201, 4301, 4401, 4501 decoder
2301 entropy decoder
2306, 2906, 4002, 4102, 4202, 4302, 4402, 4502, 4507 parser
3002, 3102, 3202, 3302, 3402, 3502, 3507 writer
3006, 3406, 3506, 4006, 4406, 4506 switch
3407, 4407 deriver

The invention claimed is:
1. An encoding method, comprising:
extracting one or more features from one or more reconstructed pixel groups;
writing, in a header of a bitstream, a first control parameter for controlling which one of a first machine learning model and a second machine learning model is to be used, the second machine learning model being different from the first machine learning model;
categorizing the one or more reconstructed pixel groups, wherein (i) when the written first control parameter has a predefined first value for using the first machine learning model, the one of more reconstructed pixel groups are categorized using the extracted one or more features and the first machine learning model, and (ii) when the written first control parameter does not have the predefined first value, the one or more reconstructed pixel groups are categorized using the extracted one or more features and the second machine learning model;
performing an encoding process on a current block of image samples included in a current picture using a parameter set corresponding to a result of the categorizing, the parameter set being one of a plurality of predefined parameter sets;

writing, in the header of the bitstream, a second control parameter for controlling whether to modify the first machine learning model;

when the written second control parameter does not have a predefined second value for controlling whether to modify the first machine learning model, performing the categorizing of the one or more reconstructed pixel groups using the extracted one or more features and one of the first machine learning model and the second machine learning model;

when the written second control parameter has the predefined second value:

writing, in the header of the bitstream, a third control parameter for modifying the first machine learning model; and modifying the first machine learning model using the third control parameter; and when the written first control parameter has the predefined first value, performing the categorizing of the one or more reconstructed pixel groups using the extracted one or more features and the modified first machine learning model.

2. The encoding method according to claim 1, further comprising:

writing, in the header of the bitstream, a fourth control parameter for controlling whether to use a machine learning model, when the written fourth control parameter has a predefined third value for using a machine learning model:

performing the categorizing of the one or more reconstructed pixel groups using the extracted one or more features and the first machine learning model; and performing the encoding process on the current block using the parameter set corresponding to the result of the categorizing; and when the written second control parameter does not have the predefined third value, performing the encoding process on the current block using a predetermined parameter set.

3. The encoding method according to claim 2, further comprising:

when the written fourth control parameter does not have the predefined third value:

deriving a parameter set from a spatially or temporally neighboring block; and performing the encoding process on the current block using the derived parameter set.

4. The encoding method according to claim 1, wherein at least part of the one or more reconstructed pixel groups is included in a reference block in a reference picture different from the current picture, the parameter set includes a filter coefficient set which is used in an interpolation process to be performed on image pixels in inter prediction, and the encoding process includes the interpolation process.

5. The encoding method according to claim 1, wherein the one or more reconstructed pixel groups are included in the current block, the parameter set includes a filter coefficient set which is used in a filtering process to be performed on the current block, and the encoding process includes the filtering process.

6. The encoding method according to claim 1, wherein the one or more reconstructed pixel groups includes reconstructed pixels spatially neighboring the current block, the parameter set indicates an intra prediction method for use in an intra prediction process, and the encoding process includes the intra prediction process.

7. The encoding method according to claim 1, wherein at least part of the one or more reconstructed pixel groups is included in a plurality of reference blocks in a plurality of reference pictures different from the current picture, the parameter set includes a weighting coefficient set which is used in an averaging process to be performed on a plurality of inter prediction blocks, and the encoding process includes the averaging process.

8. The encoding method according to claim 1, wherein the first machine learning model maps a reconstructed pixel group which is a two-dimensional input space into a multi-dimensional feature space, and associates segment spaces with the one or more features, the segment spaces being obtained by dividing the feature space, and in the categorizing, the segment spaces corresponding to the one or more reconstructed pixel groups are identified.

9. A decoding method, comprising:

extracting one or more features from one or more reconstructed pixel groups;

parsing, from a header of a bitstream, a first control parameter for controlling which one of a first machine learning model and a second machine learning model is to be used, the second machine learning model being different from the first machine learning model;

categorizing the one or more reconstructed pixel groups, wherein (i) when the parsed first control parameter has a predefined first value for using the first machine learning model, the one of more reconstructed pixel groups are categorized using the extracted one or more features and first machine learning model, and (ii) when the written first control parameter does not have the predefined first value, the one of more reconstructed pixel groups are categorized using the extracted one or more features and the second machine learning model;

performing a decoding process on a current block of image samples included in a current picture using a parameter set corresponding to a result of the categorizing, the parameter set being one of a plurality of predefined parameter sets;

parsing, from the header of the bitstream, a second control parameter for controlling whether to modify the first machine learning model;

when the parsed second control parameter does not have a predefined second value for modifying the first machine learning model, performing the categorizing of the one or more reconstructed pixel groups using the extracted one or more features and one of the first machine learning model and the second machine learning model;

when the parsed second control parameter has the predefined second value:

parsing, from the header of the bitstream, a third control parameter for modifying the first machine learning model; and modifying the first machine learning model using the third control parameter; and when the parsed first control parameter has the predefined first value, performing the categorizing of the one or more reconstructed pixel groups using the extracted one or more features and the modified first machine learning model.

10. The decoding method according to claim 9, further comprising:
- parsing, from the header of the bitstream, a fourth control parameter for controlling whether to use a machine learning model;
- when the parsed fourth control parameter has a predefined third value for using a machine learning model:
  - performing the categorizing of the one or more reconstructed pixel groups using the extracted one or more features and one of the first machine learning model and the second machine learning model; and
  - performing the decoding process on the current block using the parameter set corresponding to the result of the categorizing; and
- when the parsed fourth control parameter does not have the predefined third value, performing the decoding process on the current block using a predetermined parameter set.

11. The decoding method according to claim 10, further comprising:
- when the parsed fourth control parameter does not have the predefined third value:
  - deriving a parameter set from a spatially or temporally neighboring block; and
  - performing the decoding process on the current block using the derived parameter set.

12. The decoding method according to claim 9,
- wherein at least part of the one or more reconstructed pixel groups is included in a reference block in a reference picture different from the current picture,
- the parameter set includes a filter coefficient set which is used in an interpolation process to be performed on image pixels in inter prediction, and
- the decoding process includes the interpolation process.

13. The decoding method according to claim 9,
- wherein the one or more reconstructed pixel groups are included in the current block,
- the parameter set includes a filter coefficient set which is used in a filtering process to be performed on the current block, and
- the decoding process includes the filtering process.

14. The decoding method according to claim 9,
- wherein the one or more reconstructed pixel groups includes reconstructed pixels spatially neighboring the current block,
- the parameter set indicates an intra prediction method for use in an intra prediction process, and
- the decoding process includes the intra prediction process.

15. The decoding method according to claim 9,
- wherein at least part of the one or more reconstructed pixel groups is included in a plurality of reference blocks in a plurality of reference pictures different from the current picture,
- the parameter set includes a weighting coefficient set which is used in an averaging process to be performed on a plurality of inter prediction blocks, and
- the decoding process includes the averaging process.

16. The decoding method according to claim 9,
- wherein the first machine learning model maps a reconstructed pixel group which is a two-dimensional input space into a multi-dimensional feature space, and associates segment spaces with the one or more features, the segment spaces being obtained by dividing the feature space, and
- in the categorizing, the segment spaces corresponding to the one or more reconstructed pixel groups are identified.

17. An encoding apparatus, comprising:
- an extractor which extracts one or more features from one or more reconstructed pixel groups;
- a writer which writes, in a header of a bitstream, a first control parameter for controlling which one of a first machine learning model and a second machine learning model is to be used, the second machine learning model being different from the first machine learning model;
- a categorizer which categorizes the one or more reconstructed pixel groups, wherein (i) when the written first control parameter has a predefined first value for using the first machine learning model, the categorizer categorizes the one of more reconstructed pixel groups using the extracted one or more features and the first machine learning model, and (ii) when the written first control parameter does not have the predefined first value, the categorizer categorizes the one of more reconstructed pixel groups using the extracted one or more features and the second machine learning model;
- an encoder which performs an encoding process on a current block of image samples included in a current picture using a parameter set corresponding to a result of the categorizing, the parameter set being one of a plurality of predefined parameter sets,
- wherein the writer writes, in the header of the bitstream, a second control parameter for controlling whether to modify the first machine learning model,
- wherein when the written second control parameter does not have a predefined second value for controlling whether to modify the first machine learning model, the categorizer categorizes the one or more reconstructed pixel groups using the extracted one or more features and one of the first machine learning model and the second machine learning model,
- wherein when the written second control parameter has the predefined second value:
  - the writer writes, in the header of the bitstream, a third control parameter for modifying the first machine learning model; and
  - the categorizer modifies the first machine learning model using the third control parameter, and
- wherein when the written first control parameter has the predefined first value, the categorizer categorizes the one or more reconstructed pixel groups using the extracted one or more features and the modified first machine learning model.

18. A decoding apparatus, comprising:
- an extractor which extracts one or more features from one or more reconstructed pixel groups;
- a parser which parses, from a header of a bitstream, a first control parameter for controlling which one of a first machine learning model and a second machine learning model is to be used, the second machine learning model being different from the first machine learning model;
- a categorizer which categorizes the one or more reconstructed pixel groups, wherein (i) when the parsed first control parameter has a predefined first value for using the first machine learning model, the categorizer categorizes the one of more reconstructed pixel groups using the extracted one or more features and the first machine learning model, and (ii) when the parsed first control parameter does not have the predefined first value, the categorizer categorizes the one of more reconstructed pixel groups using the extracted one or more features and the second machine learning model;
- a decoder which performs a decoding process on a current block of image samples included in a current picture using a parameter set corresponding to a result of the categorizing, the parameter set being one of a plurality of predefined parameter sets, wherein the parser parses, from the header of the bitstream, a second control parameter for controlling whether to modify the first machine learning model, wherein when the parsed second control parameter does not have a predefined second value for modifying the first machine learning model, the categorizer categorizes the one or more reconstructed pixel groups using the extracted one or more features and one of the first machine learning model and the second machine learning model, wherein when the parsed second control parameter has the predefined second value:
the parser parses, from the header of the bitstream, a third control parameter for modifying the first machine learning model; and
the categorizer modifies the first machine learning model using the third control parameter, and wherein when the parsed first control parameter has the predefined first value, the categorizer categorizes the one or more reconstructed pixel groups using the extracted one or more features and the modified first machine learning model.

19. An encoding and decoding apparatus, comprising:
an encoding apparatus including:
an extractor which extracts one or more features from one or more reconstructed pixel groups;
a writer which writes, in a header of a bitstream, a first control parameter for controlling which one of a first machine learning model and a second machine learning model is to be used, the second machine learning model being different from the first machine learning model;
a first categorizer which categorizes the one or more reconstructed pixel groups, wherein (i) when the written first control parameter has a predefined first value for using the first machine learning model, the first categorizer categorizes the one of more reconstructed pixel groups using the extracted one or more features and the first machine learning model, and (ii) when the written first control parameter does not have the predefined first value, the first categorizer categorizes the one of more reconstructed pixel groups using the extracted one or more features and the second machine learning model; and
an encoder which performs an encoding process on a current block of image samples included in a current picture using a parameter set corresponding to a result of the categorizing performing by the first categorizer, the parameter set being one of a plurality of predefined parameter sets, wherein the writer writes, in the header of the bitstream, a second control parameter for controlling whether to modify the first machine learning model, wherein when the written second control parameter does not have a predefined second value for controlling whether to modify the first machine learning model, the first categorizer categorizes the one or more reconstructed pixel groups using the extracted one or more features and one of the first machine learning model and the second machine learning model, wherein when the written second control parameter has the predefined second value;
the writer writes, in the header of the bitstream, a third control parameter for modifying the first machine learning model; and
the first categorizer modifies the first machine learning model using the third control parameter, wherein when the written first control parameter has the predefined first value, the first categorizer categorizes the one or more reconstructed pixel groups using the extracted one or more features and the modified first machine learning model, wherein the encoding and decoding apparatus further comprises a decoding apparatus, including:
a parser which parses, from the header of the bitstream, the first control parameter for controlling which one of the first machine learning model and the second machine learning model is to be used, the second machine learning model being different from the first machine learning model;
a second categorizer which categorizes the one or more reconstructed pixel groups, wherein (i) when the parsed first control parameter has the predefined first value for using the first machine learning model, the second categorizer categorizes the one of more reconstructed pixel groups using the extracted one or more features and the first machine learning model, and (ii) when the written first control parameter does not have the predefined first value, the second categorizer categorizes the one of more reconstructed pixel groups using the extracted one or more features and the second machine learning model; and
a decoder which performs a decoding process on a current block of image samples included in a current picture using a parameter set corresponding to a result of the categorizing performed by the second categorizer, the parameter set being one of a plurality of predefined parameter sets, wherein the parser parses, from the header of the bitstream, the second control parameter for controlling whether to modify the first machine learning model, wherein when the parsed second control parameter does not have the predefined second value for modifying the first machine learning model, the second categorizer categorizes the one or more reconstructed pixel groups using the extracted one or more features and one of the first machine learning model and the second machine learning model, wherein when the parsed second control parameter has the predefined second value:
the parser parses, from the header of the bitstream, the third control parameter for modifying the first machine learning model; and
the second categorizer modifies the first machine learning model using the third control parameter, and wherein when the parsed first control parameter has the predefined first value, the second categorizer categorizes the one or more reconstructed pixel groups using the extracted one or more features and the modified first machine learning model.

* * * * *